United States Patent
Hosokawa et al.

(10) Patent No.: US 8,506,838 B2
(45) Date of Patent: Aug. 13, 2013

(54) SINTERED FERRITE MAGNET AND ITS PRODUCTION METHOD

(75) Inventors: Seiichi Hosokawa, Mishima-gun (JP); Etsushi Oda, Mishima-gun (JP); Hiroshi Iwasaki, Kumagaya (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 13/583,491

(22) PCT Filed: Mar. 9, 2011

(86) PCT No.: PCT/JP2011/055553
§ 371 (c)(1), (2), (4) Date: Sep. 7, 2012

(87) PCT Pub. No.: WO2011/111756
PCT Pub. Date: Sep. 15, 2011

(65) Prior Publication Data
US 2012/0326074 A1    Dec. 27, 2012

(30) Foreign Application Priority Data
Mar. 10, 2010  (JP) ................................ 2010-053611

(51) Int. Cl.
| H01F 1/11 | (2006.01) |
| H01F 41/02 | (2006.01) |
| C01G 49/00 | (2006.01) |
| C04B 35/40 | (2006.01) |

(52) U.S. Cl.
USPC ...................................................... 252/62.63

(58) Field of Classification Search
USPC ...................................................... 252/62.63
See application file for complete search history.

(56) References Cited

U.S. PATENT DOCUMENTS

| 6,086,781 | A | * | 7/2000 | Taguchi et al. | ............ 252/62.57 |
| 6,139,766 | A | | 10/2000 | Taguchi et al. | |
| 6,258,290 | B1 | | 7/2001 | Taguchi et al. | |
| 6,402,980 | B1 | | 6/2002 | Taguchi et al. | |
| 2004/0053075 | A1 | | 3/2004 | Oda et al. | |
| 2004/0061090 | A1 | | 4/2004 | Oda et al. | |
| 2006/0284136 | A1 | | 12/2006 | Takami et al. | |
| 2007/0023970 | A1 | | 2/2007 | Masuzawa et al. | |
| 2007/0194269 | A1 | | 8/2007 | Kobayashi et al. | |
| 2009/0022992 | A1 | | 1/2009 | Takami et al. | |
| 2009/0261288 | A1 | | 10/2009 | Hosokawa et al. | |
| 2011/0024672 | A1 | | 2/2011 | Takami et al. | |

FOREIGN PATENT DOCUMENTS

| JP | 10-149910 A | 6/1998 |
| JP | 11-154604 A | 6/1999 |
| JP | 11-195516 A | 7/1999 |
| JP | 2000-223307 A | 8/2000 |
| JP | 2002-313618 A | 10/2002 |
| JP | 2006-104050 A | 4/2006 |
| JP | 2006-351560 A | 12/2006 |
| WO | 2005/027153 A1 | 3/2005 |
| WO | 2007/060757 A1 | 5/2007 |
| WO | 2007/077811 A1 | 7/2007 |

* cited by examiner

*Primary Examiner* — Carol M Koslow
(74) *Attorney, Agent, or Firm* — Sughrue Mion, PLLC

(57) ABSTRACT

A sintered ferrite magnet comprising a first granular ferrite compound phase containing Ca, La, Fe and Co and having a Curie temperature Tc1 between 415° C. and 430° C., and a second granular ferrite compound phase containing Sr, La, Fe and Co and having a Curie temperature Tc2 between 437° C. and 455° C., the volume ratio of the first ferrite compound phase being 50-90%, and the volume ratio of the second ferrite compound phase being 10-50%, with their total volume ratio being 95% or more.

16 Claims, 33 Drawing Sheets

⊢——⊣ 10 μm

Mixing Ratio of Calcined SrLaCo Ferrite [% by mass]

Mixing Ratio of Calcined SrLaCo Ferrite [% by mass]

SINTERED FERRITE MAGNET AND ITS PRODUCTION METHOD

CROSS REFERENCE TO RELATED APPLICATIONS

This application is a National Stage of International Application No. PCT/JP2011/055553, filed on Mar. 9, 2011, which claims priority from Japanese Patent Application No. 2010-053611, filed on Mar. 10, 2010, the contents of all of which are incorporated herein by reference in their entirety.

FIELD OF THE INVENTION

The present invention relates to a sintered ferrite magnet having high magnetic properties, and its production method.

BACKGROUND OF THE INVENTION

Sintered ferrite magnets are used for various applications such as various motors, electric power generators, speakers, etc. As typical sintered ferrite magnets, Sr ferrite ($SrFe_{12}O_{19}$) and Ba ferrite ($BaFe_{12}O_{19}$) having hexagonal, M-type magnetoplumbite structures are known. These sintered ferrite magnets are produced by a powder metallurgy method from starting materials, for example, comprising iron oxide and carbonates of strontium (Sr) or barium (Ba), etc., at relatively low cost.

From the environmental point of view, etc., higher-performance sintered ferrite magnets are recently desired to provide electric parts for automobiles, electric appliances, etc. with smaller sizes and weights as well as higher performance. Particularly desired for motors used in automobile electric parts are sintered ferrite magnets having high coercivity $H_{cJ}$ (hereinafter simply referred to as "$H_{cJ}$"), by which demagnetization does not easily occur by a demagnetizing field when they are made thinner, while keeping high residual magnetic flux densities $B_r$ (hereinafter simply referred to as "$B_r$").

To improve the magnetic properties of sintered ferrite magnets, technologies have been proposed to improve $H_{cJ}$ and $B_r$ by substituting part of Sr with rare earth elements such as La, etc., and part of Fe with Co in the above Sr ferrites (see, for example, JP 10-149910 A and JP 11-154604 A).

Because of excellent magnetic properties, Sr ferrites with part of Sr substituted by rare earth elements such as La, etc., and part of Fe substituted by Co, etc., which are described in JP 10-149910 A and JP 11-154604 A, and hereinafter simply referred to as "SrLaCo ferrites," have got used in various applications in large volume in place of conventional Sr ferrites and Ba ferrites. However, further improvement of magnetic properties is desired.

Also known as the sintered ferrite magnets are Ca ferrites, in addition to the above Sr ferrites and Ba ferrites. It is known that the Ca ferrites have stable structures represented by CaO—$Fe_2O_3$ or CaO-$2Fe_2O_3$, forming hexagonal ferrites by the addition of La. However, their magnetic properties are on the same level as those of conventional Ba ferrites, not sufficiently high.

Japanese Patent 3,181,559 discloses a Ca ferrite with part of Ca substituted by rare earth elements such as La, etc. and part of Fe substituted by Co, etc. for improved $B_r$, $H_{cJ}$, and temperature characteristics of $H_{cJ}$, which is hereinafter simply referred to as "CaLaCo ferrite." Japanese Patent 3,181,559 describes that the anisotropic field $H_A$ (hereinafter simply referred to as "$H_A$") of CaLaCo ferrites is 20 kOe or more, at most 10% or more higher than that of Sr ferrites.

However, the CaLaCo ferrite of Japanese Patent 3,181,559 has $B_r$ and $H_{cJ}$ on the same level as those of SrLaCo ferrites and extremely poor rectangularity $H_k/H_{cJ}$ (hereinafter simply referred to as "$H_k/H_{cJ}$"), though they have higher $H_A$ than that of SrLaCo ferrites. Thus, the CaLaCo ferrite fails to satisfy both requirements of high $H_{cJ}$ and high $H_k/H_{cJ}$, being not used in various applications such as motors, etc.

To improve the magnetic properties of the above SrLaCo ferrites and CaLaCo ferrites, the following proposals have been made.

JP 11-195516 A proposes an improvement of the production methods of SrLaCo ferrites proposed by JP 10-149910 A and JP 11-154604 A, which comprises adding La and Co to calcined Sr ferrite powder, and molding and sintering the resultant mixture. It describes that this method provides sintered magnets having two different Curie temperatures (Tc) as well as high rectangularity, with a lower Co content.

JP 2006-104050 A, WO 2007/060757 and WO 2007/077811 propose improvements of the performance of CaLaCo ferrites proposed by Japanese Patent 3,181,559. Specifically, JP 2006-104050 A proposes a technology of optimizing the atomic ratios and molar ratio n of constituent elements, with La and Co added at particular ratios, WO 2007/060757 proposes a technology of substituting part of Ca with La and Ba, and WO 2007/077811 proposes a technology of substituting part of Ca with La and Sr.

JP 11-195516 A has improved the magnetic properties of the SrLaCo ferrites proposed by JP 10-149910 A and JP 11-154604 A, and JP 2006-104050 A, WO 2007/060757 and WO 2007/077811 have improved the magnetic properties of the CaLaCo ferrites proposed by Japanese Patent 3,181,559. However, as demand for higher performance is increasingly higher recently, further improvement of magnetic properties is desired.

OBJECT OF THE INVENTION

An object of the present invention is to improve the magnetic properties of sintered ferrite magnets, particularly to provide a sintered CaLaCo ferrite magnet with further improved magnetic properties, which can meet recently increasing demand for higher performance.

SUMMARY OF THE INVENTION

As a result of intensive research in view of the above object, the inventors have found that a sintered ferrite magnet, which is obtained by mixing calcined ferrite comprising Ca, La, Fe and Co (hereinafter referred to as "CaLaCo ferrite") with calcined ferrite comprising Sr, La, Fe and Co (hereinafter referred to as "SrLaCo ferrite") at a particular ratio, and pulverizing, molding and sintering the resultant mixture, comprises a first granular ferrite compound phase derived from the calcined CaLaCo ferrite and having a Curie temperature between 415° C. and 430° C., and a second granular ferrite compound phase derived from the calcined SrLaCo ferrite and having a Curie temperature between 437° C. and 455° C., thereby having high $H_{cJ}$ with high $B_r$ and $H_k/H_{cJ}$ maintained. The present invention has been completed based on such finding.

In proposing the present invention, the inventors have paid attention to differences between the sintered SrLaCo ferrite magnet and the sintered CaLaCo ferrite magnet in magnetic properties, particularly in $H_{cJ}$. The $H_{cJ}$ of sintered magnets is theoretically almost proportional to $H_A$, though it is affected by their sinter structures. Namely, it is expected that materials having higher $H_A$ have higher $H_{cJ}$. As a result of measuring the $H_A$ of the sintered SrLaCo ferrite magnet and the sintered CaLaCo ferrite magnet from their magnetic hysteresis curves by a singular point detection (SPD) method, the inventors have found that CaLaCo ferrite having a Co atomic ratio of 0.3 has $H_A$ of 2.1 MA/m (about 26.4 kOe), while usual SrLaCo ferrite having a Co atomic ratio of 0.2 has $H_A$ of 1.8 MA/m (about 22.6 kOe), the former being higher than the latter, expecting that the CaLaCo ferrite has higher $H_{cJ}$ than that of the SrLaCo ferrite.

Sintered SrLaCo ferrite magnets now commercially available have $B_r$ of about 440 mT and $H_{cJ}$ of about 350 kA/m as typical magnetic properties. With the above magnetic properties as center, high-$B_r$-type products and high-$H_{cJ}$-type products are available. In a graph with the axis of ordinates representing $B_r$ and the axis of abscissas representing $H_{cJ}$, the magnetic properties of sintered SrLaCo ferrite magnets are on a line connecting a point at which $B_r$ is about 450 mT and $H_{cJ}$ is about 300 kA/m, and a point at which $B_r$ is about 430 mT and $H_{cJ}$ is about 370 kA/m.

On the other hand, sintered CaLaCo ferrite magnets have $B_r$ of 460 mT or more and $H_{cJ}$ of 360 kA/m or more as typical magnetic properties as described in JP 2006-104050 A, WO 2007/060757 and WO 2007/077811, one rank higher than those of the sintered SrLaCo ferrite magnets.

It is generally expected that when a material having high magnetic properties is mixed with a material having low magnetic properties in an increasing proportion, the resultant mixture has decreasing magnetic properties. Accordingly, it is expected that sintered magnets obtained by mixing calcined CaLaCo ferrite having high magnetic properties with calcined SrLaCo ferrite having low magnetic properties provides magnetic properties lowering as the mixing ratio of the calcined SrLaCo ferrite increases.

In an attempt of improving the magnetic properties of sintered CaLaCo ferrite magnets, the inventors have found that sintered magnets obtained by mixing calcined CaLaCo ferrite with calcined SrLaCo ferrite at a particular mass ratio have improved $H_{cJ}$ with little reduction of $B_r$ and $H_k/H_{cJ}$, which are unexpected magnetic properties.

The analysis of the resultant sintered magnet has revealed that it has a special sinter structure comprising a granular ferrite compound phase (Curie temperature: 415° C. to 430° C.) containing Ca, La, Fe and Co, and a granular ferrite compound phase (Curie temperature: 437° C. to 455° C.) containing Sr, La, Fe and Co. The improvement of $H_{cJ}$ appears to be due to this special structure.

JP 11-195516 A describes a sintered magnet having a main phase of hexagonal ferrite and at least two different Curie temperatures with differences of 5° C. or more in a range of 400° C. to 480° C., which is an improvement of the SrLaCo ferrites proposed by JP 10-149910 A and JP 11-154604 A as described above.

JP 11-195516 A describes that this sintered SrLaCo ferrite magnet having two different Curie temperatures can be produced by a so-called "post-addition method." The "post-addition method" is a method of mixing calcined M-type Sr ferrite obtained by mixing and calcining a Sr compound and an Fe compound, with a La compound, an Fe compound and a Co compound at predetermined ratios as starting materials, and pulverizing, molding and sintering the resultant mixture to produce a sintered SrLaCo ferrite magnet.

JP 11-195516 A describes in Paragraphs [0031] and [0053] that two different Curie temperatures are obtained by a two-phase structure comprising an M-type ferrite phase with high concentrations of La and Co formed on surface layers of M-type, calcined ferrite particles by the reaction of La and/or Co post-added at the time of sintering and penetrating into the particles, and an M-type ferrite phase with low concentrations of La and Co formed inside the particles.

Further, P 11-195516 A describes in Paragraph [0138] that because a lower Curie temperature (Tc1) lowers as the La content and the Co content increase, while a higher Curie temperature (Tc2) does not undergo large change with the amounts of La and Co among the two different Curie temperatures, Tc1 is expected to be the Curie temperature of Sr ferrite portions containing large amounts of La and Co.

It is considered from these descriptions that sintered SrLaCo ferrite magnets obtained by the "post-addition method" have a two-phase structure comprising SrLaCo ferrite particles with high concentrations of La and Co, and SrLaCo ferrite particles with low concentrations of La and Co or SrLaCo ferrite particles in which the concentrations of La and Co are higher in surface layers than in center portions, these phases having different Curie temperatures. In any case, a phenomenon of generating two different Curie temperatures is due to the fact that phases with different concentration distributions of La and Co are formed by the "post-addition method" described in JP 11-195516 A.

On the other hand, the sintered ferrite magnet of the present invention has a structure, in which a ferrite compound phase (Curie temperature: 415° C. to 430° C.) derived from calcined CaLaCo ferrite containing Ca, La, Fe and Co, and a ferrite compound phase (Curie temperature: 437° C. to 455° C.) derived from calcined SrLaCo ferrite containing Sr, La, Fe and Co are distributed in the form of particles in the sintered body, totally different from the sintered ferrite magnets described in JP 11-195516 A.

The sintered ferrite magnet of the present invention is produced by mixing the calcined CaLaCo ferrite and the calcined SrLaCo ferrite having different compositions at a particular mass ratio, and pulverizing, molding and sintering the resultant mixture, totally different from the "post-addition method" described in JP 11-195516 A.

Thus, the sintered ferrite magnet of the present invention comprises a first granular ferrite compound phase containing Ca, La, Fe and Co and having a Curie temperature between 415° C. and 430° C., and a second granular ferrite compound phase containing Sr, La, Fe and Co and having a Curie temperature between 437° C. and 455° C., the volume ratio of the first granular ferrite compound phase being 50-90%, and the volume ratio of the second granular ferrite compound phase being 10-50%, with their total volume ratio being 95% or more.

It is preferable that the volume ratio of the first granular ferrite compound phase is 60-80%, and the volume ratio of the second granular ferrite compound phase is 20-40%, with their total volume ratio being 95% or more.

The first granular ferrite compound phase preferably further contains Ba and/or Sr.

The metal elements of Ca, La, Sr, Ba, Fe and Co in the sintered ferrite magnet preferably have a composition represented by the general formula:

$$Ca_{1-x-a-b}La_xSr_aBa_bFe_{2n-y}Co_y$$

wherein x, a, b and y representing the atomic ratios of Ca, La, Sr, Ba, Fe and Co, and n representing a molar ratio are numbers meeting the conditions of $$0.2 \leq x \leq 0.6,$$

$$0.01 \leq a \leq 0.6,$$

$$0 \leq b \leq 0.3,$$

$$0.1 \leq 1-x-a-b,$$

$0.1 \leq y \leq 0.5$, and $3 \leq n \leq 6$.

The x, a, b and y representing the atomic ratios of Ca, La, Sr, Ba, Fe and Co, and n representing a molar ratio are preferably numbers meeting the conditions of $0.3 \leq x \leq 0.5$, $0.05 \leq a \leq 0.5$, $0 \leq b \leq 0.2$, $0.2 \leq 1-x-a-b$, $0.15 \leq y \leq 0.4$, and $3.7 \leq n \leq 5.5$.

The x and y are preferably numbers meeting the condition of $x/y \geq 1.3$.

The metal elements of Ca, La, (Ba+Sr), Fe and Co in the first granular ferrite compound phase preferably have a composition represented by the general formula:

$Ca_{1-x'-c'}La_{x'}A_{c'}Fe_{2n'-y'}Co_{y'}$, wherein A represents (Ba+Sr), and x', c' and y' representing the atomic ratios of Ca, La, A, Fe and Co and n' representing a molar ratio are numbers meeting the conditions of $0.4 \leq x' \leq 0.6$, $0 \leq c' \leq 0.2$, $0.2 < y' \leq 0.5$, and $4 \leq n' \leq 6$.

The y' representing the atomic ratio of Co is preferably a number meeting the condition of $0.2 < y' \leq 0.4$.

The y' representing the atomic ratio of Co is more preferably a number meeting the condition of $0.25 \leq y' \leq 0.35$.

The metal elements of Sr, La, Fe and Co in the second granular ferrite compound phase preferably have a composition represented by the general formula:

$Sr_{1-x''}La_{x''}Fe_{2n''-y''}Co_{y''}$, wherein x" and y" representing the atomic ratios of Sr, La, Fe and Co and n" representing a molar ratio are numbers meeting the conditions of $0.05 \leq x'' \leq 0.3$, $0.05 \leq y'' \leq 0.3$, and $5 \leq n'' \leq 6$.

The method of the present invention for producing a sintered ferrite magnet comprises the steps of mixing a first calcined ferrite in which the metal elements of Ca, La, (Ba+Sr), Fe and Co have a composition represented by the general formula: $Ca_{1-x'-c'}La_{x'}A_{c'}Fe_{2n'-y'}Co_{y'}$, wherein A represents (Ba+Sr), and x', c' and y' representing the atomic ratios of Ca, La, A, Fe and Co and n' representing a molar ratio are numbers meeting the conditions of $0.4 \leq x' \leq 0.6$, $0 \leq c' \leq 0.2$, $0.2 < y' \leq 0.5$, and $4 \leq n' \leq 6$, with a second calcined ferrite in which the metal elements of Sr, La, Fe and Co have a composition represented by the general formula: $Sr_{1-x''}La_{x''}Fe_{2n''-y''}Co_{y''}$, wherein x" and y" representing the atomic ratios of Sr, La, Fe and Co and n" representing a molar ratio are numbers meeting the conditions of $0.05 \leq x'' \leq 0.3$, $0.05 \leq y'' \leq 0.3$, and $5 \leq n'' \leq 6$, at a mass ratio of 90/10 to 50/50, to obtain a calcined ferrite mixture;

pulverizing the calcined ferrite mixture to obtain powder; molding the powder to obtain a green body; and sintering the green body to obtain a sintered body.

The first calcined ferrite and the second calcined ferrite are mixed preferably at a mass ratio of 80/20 to 60/40.

The y' representing the atomic ratio of Co is preferably a number meeting the condition of $0.2 < y' \leq 0.4$.

The y' representing the atomic ratio of Co is more preferably a number meeting the condition of $0.25 \leq y' \leq 0.35$.

The metal elements of Ca, La, Sr, Ba, Fe and Co in the sintered ferrite magnet preferably have a composition represented by the general formula:

$Ca_{1-x-a-b}La_xSr_aBa_bFe_{2n-y}Co_y$, wherein x, a, b and y representing the atomic ratios of Ca, La, Sr, Ba, Fe and Co and n representing a molar ratio are numbers meeting the conditions of $0.2 \leq x \leq 0.6$, $0.01 \leq a \leq 0.6$, $0 \leq b \leq 0.3$, $0.1 \leq 1-x-a-b$, $0.1 \leq y \leq 0.5$, and $3 \leq n \leq 6$.

The x and y are preferably numbers meeting the conditions of $x/y \geq 1.3$.

BRIEF DESCRIPTION OF THE DRAWINGS

FIG. 5-1 is a graph showing the relation between a mixing ratio of calcined SrLaCo ferrite and $H_{cJ}$ in the sintered ferrite magnet of Example 2.

FIG. 5-2 is another graph showing the relation between a mixing ratio of calcined SrLaCo ferrite and $H_{cJ}$ in the sintered ferrite magnet of Example 2.

FIG. 5-3 is a further graph showing the relation between a mixing ratio of calcined SrLaCo ferrite and $H_{cJ}$ in the sintered ferrite magnet of Example 2.

FIG. 6-1 is a graph showing the relation between a mixing ratio of calcined SrLaCo ferrite and $B_r$ in the sintered ferrite magnet of Example 2.

FIG. 6-2 is another graph showing the relation between a mixing ratio of calcined SrLaCo ferrite and $B_r$ in the sintered ferrite magnet of Example 2.

FIG. 6-3 is a further graph showing the relation between a mixing ratio of calcined SrLaCo ferrite and $B_r$ in the sintered ferrite magnet of Example 2.

FIG. 7-1 is a graph showing the relation between a mixing ratio of calcined SrLaCo ferrite and $H_k/H_{cJ}$ in the sintered ferrite magnet of Example 2.

FIG. 7-2 is another graph showing the relation between a mixing ratio of calcined SrLaCo ferrite and $H_k/H_{cJ}$ in the sintered ferrite magnet of Example FIG. 7-3 is a further graph showing the relation between a mixing ratio of calcined SrLaCo ferrite and $H_k/H_{cJ}$ in the sintered ferrite magnet of Example 2.

FIG. 8-1 is a graph showing the relation between a mixing ratio of calcined SrLaCo ferrite and a first Curie temperature (Tc1) in the sintered ferrite magnet of Example 2.

FIG. 8-2 is another graph showing the relation between a mixing ratio of calcined SrLaCo ferrite and a first Curie temperature (Tc1) in the sintered ferrite magnet of Example 2.

FIG. 8-3 is a further graph showing the relation between a mixing ratio of calcined SrLaCo ferrite and a first Curie temperature (Tc1) in the sintered ferrite magnet of Example 2.

FIG. 9-1 is a graph showing the relation between a mixing ratio of calcined SrLaCo ferrite and a second Curie temperature (Tc2) in the sintered ferrite magnet of Example 2.

FIG. 9-2 is another graph showing the relation between a mixing ratio of calcined SrLaCo ferrite and a second Curie temperature (Tc2) in the sintered ferrite magnet of Example 2.

FIG. 9-3 is a further graph showing the relation between a mixing ratio of calcined SrLaCo ferrite and a second Curie temperature (Tc2) in the sintered ferrite magnet of Example 2.

FIG. 18 (b) is a photograph showing the area analysis result of Sr by TEM/EDX in the sintered ferrite magnet of Example 3.

DESCRIPTION OF THE PREFERRED EMBODIMENTS

[1] Sintered Ferrite Magnet

The sintered ferrite magnet of the present invention comprises a first granular ferrite compound phase containing Ca, La, Fe and Co and having a Curie temperature Tc1 between 415° C. and 430° C., and a second granular ferrite compound phase containing Sr, La, Fe and Co and having a Curie temperature Tc2 between 437° C. and 455° C., the volume ratio of the first granular ferrite compound phase being 50-90%, and the volume ratio of the second granular ferrite compound phase being 10-50%, with their total volume ratio being 95% or more in the sintered ferrite magnet.

The sintered ferrite magnet of the present invention can be produced by mixing calcined CaLaCo ferrite and calcined SrLaCo ferrite at a mass ratio of 90/10 to 50/50, pulverizing, molding and sintering. In the present invention, the mass ratios of the calcined CaLaCo ferrite and the calcined SrLaCo ferrite which are mixed are simply represented by a mixing ratio of the calcined SrLaCo ferrite to the entire calcined body.

(1) Structure

Figure 1:
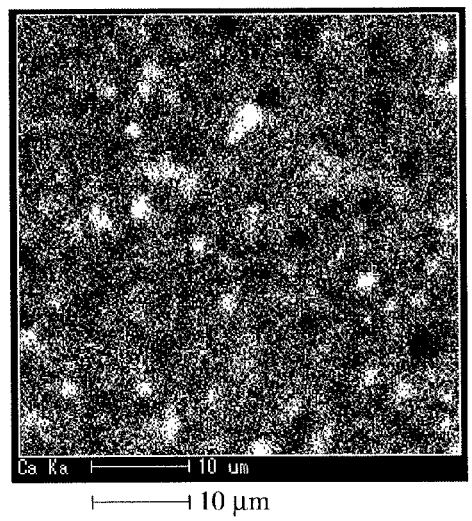
FIG. 1 is a photograph showing the area analysis result (mapping) of Ca by EPMA in the sintered ferrite magnet of the present invention.

FIG. 1 shows the area analysis result of Ca by EPMA in the sintered ferrite magnet of the present invention. The figure has three portions with different darknesses, bright portions (white portions) having the highest Ca concentration, dark portions (black portions) having the lowest Ca concentration, and intermediate portions (gray portions) having an intermediate Ca concentration.

The highest-Ca-concentration portions appear to be grain-boundary triple points, because they correspond to high-Si-concentration portions and low-Fe-concentration portions, which are separately measured, and because additives such as $CaCO_3$ and $SiO_2$, etc. added in a pulverization step for suppressing crystal grain growth and improving magnetic properties are mostly accumulated between particles (in grain boundaries), particularly in grain-boundary triple points, after sintering.

The lowest-Ca-concentration portions appear to correspond to a SrLaCo ferrite compound phase, because they correspond to separately measured, high-Sr-concentration portions.

It is considered that the intermediate-Ca-concentration portions are those other than the grain boundary phase and the SrLaCo ferrite compound phase, corresponding to a CaLaCo ferrite compound phase.

Figure 2:
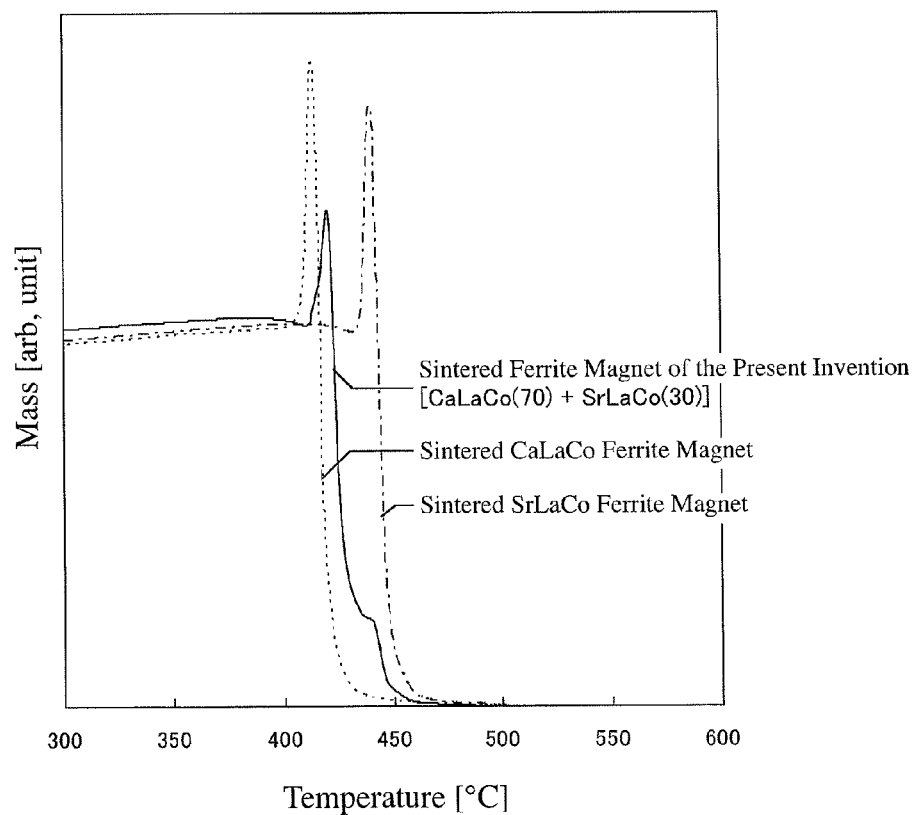
FIG. 2 is a graph showing the magnetic thermobalance measurement results of the sintered ferrite magnet of the present invention, a sintered CaLaCo ferrite magnet, and a sintered SrLaCo ferrite magnet.

FIG. 2 shows the magnetic thermobalance measurement results of a sintered CaLaCo ferrite magnet, a sintered SrLaCo ferrite magnet, and the sintered ferrite magnet of the present invention obtained by mixing calcined CaLaCo ferrite with calcined SrLaCo ferrite at a mass ratio of 70/30, and pulverizing, molding and sintering the resultant mixture. The sintered ferrite magnet of the present invention comprises at least two different compound phases comprising a compound phase having a first Curie temperature (Tc1: 423° C.), and a compound phase having a second Curie temperature (Tc2: 443° C.).

Conventionally known sintered magnets such as Sr ferrite, SrLaCo ferrite, CaLaCo ferrite, etc. are produced by mixing and calcining starting material powders of Sr, La, Fe, etc., and pulverizing, molding and sintering the calcined bodies. These ferrite compounds are formed by a solid state reaction (ferritization) in a calcining step, in which their physical properties are substantially determined. Accordingly, such physical properties are essentially kept in sintered bodies obtained through pulverizing, molding and sintering.

Because the sintered ferrite magnet of the present invention has Tc2 (443° C.) substantially equal to the Curie temperature (443° C.) of the above sintered SrLaCo ferrite magnet, it is presumed that a compound phase having the second Curie temperature (Tc2) is a compound phase containing Sr, La, Fe and Co and derived from calcined SrLaCo ferrite (second ferrite compound phase). It is also presumed that a compound phase having the first Curie temperature (Tc1) is a compound phase containing Ca, La, Fe and Co and derived from calcined CaLaCo ferrite (first ferrite compound phase).

The first ferrite compound phase has Tc1 (423° C.) slightly higher than the Curie temperature (about 415° C.) of the sintered CaLaCo ferrite magnet. As indicated by Examples below, while the Curie temperature of the second ferrite compound phase is substantially constant regardless of the mixing ratio of the calcined SrLaCo ferrite, the Curie temperature of the first ferrite compound phase tends to elevate as the mixing ratio of the calcined SrLaCo ferrite increases.

The mixing of calcined bodies provides no such change of physical properties as confirmed by an X-ray diffraction method or EPMA on the first ferrite compound phase derived from the calcined CaLaCo ferrite, except for a Curie temperature. In general, the change of a Curie temperature occurs mostly by the composition change of a compound phase; particularly the La content has large influence on the Curie temperature. However, because the Curie temperature of the second ferrite compound phase does not substantially change by the mixing ratios of both calcined bodies, there appears to be no mutual diffusion of elements between the first ferrite compound phase and the second ferrite compound phase.

Though it is not clear why changes occur in the Curie temperature of the first ferrite compound phase, it is considered that the coexistence of the first ferrite compound phase and the second ferrite compound phase keeping its physical properties in a sintered body presumably provides some changes to the first ferrite compound phase, resulting in the change of physical properties (Curie temperature). This change of physical properties has an effect of improving $H_{cJ}$ without substantially resulting in reduced $B_r$ and $H_k/H_{cJ}$.

The Curie temperature of the first ferrite compound phase elevates substantially in proportion to the mixing ratio of the calcined SrLaCo ferrite. Accordingly, the upper limit of the Curie temperature of the first ferrite compound phase is a temperature at which the mixing ratio of the calcined SrLaCo ferrite is extrapolated to 100% by mass, and this temperature is substantially equal to the Curie temperature (437° C. to 455° C.) of the sintered SrLaCo ferrite magnet. The lower limit of the Curie temperature is the Curie temperature (about 415° C.) of the sintered CaLaCo ferrite magnet. Namely, the Curie temperature of the first ferrite compound phase ranges from about 415° C. to about 455° C.

The sintered ferrite magnet of the present invention comprises 50-90% by volume of the first ferrite compound phase and 10-50% by volume of the second ferrite compound phase, and has improved $H_{cJ}$ substantially free from the reduction of $B_r$ and $H_k/H_{cJ}$ when their total volume ratio is 95% or more. With such volume ratio, the first ferrite compound phase has a Curie temperature Tc1 in a range of 415° C. to 430° C., and the second ferrite compound phase has a Curie temperature Tc2 in a range of 437° C. to 455° C. The Curie temperature Tc2 of the second ferrite compound phase is substantially determined by the composition of calcined SrLaCo ferrite. The Curie temperature Tc2 of the second ferrite compound phase is particularly 440° C. to 445° C.

As described above, in a sintered magnet obtained by mixing the calcined CaLaCo ferrite and the calcined SrLaCo ferrite at the above mass ratio, and pulverizing, molding and sintering the resultant mixture, the physical properties of the ferrite compound is determined substantially in a calcining step and essentially kept in a sintered body. Accordingly, the calcined CaLaCo ferrite essentially exists as the first ferrite compound phase, and the calcined SrLaCo ferrite as the second ferrite compound phase, at substantially the same ratio (volume ratio) as the mixing ratio (mass ratio). Namely, pulverization and sintering change the crystal grain sizes of the ferrite compound phases though not changing their proportions.

Accordingly, the sintered ferrite magnet, which is obtained by mixing the calcined CaLaCo ferrite (first calcined ferrite) and the calcined SrLaCo ferrite (second calcined ferrite) at a mass ratio of 90/10 to 50/50, and pulverizing, molding and sintering the resultant mixture, comprises 50-90% by volume of the first ferrite compound phase and 10-50% by volume of the second ferrite compound phase. The volume ratios of the first and second ferrite compound phases are more preferably 60-80% and 20-40%, respectively.

In the sintered ferrite magnet, the volume ratios of the first and second ferrite compound phases can be determined by the following three methods. These methods may be used together for higher accuracy.

(i) A method for identifying the first and second ferrite compound phases by the cross section photograph and EPMA element analysis of the sintered magnet, and determining their area ratios.

(ii) A method for obtaining the relation between the mixing ratios of two types of calcined ferrites and the composition (calculated) of the resultant calcined ferrite mixture, and determining the volume ratios from the measured composition of a sintered body.

(iii) A method for determining the volume ratios from σ-T curves measured by a vibrating sample magnetometer (VSM).

The total volume ratio of the first and second ferrite compound phases is 95% or more. Less than 5% of the remainder is a grain boundary phase mainly composed of additives, etc. added after calcining. The grain boundary phase can be confirmed by a transmission electron microscope (TEM), etc. The sintered ferrite magnet of the present invention is essentially composed of the first and second ferrite compound phases and the grain boundary phase, though trace amounts (about 5% by mass) of foreign phases such as an orthoferrite phase, a spinel phase, etc. observed by X-ray diffraction, etc., impurities, etc. may be contained. The quantitative analysis of foreign phases by X-ray diffraction can be conducted using a Rietveld refinement method.

The first ferrite compound phase in the sintered ferrite magnet preferably further comprises Ba and/or Sr. Using as the calcined CaLaCo ferrite, known calcined CaLaCo ferrites such as a calcined body in which part of Ca is substituted by La and Ba (WO 2007/060757), a calcined body in which part of Ca is substituted by La and Sr (WO 2007/077811), etc., magnetic properties can be further improved.

(2) Composition
(i) Composition of Entire Sintered Ferrite Magnet

The sintered ferrite magnet of the present invention comprises Ca, La, Sr, Ba, Fe and Co as a whole, the composition of the above metal elements being preferably represented by the general formula:

$$Ca_{1-x-a-b}La_xSr_aBa_bFe_{2n-y}Co_y,$$

wherein x, a, b, y and n are numbers meeting the conditions of $0.2 \leq x \leq 0.6$, $0.01 \leq a \leq 0.6$, $0 \leq b \leq 0.3$, $0.1 \leq 1-x-a-b$, $0.1 \leq y \leq 0.5$, and $3 \leq n \leq 6$.

x, a, b, y and n are more preferably numbers meeting the conditions of $0.3 \leq x \leq 0.5$, $0.05 \leq a \leq 0.5$, $0 \leq b \leq 0.2$, $0.2 \leq 1-x-a-b$, $0.15 \leq y \leq 0.4$, and $3.7 \leq n \leq 5.5$.

Ca is contained in the calcined CaLaCo ferrite, additives such as $CaCO_3$ added after calcining, etc. Ca derived from the calcined CaLaCo ferrite is contained in the first ferrite compound phase, and Ca derived from $CaCO_3$, etc. added after calcining is contained in a grain boundary phase, etc. The atomic ratio of Ca (hereinafter referred to as "Ca content") expressed by (1−x−a−b) is preferably 0.1 or more. When the Ca content is less than 0.1, the amounts of La, Sr and Ba are relatively high, resulting in reduced $B_r$ and $H_k/H_{cJ}$. The more preferred Ca content is 0.2 or more.

La derived from both calcined CaLaCo ferrite and calcined SrLaCo ferrite is contained in both first and second ferrite compound phases. the La content (x) is preferably in a range of 0.2-0.6. The La content of less than 0.2 or more than 0.6 provides reduced $B_r$ and $H_k/H_{cJ}$. The more preferred La content is in a range of 0.3-0.5.

Sr is an element essentially derived from the calcined SrLaCo ferrite, and contained in the second ferrite compound phase. When Sr-containing, calcined CaLaCo ferrite is used, this Sr is contained in the first ferrite compound phase. The Sr content (a) is preferably in a range of 0.01-0.6. The Sr content of less than 0.01 fails to improve $H_{cJ}$, and the Sr content exceeding 0.6 reduces $B_r$ and $H_k/H_{cJ}$. The more preferred Sr content is in a range of 0.05-0.5.

Ba essentially derived from the Ba-containing, calcined CaLaCo ferrite is contained in the first ferrite compound phase. The Ba content (b) is preferably 0.3 or less. The Ba content exceeding 0.3 reduces $H_{cJ}$, $B_r$ and $H_k/H_{cJ}$. The more preferred Ba content range is 0.2 or less. Because Ba is contained as an impurity in starting material powder for Sr, Ba is likely contained in the calcined SrLaCo ferrite in a trace amount.

Co derived from both calcined CaLaCo ferrite and calcined SrLaCo ferrite is contained in both first and second ferrite compound phases. The Co content (y) is preferably in a range of 0.1-0.5. The Co content of less than 0.1 reduces $H_{cJ}$, $B_r$ and $H_k/H_{cJ}$, and the Co content exceeding 0.5 contributes to the formation of a foreign phase containing a large amount of Co (Co spinel phase), resulting in reduced $H_{cJ}$, $B_r$ and $H_k/H_{cJ}$. The more preferred Co content is in a range of 0.15-0.4.

"n" represents a molar ratio of (Fe+Co) to (Ca+La+Sr+Ba), which is expressed by 2n=(Fe+Co)/(Ca+La+Sr+Ba). n is preferably 3-6. n of less than 3 or more than 6 undesirably reduces $H_{cJ}$, $B_r$ and $H_k/H_{cJ}$. The more preferred range of n is 3.7-5.5.

To further improve $H_{cJ}$, $B_r$ and $H_k/H_{cJ}$, a ratio (x/y) of the La content to the Co content is preferably 1.3 or more.

In the production of sintered ferrite magnets, a sintering aid such as $SiO_2$, $CaCO_3$, etc. is generally added to form a liquid phase during sintering, thereby accelerating the sintering. Most of the added $SiO_2$, $CaCO_3$, etc. form a grain boundary phase between ferrite compound phases. The sintered ferrite magnets of the present invention include sintered ferrite magnets containing such sintering aids. When a sintering aid such as $SiO_2$, $CaCO_3$, etc. is added, the Ca content increases, and the proportions of other elements relatively decrease by the addition of Si. The above-described composition is set, taking into consideration composition change by the addition of such sintering aid.

The sintered ferrite magnet has a composition including O (oxygen), which is represented by the general formula:

wherein x, a, b and y representing the atomic ratios of Ca, La, Sr, Ba, Fe and Co, and n representing a molar ratio are numbers meeting the conditions of $0.2 \leq x \leq 0.6$, $0.01 \leq a \leq 0.6$, $0 \leq b \leq 0.3$, $0.1 \leq 1-x-a-b$, $0.1 \leq y \leq 0.5$, and $3 \leq n \leq 6$; La and Fe are trivalent, Co is bivalent, and α=19 at a stoichiometric composition ratio in which x=y, and n=6.

In the composition including 0 (oxygen) of the sintered ferrite magnet, the molar ratio of oxygen differs depending on the valences of Fe and Co and the value of n. A ratio of oxygen to metal elements also differs depending on oxygen vacancy when sintered in a reducing atmosphere, the valence change of Fe and Co in ferrite compound phases, etc. As a result, an actual molar ratio α of oxygen may deviate from 19. Accordingly, the present invention uses the most easily definable metal element composition. The same is true of the compositions of ferrite compound phases and calcined ferrites described below.

(ii) Composition of First Ferrite Compound Phase

The first ferrite compound phase preferably has a metal element composition containing Ca, La, (Ba+Sr), Fe and Co, which is represented by the general formula:

wherein A represents (Ba+Sr), and x', c', y' and n' are numbers meeting the conditions of $0.4 \leq x' \leq 0.6$, $0 \leq c' \leq 0.2$, $0.2 < y' \leq 0.5$, and $4 \leq n' \leq 6$.

To further improve $H_{cJ}$, $B_r$ and $H_k/H_{cJ}$, the Co content y' is more preferably in a range of $0.2<y' \leq 0.4$, most preferably in a range of $0.25 \leq y' \leq 0.35$.

In the first ferrite compound phase, a ratio x'/y' of La to Co is preferably 1.3 or more to further improve $H_{cJ}$, $B_r$ and $H_k/H_{cJ}$.

As described above, the first ferrite compound phase is derived from the calcined CaLaCo ferrite, essentially maintaining the composition of the calcined CaLaCo ferrite. Accordingly, the above composition of the first ferrite compound phase is substantially the same as that of the calcined CaLaCo ferrite. Thus, reasons for limiting the composition ranges of the first ferrite compound phase are valid for the calcined CaLaCo ferrite described below.

(iii) Composition of Second Ferrite Compound Phase

In the sintered ferrite magnet of the present invention, the second ferrite compound phase preferably has a metal element composition containing Sr, La, Fe and Co, which is represented by the general formula:

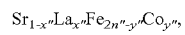

wherein x", y" and n" are numbers meeting the conditions of $0.05 \leq x'' \leq 0.3$, $0.05 \leq y'' \leq 0.3$, and $5 \leq n'' \leq 6$.

As described above, the second ferrite compound phase is derived from the calcined SrLaCo ferrite, essentially maintaining the composition of the calcined SrLaCo ferrite. Accordingly, the above composition of the second ferrite compound phase is substantially the same as that of the calcined SrLaCo ferrite. Thus, reasons for limiting the composition of the second ferrite compound phase are valid for the calcined SrLaCo ferrite described below.

(3) Others

The term "ferrite" used herein generally means compounds comprising oxides of bivalent metal cations and trivalent iron oxides.

The sintered ferrite magnet of the present invention has a hexagonal, M-type magnetoplumbite structure. The first and second ferrite compound phases also have a hexagonal, M-type magnetoplumbite structure. Further, the calcined CaLaCo ferrite from which the first ferrite compound phase is derived, and the calcined SrLaCo ferrite from which the second ferrite compound phase is derived also have a hexagonal, M-type magnetoplumbite structure.

The term "having hexagonal, M-type magnetoplumbite structure" means that only X-ray diffraction patterns of a hexagonal, M-type magnetoplumbite structure are observed in an X-ray diffraction measurement under usual conditions. Namely, the sintered ferrite magnet, the compound phases and the calcined bodies have a substantially single, hexagonal, M-type magnetoplumbite structure, though fine crystal grain boundaries and impurities not appearing in X-ray diffraction patterns may be contained.

[2] Production Method of Sintered Ferrite Magnet

The sintered ferrite magnet of the present invention is produced by mixing the calcined CaLaCo ferrite and the calcined SrLaCo ferrite at a mass ratio of 90/10 to 50/50, and pulverizing, molding and sintering the resultant mixture.

Usable as the calcined CaLaCo ferrite are those described in Japanese Patent 3,181,559, JP 2006-104050 A, WO 2007/060757, WO 2007/077811, etc., and usable as the calcined SrLaCo ferrite are those described in JP 10-149910 A, JP 11-154604 A, JP 11-195516 A, etc.

(1) Compositions of Calcined Ferrites

The calcined CaLaCo ferrite preferably has a metal element composition containing Ca, La, (Ba+Sr), Fe and Co, which is represented by the general formula:

$$Ca_{1-x'-c'}La_{x'}A_{c'}Fe_{2n'-y'}Co_{y'},$$

wherein A represents (Ba+Sr), and x', c', y' and n' are numbers meeting the conditions of $$0.4 \leq x' \leq 0.6,$$

$$0 \leq c' \leq 0.2,$$

$$0.2 < y' \leq 0.5, \text{ and}$$

$$4 \leq n' \leq 6.$$

The Ca content (1−x'−c') is in a range of 0.2-0.6, from the La content (x') and the content (c') of the element A (Ba+Sr) described below. The Ca content of less than 0.2 makes the amounts of La and the element A relatively high, resulting in reduced $B_r$ and $H_k/H_{cJ}$. The Ca content exceeding 0.6 makes the amounts of La and the element A relatively low, resulting in reduced $B_r$ and $H_k/H_{cJ}$.

The La content (x') is preferably in a range of 0.4-0.6. The La content of less than 0.4 or more than 0.6 reduces $B_r$ and $H_k/H_{cJ}$. Other rare earth elements than La may exist as inevitable impurities.

The element A is Ba and/or Sr. The element A content (c') is preferably 0.2 or less. Though the effects of the present invention are obtained without the element A, the addition of the element A makes crystals finer and their aspect ratios smaller in the calcined body, providing the sintered ferrite magnet with further improved $H_{cJ}$.

The Co content y' is preferably in a range of $0.2 < y' \leq 0.5$. The Co content of 0.2 or less fails to improve magnetic properties, and the Co content of more than 0.5 forms foreign phases (Co spinel phase) containing a large amount of Co, resulting in reduced $H_{cJ}$, $B_r$ and $H_k/H_{cJ}$. The Co content is more preferably in a range of $0.2 < y' \leq 0.4$, most preferably in a range of $0.25 \leq y' \leq 0.35$.

"n" represents a molar ratio of (Fe+Co) to (Ca+La+A), which is expressed by 2n=(Fe+Co)/(Ca+La+A). n is preferably 4-6. n of less than 4 increases the proportions of non-magnetic portions, making calcined particles too flat, and drastically reducing $H_{cJ}$. When n exceeds 6, unreacted α-Fe$_2$O$_3$ remains in the calcined body, resulting in reduced $H_{cJ}$, $B_r$ and $H_k/H_{cJ}$.

To further improve $H_{cJ}$, $B_r$ and $H_k/H_{cJ}$, the calcined CaLaCo ferrite preferably has a La/Co ratio x'/y' of 1.3 or more. When the La content>the Co content>the element A content, namely, x'>y'>c', highly improved magnetic properties are obtained. Also, when the Ca content>the element A content, namely, 1−x'−c'>c', high magnetic properties are obtained.

The calcined SrLaCo ferrite preferably has a metal element composition containing Sr, La, Fe and Co, which is represented by the general formula:

$$Sr_{1-x''}La_{x''}Fe_{2n''-y''}Co_{y''},$$

wherein x", y" and n" are numbers meeting the conditions of $$0.05 \leq x'' \leq 0.3,$$

$$0.05 \leq y'' \leq 0.3, \text{ and}$$

$$5 \leq n'' \leq 6.$$

The Sr content (1−x") is in a range of 0.7-0.95, from the La content (x") described below. The Sr content of less than 0.7 makes the La content relatively higher, resulting in reduced $B_r$ and $H_k/H_{cJ}$. The Sr content exceeding 0.95 makes the La content relatively lower, resulting in reduced $B_r$ and $H_k/H_{cJ}$.

The La content (x") is preferably in a range of 0.05-0.3. The La content of less than 0.05 or more than 0.3 reduces $B_r$ and $H_k/H_{cJ}$. Other rare earth elements than La may exist as inevitable impurities.

The Co content (y") is preferably in a range of 0.05-0.3. The Co content of less than 0.05 fails to improve magnetic properties. The Co content exceeding 0.3 contributes to the formation of foreign phases (Co spinel phase) containing a large amount of Co, resulting in reduced $H_{cJ}$, $B_r$ and $H_k/H_{cJ}$.

"n" represents a molar ratio of (Fe+Co) to (Sr+La), which is expressed by 2n=(Fe+Co)/(Sr+La). n is preferably 5-6. n of less than 5 increases the proportions of non-magnetic portions, drastically reducing $H_{cJ}$. When n exceeds 6, unreacted α-Fe$_2$O$_3$ remains in the calcined body, resulting in reduced $H_{cJ}$, $B_r$ and $H_k/H_{cJ}$.

In the production method of the sintered ferrite magnet of the present invention, the calcined CaLaCo ferrite and the calcined SrLaCo ferrite are mixed at a mass ratio of 90/10 to 50/50. The calcined SrLaCo ferrite mixing ratio of less than 10% or more than 50% fails to improve $H_{cJ}$. The more preferred mixing ratio of the calcined SrLaCo is 80/20 to 60/40.

(2) Preparation of Calcined Ferrite

The calcined CaLaCo ferrite and the calcined SrLaCo ferrite can be prepared by methods described in the above references. Preferred preparation steps will be explained below.

Starting material powders such as Ca compounds, La compounds, Ba compounds, Sr compounds, iron compounds, Co compounds, etc. are mixed in preferred ranges based on the above composition formulae. The starting material powders may be in the form of oxides and carbonates as well as hydroxides, nitrates, chlorides, etc. regardless of their valences, and they may be in the form of solutions. Specifically, the Ca compounds are carbonates, oxides, chlorides, etc. of Ca. The La compounds are oxides such as $La_2O_3$, hydroxides such as $La(OH)_3$, carbonates such as $La_2(CO_3)_3.8H_2O$, etc. The element A compounds are carbonates, oxides, chlorides, etc. of Ba and/or Sr. The iron compounds are iron oxide, iron hydroxide, iron chloride, mill scales, etc. The Co compounds are oxides such as CoO and $Co_3O_4$, hydroxides such as CoOOH, $Co(OH)_2$, $Co_3O_4.m_1H_2O$ ($m_1$ is a positive number), carbonates such as $CoCO_3$, and basic carbonates such as $m_2CoCO_3.m_3Co(OH)_2.m_4H_2O$ ($m_2$, $m_3$, $m_4$ are positive numbers), etc.

In the preparation of the calcined CaLaCo ferrite, all starting material powders such as Ca compounds, iron compounds, Co compounds, La compounds, etc. may be added at the time of mixing, and then calcined. Alternatively, part of the starting material powders may be added after calcining. For example, $CaCO_3$, $Fe_2O_3$, part of $La(OH)_3$ and part of $Co_3O_4$ may be mixed and calcined to prepare a calcined body, and remaining $La(OH)_3$ and $Co_3O_4$ may be added when the calcined body is mixed with the calcined SrLaCo ferrite as described later, and then pulverized, molded and sintered. At the time of calcining, compounds including $B_2O_3$, $H_3BO_3$, etc. may be added, if necessary, to accelerate the reaction.

The addition of $H_3BO_3$ is effective to improve $H_{cJ}$ and $B_r$. The amount of $H_3BO_3$ added is preferably 0.3% or less by mass based on 100% by mass of the mixed powder or the calcined body. The most preferred amount of $H_3BO_3$ added is about 0.2% by mass. The $H_3BO_3$ amount of less than 0.1% by mass fails to improve $B_r$, and the $H_3BO_3$ amount of more than 0.3% by mass reduces $B_r$. Because $H_3BO_3$ has a function of controlling the shapes and sizes of crystal grains during sintering, it may be added after calcining (before fine pulverization or before sintering), or both before calcining and after calcining, to exhibit such effects.

In the preparation of the calcined SrLaCo ferrite, all starting material powders such as Sr compounds, iron compounds, Co compounds, La compounds, etc. may be added at the time of mixing, and then calcined. Alternatively, part of them may be added after calcining. For example, $SrCO_3$, $Fe_2O_3$, part of $La(OH)_3$ and part of $Co_3O_4$ may be mixed and calcined to prepare a calcined body, and remaining $La(OH)_3$ and $Co_3O_4$ may be added when the calcined body is mixed with the calcined CaLaCo ferrite as described below, and then pulverized, molded and sintered.

The starting material powders may be mixed by a wet or dry method. Uniform mixing can be conducted by stirring the starting material powders with media such as steel balls, etc. In the wet-mixing, water is used as a solvent. Known dispersants such as ammonium polycarboxylates, calcium gluconate, etc. may be used to improve the dispersibility of the starting material powder. A slurry of mixed starting materials is deprived of water to prepare a mixed starting material powder.

The mixed starting material powder is heated in an electric furnace, a gas furnace, etc., to cause a solid state reaction, forming a hexagonal, M-type magnetoplumbite ferrite compound. This process is called "calcining," and the resultant compound is called "calcined body."

The calcining step is preferably conducted in an atmosphere having an oxygen concentration of 5% or more. With the oxygen concentration of less than 5%, the solid state reaction does not easily proceed. The more preferred oxygen concentration is 20% or more.

In the calcining step, a ferrite phase is formed by the solid state reaction as the temperature is elevated, and the reaction is completed at about 1100° C. At this temperature or lower, unreacted hematite (iron oxide) remains, resulting in low magnetic properties. To exhibit the effects of the present invention sufficiently, calcining is conducted preferably at a temperature of 1100° C. or higher. On the other hand, when the calcining temperature exceeds 1450° C., crystal grains grow too much, resulting in such inconvenience that pulverization takes too much time, etc. Accordingly, the calcining temperature is preferably 1100° C. to 1450° C., more preferably 1200° C. to 1350° C. The calcining time is preferably 0.5-5 hours. When $H_3BO_3$ is added before calcining, calcining is conducted preferably at 1100° C. to 1300° C. because of accelerated reaction.

(3) Mixing Step of Calcined Ferrites

The calcined CaLaCo ferrite and the calcined SrLaCo ferrite obtained in the above preparation steps are mixed at a mass ratio of 90/10 to 50/50 to obtain a calcined ferrite mixture. Mixing may be conducted by known methods. For example, mixing can be conducted by producing the sintered CaLaCo ferrite magnet in a facility (line) in which the sintered SrLaCo ferrite magnet is produced, utilizing so-called "contamination." In this case, it is preferable to know in advance how much contamination occurs at which step. This is an effective means, when the sintered SrLaCo ferrite magnet and the sintered CaLaCo ferrite magnet cannot be produced in different facilities (production lines).

In the mixing step, additives such as $CaCO_3$, $SiO_2$, etc. are preferably added to the mixed calcined ferrite, to suppress crystal grain growth and improve magnetic properties. The additives preferably comprise 1.8% or less by mass of $SiO_2$, and 2% or less by mass (as CaO) of $CaCO_3$, based on 100% by mass of the calcined body.

$SiO_2$ is most preferably added to the calcined body before the pulverization step, but part of it may be added in the step of mixing starting material powders before the calcining step. The addition of $SiO_2$ before calcining makes it possible to control crystal grains during calcining.

(4) Pulverization Step of Calcined Ferrite Mixture

The calcined ferrite mixture is pulverized by a vibration mill, a ball mill and/or an attritor to form the pulverized powder. The pulverized powder preferably has an average particle size of about 0.4-0.8 μm (measured by an air permeability method). The pulverization may be either dry or wet pulverization, though their combination is preferable.

Aqueous solvents such as water, etc. and various non-aqueous solvents (for example, organic solvents such as acetone, ethanol, xylene, etc.) may be used in the wet pulverization. The wet pulverization mixes the calcined body with a solvent to form slurry. The slurry preferably contains known dispersant and surfactant at a solid ratio of 0.2-2% by mass based on 100% by mass of the calcined body. After the wet pulverization, the slurry is preferably concentrated and kneaded.

In the pulverization step, additives such as $Cr_2O_3$, $Al_2O_3$, etc. may be added, in addition to $CaCO_3$ and $SiO_2$ described above, to the calcined body to improve magnetic properties. The amounts of these additives are preferably such that $Cr_2O_3$ is 5% or less by mass, and $Al_2O_3$ is 5% or less by mass, based on 100% by mass of the calcined body.

(5) Molding Step

The slurry is press-molded with or without a magnetic field, while removing the solvent. Press-molding in a magnetic field can align crystal orientations of powder particles, thereby dramatically improving magnetic properties. To improve the orientation, 0.01-1% by mass of a dispersant and/or a lubricant may be added to 100% by mass of the calcined body. Before molding, the slurry may be concentrated, if necessary, by centrifugal separation, filter pressing, etc.

(6) Sintering Step

A green body obtained by press-molding is degreased, if necessary, and then sintered. The sintering is conducted in an electric furnace, a gas furnace, etc.

The sintering is conducted preferably in an atmosphere having an oxygen concentration of 10% or more. When the oxygen concentration is less than 10%, abnormal grain growth and the formation of foreign phases occur, resulting in deteriorated magnetic properties. The oxygen concentration is more preferably 20% or more, most preferably 100%.

The sintering temperature is preferably 1150° C. to 1250° C., and the sintering time is preferably 0.5-2 hours. The resultant sintered magnet has an average crystal grain size of about 0.5-2 μm.

After the sintering step, known steps such as a machining step, a washing step, an inspection step, etc. are conducted to provide the finished sintered ferrite magnet.

The present invention will be explained in further detail referring to Examples, without intention of restricting the present invention thereto.

EXAMPLE 1

Preparation of Calcined CaLaCo Ferrite $CaCO_3$ powder, $La(OH)_3$ powder, $Fe_2O_3$ powder and $Co_3O_4$ powder were mixed to have a composition represented by $Ca_{1-x'-c}La_{x'}A_cFe_{2n'-y'}Co_{y'}$, wherein x'=0.5, c'=0, y'=0.3 and n'=5.2, and 100% by mass of the resultant mixed powder was mixed with 0.1% by mass of $H_3BO_3$ to obtain a mixed starting material powder. With water added, this mixed starting material powder was wet-ball-milled for 4 hours, dried, granulated, and calcined at 1250° C. for 3 hours in the air. The resultant calcined body was coarsely pulverized by a hummer mill to prepare coarse powder of calcined CaLaCo ferrite.

Preparation of Calcined SrLaCo Ferrite $SrCO_3$ powder, $La(OH)_3$ powder, $Fe_2O_3$ powder and $Co_3O_4$ powder were mixed to have a composition represented by $Sr_{1-x''}La_{x''}Fe_{2n''-y''}Co_{y''}$, wherein x''=0.2, y''=0.2, and n''=5.8, and 100% by mass of the resultant mixed powder was mixed with 0.1% by mass of $H_3BO_3$ to obtain a mixed starting material powder. With water added, this mixed starting material powder was wet-ball-milled for 4 hours, dried, granulated, and calcined at 1250° C. for 3 hours in the air. The resultant calcined body was coarsely pulverized by a hummer mill to prepare coarse powder of calcined SrLaCo ferrite.

Production of Sintered Ferrite Magnet

The calcined CaLaCo ferrite and the calcined SrLaCo ferrite were mixed at a mass ratio of 70/30, and 100% by mass of the resultant calcined ferrite mixture was mixed with 0.6% by mass of $SiO_2$ powder and 0.7% (as CaO) of $CaCO_3$ powder, and wet-ball-milled with water to conduct fine pulverization to an average particle size (measured by an air permeability method) of 0.6 μm, resulting in a slurry. This fine powder slurry was molded under pressure of about 50 MPa in a magnetic field of about 1 T in parallel to a compression direction, while removing water. The resultant green body was sintered at 1200° C. for 1 hour in the air to obtain a sintered ferrite magnet.

Area Analysis of Each Element in Sintered Ferrite Magnet

The area analysis of each element in the resultant sintered ferrite magnet was conducted by EPMA (EPMA-1610 available from Shimadzu Corp.) under the conditions of acceleration voltage of 15 kV, beam current of 30 nA, and irradiation time of 3 msec/point. The concentration distributions of Sr, Ca, La, Si, Co, Fe and O (oxygen) are shown in FIGS. 3(a) to 3(g).

Figure 3A:
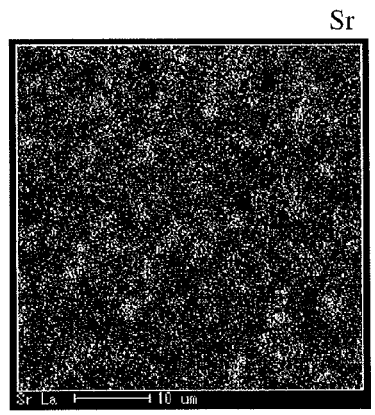
FIG. 3(a) is a photograph showing the area analysis result of Sr by EPMA in the sintered ferrite magnet of Example 1.
Figure 3B:
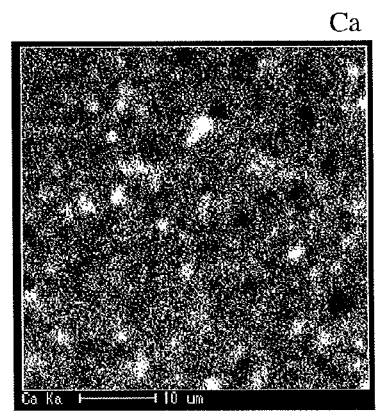
FIG. 3(b) is a photograph showing the area analysis result of Ca by EPMA in the sintered ferrite magnet of Example 1.
Figure 3C:
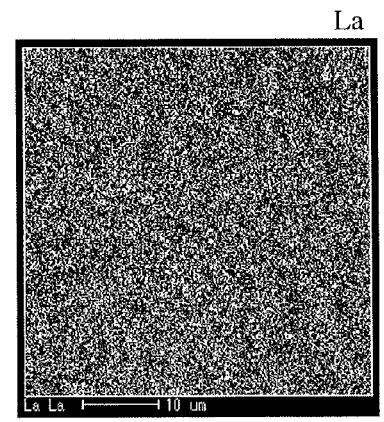
FIG. 3(c) is a photograph showing the area analysis result of La by EPMA in the sintered ferrite magnet of Example 1.
Figure 3D:
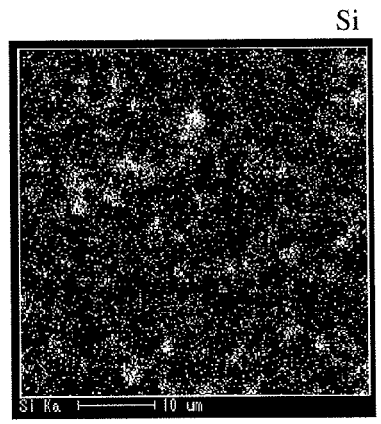
FIG. 3(d) is a photograph showing the area analysis result of Si by EPMA in the sintered ferrite magnet of Example 1.
Figure 3E:
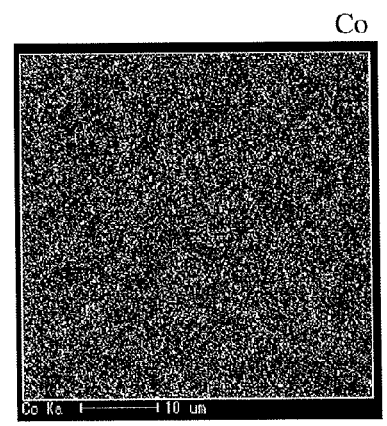
FIG. 3(e) is a photograph showing the area analysis result of Co by EPMA in the sintered ferrite magnet of Example 1.
Figure 3F:
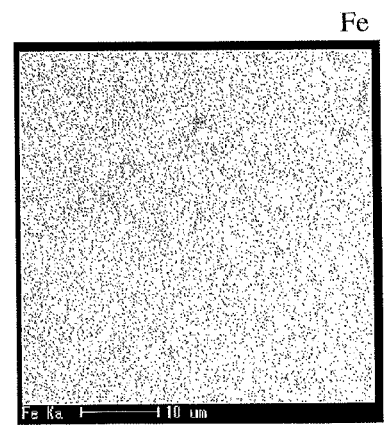
FIG. 3(f) is a photograph showing the area analysis result of Fe by EPMA in the sintered ferrite magnet of Example 1.
Figure 3G:
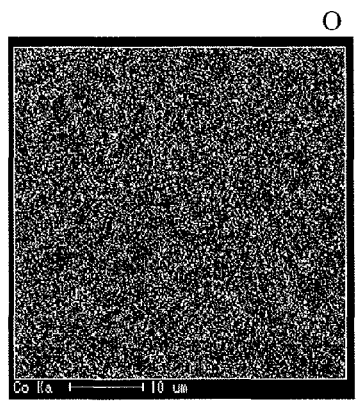
FIG. 3(g) is a photograph showing the area analysis result of O by EPMA in the sintered ferrite magnet of Example 1.
Figure 3H:
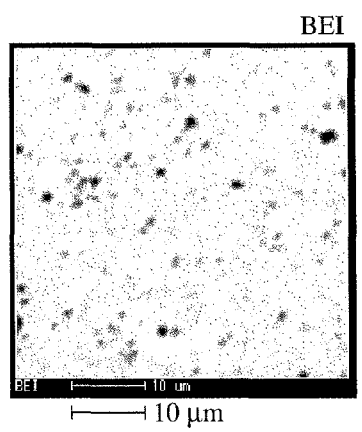
FIG. 3(h) is a photograph showing the backscattered electron image by EPMA of the sintered ferrite magnet of Example 1.

FIGS. 3(a) to 3(g) show the concentration distributions of Sr, Ca, La, Si, Co, Fe and O (oxygen) in the same field, and FIG. 3(h) shows a backscattered electron image in the same field. In each monochrome image of FIGS. 3(a) to 3(g), the concentration of an element concerned is highest in bright portions (white portions), the lowest in black portions, and intermediate in intermediate-brightness portions (gray portions).

It is clear from FIG. 3(b) showing the concentration distribution of Ca that the field is mostly composed of three portions, white granular portions (portions A having the highest Ca concentration), gray granular portions (portions B having a high Ca concentration), and black granular portions (portions C having the lowest Ca concentration).

In the portions A having the highest Ca concentration, the Si concentration is high [see FIG. 3(d)], while the Fe concentration is low. Thus, the portions A are considered to be grain boundaries (particularly grain-boundary triple points) derived from $SiO_2$ powder and $CaCO_3$ powder added to the calcined mixture before sintering.

The high-Ca-concentration portions B are distributed in the form of particles, and have high concentrations of La, Co and Fe, constituting gray portions without black portions [see FIGS. 3(c), 3(e) and 3(f)], indicating that Ca, La, Co, Fe are contained in the high-Ca-concentration portions. Thus, the high-Ca-concentration portions B are identified as the first granular ferrite compound phase derived from the calcined CaLaCo ferrite.

The low-Ca-concentration portions C are also distributed in the form of particles, and have a high Sr concentration [see FIG. 3(a)], and high concentrations of La, Co and Fe [see FIGS. 3(c), 3(e) and 3(f)]. Because the portions C are gray without black portions, they are identified as the second granular ferrite compound phase derived from the calcined SrLaCo ferrite.

It has thus been found that the sintered ferrite magnet of the present invention comprises a granular ferrite compound phase containing Ca, La, Fe and Co (called "first ferrite compound phase"), and a granular ferrite compound phase containing Sr, La, Fe and Co (called "second ferrite compound phase").

Measurement of Curie Temperature

Figure 21:
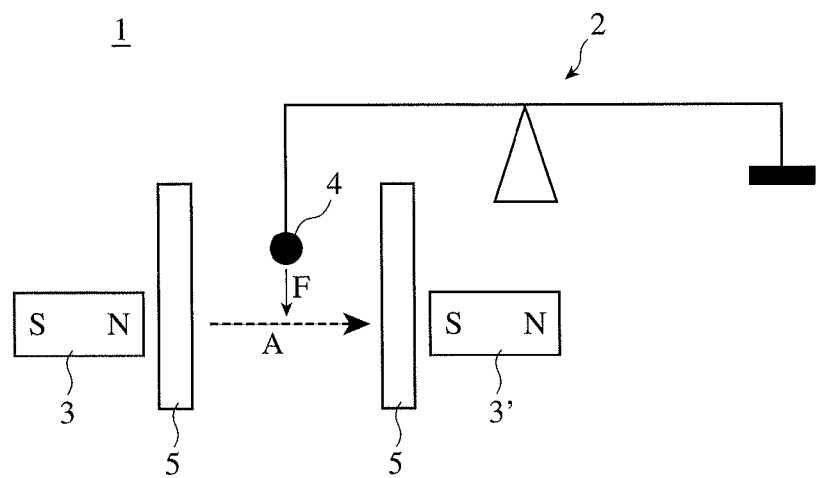
FIG. 21 is a schematic view showing one example of magnetic thermobalances.

Using a magnetic thermobalance, the sintered ferrite magnet, the sintered CaLaCo ferrite magnet and the sintered SrLaCo ferrite magnet were heated from room temperature to 500° C. at a speed of 20° C./min to obtain their TG curves. As shown in FIG. 21, a magnetic thermobalance 1 comprises a thermogravimeter 2 (TGA/SDTA 851e available from Mettler Toledo), and permanent magnets 3,3', to detect a magnetic attraction force F that a magnetic field A of 10-15 mT acts onto a ferromagnetic phase in a sample 4, as a TG value (weight). While heating the sample 4 by a heat source 5, TG is measured to detect a temperature at which a magnetic attraction force disappears by change from ferromagnetism to paramagnetism, thereby determining the Curie temperature of a ferromagnetic phase in the sample 4. Because the changes of a phase and a structure due to a chemical reaction do not occur in the above temperature range in the sintered ferrite magnet of the present invention, the Curie temperatures of ferromagnetic phases, only the first and second ferrite compound phases, in the sample can be determined.

The sintered CaLaCo ferrite magnet and the sintered SrLaCo ferrite magnet were produced from the calcined CaLaCo ferrite and the calcined SrLaCo ferrite, respectively, through pulverizing, molding and sintering, by the same method as for the sintered ferrite magnet of the present invention. The resultant TG curves are shown in FIG. 2.

Figure 4:
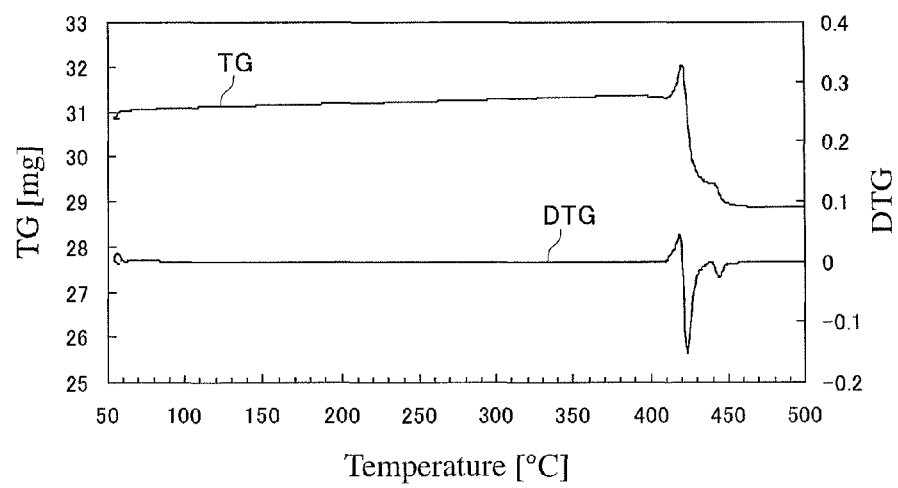
FIG. 4 is a graph showing the magnetic thermobalance measurement result of the sintered ferrite magnet of Example 1 and its differential data.

FIG. 4 shows the TG curve of the sintered ferrite magnet of the present invention and its differential (DTG) curve. A temperature at which the DTG curve has a negative peak, namely, at which the TG curve has the maximum TG reduction, was defined as a Curie temperature. A first-appearing peak (lower-temperature-side peak) was regarded as the first Curie temperature (Tc1), and a second-appearing peak (higher-temperature-side peak) was regarded as the second Curie temperature (Tc2).

It is clear from FIGS. 2 and 4 that the sintered ferrite magnet of the present invention have at least two different Curie temperatures, a first Curie temperature (Tc1) of about 423° C., and a second Curie temperature (Tc2) of about 443° C. It is thus presumed that the sintered ferrite magnet of the present invention comprises at least two compound phases having different Curie temperatures.

Because the sintered CaLaCo ferrite magnet and the sintered SrLaCo ferrite magnet have Curie temperatures of about 415° C. and about 443° C., respectively, it was found that the second Curie temperature (443° C.) of the sintered ferrite magnet of the present invention was substantially the same as the Curie temperature (443° C.) of the sintered SrLaCo ferrite magnet. It is thus presumed that a compound phase having the second Curie temperature (Tc2) is the second ferrite compound phase containing Sr, La, Fe and Co and derived from the calcined SrLaCo ferrite, which was identified by EPMA.

It is thus considered that a compound phase having the first Curie temperature (Tc1) is the first granular ferrite compound phase containing Ca, La, Fe and Co and derived from the calcined CaLaCo ferrite, which was identified by element analysis by EPMA.

The Curie temperature (423° C.) of the first ferrite compound phase derived from the calcined CaLaCo ferrite is slightly higher than the Curie temperature (about 415° C.) of the sintered CaLaCo ferrite magnet. As described in Examples below, the Curie temperature of the second ferrite compound phase derived from the calcined SrLaCo ferrite is substantially constant regardless of a mixing ratio of the calcined SrLaCo ferrite, while the Curie temperature of the first ferrite compound phase tends to elevate as a mixing ratio of the calcined SrLaCo ferrite to the calcined CaLaCo ferrite increases.

Volume Ratios of First and Second Ferrite Compound Phases

In the Sr concentration distribution shown in FIG. 3(a), white portions (high-Sr-concentration portions) are filled with circles having diameters corresponding to the average crystal grain size (about 1.5 μm, calculated from the TEM/EDX results described below) of the sintered body, and the volume ratio of the second granular ferrite compound phase was determined from the total area of the filling circles.

As a result, the volume ratio of the second granular ferrite compound phase was 26.2%. Likewise, the volume ratio of the grain boundary phase determined from the concentration distribution of Ca [FIG. 3(b)] and the concentration distribution of Si [FIG. 3(d)] was 1.7%. The volume ratio of the first granular ferrite compound phase substantially constituting the balance was 72.1%.

Because of unclear boundaries of adjacent particles, the EPMA area analysis data may include ambient information. Accordingly, the volume ratios determined by this method are likely to contain errors to some extent. Higher-accuracy results can be obtained by increasing the number of samples measured, the use of an image analyzer for analysis, etc.

However, because the volume ratio of the first granular ferrite compound phase to the second granular ferrite compound phase is substantially 70/30 in the sintered magnet of Example 1 obtained by mixing the calcined CaLaCo ferrite and the calcined SrLaCo ferrite at a mass ratio of 70/30, the above results obtained by EPMA substantially reflects this volume ratio, indicating that the volume ratios of compound phases in the sintered magnet reflect the mass ratios of the calcined ferrites mixed.

EXAMPLE 2

Preparation of Calcined CaLaCo Ferrite $CaCO_3$ powder, $La(OH)_3$ powder, $Fe_2O_3$ powder and $Co_3O_4$ powder were mixed to have compositions represented by $Ca_{1-x'-c'}La_{x'}A_{c'}Fe_{2n'-y'}Co_{y'}$ (c'=0), wherein 1-x'-c', x', y' and n' were numbers shown in Table 1-1. 100% by mass of each resultant mixed powder was mixed with 0.1% by mass of $H_3BO_3$ to obtain a mixed starting material powder. With water added, each mixed starting material powder was wet-ball-milled for 4 hours, dried, granulated, and calcined at 1250° C. for 3 hours in the air. Each calcined body was coarsely pulverized by a hummer mill to prepare coarse powder of calcined CaLaCo ferrite having each composition of C-1 to C-5.

TABLE 1-1

| Calcined Body | Composition of Calcined CaLaCo Ferrite $Ca_{1-x'-c'}La_{x'}A_{c'}Fe_{2n'-y'}Co_{y'}$ | | | | |
|---|---|---|---|---|---|
| | 1-x'-c' | x' | c' | y' | n' |
| C-1 | 0.50 | 0.50 | 0 | 0.30 | 5.20 |
| C-2 | 0.49 | 0.51 | 0 | 0.35 | 5.30 |
| C-3 | 0.40 | 0.60 | 0 | 0.40 | 5.30 |
| C-4 | 0.50 | 0.50 | 0 | 0.25 | 5.20 |
| C-5 | 0.50 | 0.50 | 0 | 0.275 | 5.20 |
| C-6 | 0.45 | 0.50 | 0.05[1] | 0.30 | 5.30 |
| C-7 | 0.45 | 0.50 | 0.05[2] | 0.30 | 5.30 |

Note:
[1] Ba was used as the element A.
[2] Sr was used as the element A.

Preparation of Calcined SrLaCo Ferrite $SrCO_3$ powder, $La(OH)_3$ powder, $Fe_2O_3$ powder and $Co_3O_4$ powder were mixed to have compositions represented by $Sr_{1-x''}La_{x''}Fe_{2n''-y''}Co_{y''}$, wherein 1-x", x", y" and n" were numbers shown in Table 1-2, and 100% by mass of each resultant mixed powder was mixed with 0.1% by mass of $H_3BO_3$ to obtain a mixed starting material powder. With water added, each mixed starting material powder was wet-ball-milled for 4 hours, dried, granulated, and calcined at 1250° C. for 3 hours in the air. Each calcined body was coarsely pulverized by a hummer mill to prepare coarse powder of calcined SrLaCo ferrite having each composition of S-1 to S-10.

TABLE 1-2

| Calcined Body | Composition of Calcined SrLaCo Ferrite $Sr_{1-x''}La_{x''}Fe_{2n-y''}Co_{y''}$ | | | |
|---|---|---|---|---|
| | 1−x″ | x″ | y″ | n″ |
| S-1 | 0.80 | 0.20 | 0.10 | 5.8 |
| S-2 | 0.80 | 0.20 | 0.15 | 5.8 |
| S-3 | 0.80 | 0.20 | 0.20 | 5.8 |
| S-4 | 0.80 | 0.20 | 0 | 5.8 |
| S-5 | 1 | 0 | 0.15 | 5.8 |
| S-6 | 0.95 | 0.05 | 0.05 | 5.8 |
| S-7 | 0.75 | 0.25 | 0.25 | 5.8 |
| S-8 | 0.70 | 0.30 | 0.30 | 5.8 |
| S-9 | 0.90 | 0.10 | 0.10 | 5.8 |
| S-10 | 0.85 | 0.15 | 0.15 | 5.8 |
| S-11 | 0.80 | 0.20 | 0.14 | 5.5 |

Production of Sintered Ferrite Magnet

Each calcined CaLaCo ferrite and each calcined SrLaCo ferrite were mixed at a calcined SrLaCo ferrite mass ratio of 0%, 10%, 30%, 50%, 70%, and 100% (the volume ratio of the first ferrite compound phase to the second ferrite compound phase was 100/0, 90/10, 70/30, 50/50, 30/70, and 0/100, respectively) as shown in Tables 2-1 and 2-2, to produce calcined ferrite mixtures having the compositions shown in Tables 3-1 and 3-2. 100% by mass of each calcined ferrite mixture was mixed with 0.6% by mass of $SiO_2$ powder and 0.7% by mass (as CaO) of $CaCO_3$ powder, and finely pulverized with water by a wet ball mill to an average particle size (measured by an air permeability method) of 0.6 μm, thereby obtaining a slurry. Each fine powder slurry was molded under pressure of about 50 MPa in a magnetic field of about 1 T in parallel to a compression direction, while removing water. The resultant green bodies were sintered at 1200° C. for 1 hour in the air to obtain sintered ferrite magnets.

TABLE 2-1

| Sample No. | Calcined CaLaCo Ferrite | Calcined SrLaCo Ferrite | Mixing Ratio of SrLaCo Ferrite[3] (% by mass) |
|---|---|---|---|
| 1[2] | C-1 | — | 0 |
| 2[1] | C-1 | S-1 | 10 |
| 3[1] | C-1 | S-1 | 30 |
| 4[1] | C-1 | S-1 | 50 |
| 5[2] | C-1 | S-1 | 70 |
| 6[2] | — | S-1 | 100 |
| 7[1] | C-1 | S-2 | 10 |
| 8[1] | C-1 | S-2 | 30 |
| 9[1] | C-1 | S-2 | 50 |
| 10[2] | C-1 | S-2 | 70 |
| 11[2] | — | S-2 | 100 |
| 12[1] | C-1 | S-3 | 10 |
| 13[1] | C-1 | S-3 | 30 |
| 14[1] | C-1 | S-3 | 50 |
| 15[2] | C-1 | S-3 | 70 |
| 16[2] | — | S-3 | 100 |
| 17[1] | C-1 | S-4 | 10 |
| 18[1] | C-1 | S-4 | 30 |
| 19[1] | C-1 | S-4 | 50 |
| 20[2] | C-1 | S-4 | 70 |
| 21[2] | — | S-4 | 100 |
| 22[2] | C-1 | S-5 | 10 |
| 23[2] | C-1 | S-5 | 30 |
| 24[2] | C-1 | S-5 | 50 |
| 25[2] | C-1 | S-5 | 70 |
| 26[2] | — | S-5 | 100 |
| 27[1] | C-1 | S-6 | 30 |
| 28[2] | — | S-6 | 100 |
| 29[1] | C-1 | S-7 | 30 |
| 30[2] | — | S-7 | 100 |
| 31[1] | C-1 | S-8 | 30 |
| 32[2] | — | S-8 | 100 |

Note:
[1]Within the scope of the present invention.
[2]Comparative Example.
[3]A mixing ratio of calcined SrLaCo ferrite in the calcined ferrite mixture.

TABLE 2-2

| Sample No. | Calcined CaLaCo Ferrite | Calcined SrLaCo Ferrite | Mixing Ratio of SrLaCo Ferrite[3] (% by mass) |
|---|---|---|---|
| 33[2] | C-2 | — | 0 |
| 34[1] | C-2 | S-3 | 10 |
| 35[1] | C-2 | S-3 | 30 |
| 36[1] | C-2 | S-3 | 50 |
| 37[2] | C-2 | S-3 | 70 |
| 38[2] | C-3 | — | 0 |
| 39[1] | C-3 | S-3 | 10 |
| 40[1] | C-3 | S-3 | 30 |
| 41[1] | C-3 | S-3 | 50 |
| 42[2] | C-3 | S-3 | 70 |
| 43[1] | C-1 | S-9 | 10 |
| 44[1] | C-1 | S-9 | 30 |
| 45[1] | C-1 | S-9 | 50 |
| 46[2] | C-1 | S-9 | 70 |
| 47[2] | — | S-9 | 100 |
| 48[1] | C-1 | S-10 | 10 |
| 49[1] | C-1 | S-10 | 30 |
| 50[1] | C-1 | S-10 | 50 |
| 51[2] | C-1 | S-10 | 70 |
| 52[2] | — | S-10 | 100 |
| 53[2] | C-4 | — | 0 |
| 54[1] | C-4 | S-3 | 10 |
| 55[1] | C-4 | S-3 | 30 |
| 56[1] | C-4 | S-3 | 50 |
| 57[2] | C-4 | S-3 | 70 |
| 58[2] | C-5 | — | 0 |
| 59[1] | C-5 | S-3 | 10 |
| 60[1] | C-5 | S-3 | 30 |
| 61[1] | C-5 | S-3 | 50 |
| 62[2] | C-5 | S-3 | 70 |

Note:
[1]Within the scope of the present invention.
[2]Comparative Example.
[3]A mixing ratio of calcined SrLaCo ferrite in the calcined ferrite mixture.

TABLE 3-1

| Sample No. | Composition of Calcined Ferrite Mixture $Ca_{1-x-a}La_xSr_aFe_{2n-y}Co_y$ | | | | |
|---|---|---|---|---|---|
| | 1−x−a | x | a | y | n |
| 1[2] | 0.50 | 0.50 | 0.00 | 0.30 | 5.20 |
| 2[1] | 0.45 | 0.47 | 0.07 | 0.28 | 5.26 |
| 3[1] | 0.36 | 0.42 | 0.22 | 0.24 | 5.37 |
| 4[1] | 0.26 | 0.36 | 0.38 | 0.21 | 5.48 |
| 5[2] | 0.16 | 0.30 | 0.54 | 0.16 | 5.61 |
| 6[2] | 0.00 | 0.20 | 0.80 | 0.10 | 5.80 |
| 7[1] | 0.45 | 0.47 | 0.08 | 0.29 | 5.26 |
| 8[1] | 0.36 | 0.40 | 0.24 | 0.26 | 5.37 |
| 9[1] | 0.26 | 0.33 | 0.40 | 0.23 | 5.48 |
| 10[2] | 0.16 | 0.26 | 0.58 | 0.20 | 5.61 |
| 11[2] | 0.00 | 0.20 | 0.80 | 0.15 | 5.80 |
| 12[1] | 0.45 | 0.47 | 0.07 | 0.29 | 5.26 |
| 13[1] | 0.36 | 0.42 | 0.22 | 0.27 | 5.37 |
| 14[1] | 0.26 | 0.36 | 0.38 | 0.25 | 5.48 |
| 15[2] | 0.16 | 0.30 | 0.54 | 0.23 | 5.61 |
| 16[2] | 0.00 | 0.20 | 0.80 | 0.20 | 5.80 |

TABLE 3-1-continued

| Sample No. | Composition of Calcined Ferrite Mixture $Ca_{1-x-a}La_xSr_aFe_{2n-y}Co_y$ | | | | |
|---|---|---|---|---|---|
| | 1-x-a | x | a | y | n |
| 17[2] | 0.45 | 0.47 | 0.07 | 0.27 | 5.26 |
| 18[2] | 0.36 | 0.42 | 0.22 | 0.22 | 5.37 |
| 19[2] | 0.26 | 0.36 | 0.38 | 0.16 | 5.48 |
| 20[2] | 0.16 | 0.30 | 0.54 | 0.10 | 5.61 |
| 21[2] | 0.00 | 0.20 | 0.80 | 0.00 | 5.80 |
| 22[2] | 0.45 | 0.45 | 0.09 | 0.29 | 5.26 |
| 23[2] | 0.36 | 0.36 | 0.28 | 0.26 | 5.37 |
| 24[2] | 0.26 | 0.26 | 0.48 | 0.23 | 5.49 |
| 25[2] | 0.16 | 0.16 | 0.68 | 0.20 | 5.61 |
| 26[2] | 0.00 | 0.00 | 1.00 | 0.15 | 5.80 |
| 27[1] | 0.36 | 0.37 | 0.27 | 0.23 | 5.37 |
| 28[2] | 0.00 | 0.05 | 0.80 | 0.05 | 5.80 |
| 29[1] | 0.36 | 0.43 | 0.21 | 0.29 | 5.37 |
| 30[2] | 0.00 | 0.25 | 0.80 | 0.25 | 5.80 |
| 31[1] | 0.36 | 0.44 | 0.19 | 0.30 | 5.37 |
| 32[2] | 0.00 | 0.30 | 0.80 | 0.30 | 5.80 |

Note:
[1]Within the scope of the present invention.
[2]Comparative Example.

TABLE 3-2

| Sample No. | Composition of Calcined Ferrite Mixture $Ca_{1-x-a}La_xSr_aFe_{2n-y}Co_y$ | | | | |
|---|---|---|---|---|---|
| | 1-x-a | x | a | y | n |
| 33[2] | 0.49 | 0.51 | 0.00 | 0.35 | 5.30 |
| 34[1] | 0.45 | 0.48 | 0.07 | 0.34 | 5.34 |
| 35[1] | 0.35 | 0.42 | 0.23 | 0.31 | 5.44 |
| 36[1] | 0.26 | 0.36 | 0.38 | 0.28 | 5.54 |
| 37[2] | 0.16 | 0.30 | 0.55 | 0.25 | 5.65 |
| 38[2] | 0.40 | 0.60 | 0.00 | 0.40 | 5.30 |
| 39[1] | 0.36 | 0.56 | 0.07 | 0.38 | 5.35 |
| 40[1] | 0.29 | 0.49 | 0.23 | 0.34 | 5.36 |
| 41[1] | 0.21 | 0.41 | 0.38 | 0.31 | 5.53 |
| 42[2] | 0.13 | 0.33 | 0.54 | 0.26 | 5.65 |
| 43[1] | 0.45 | 0.46 | 0.08 | 0.28 | 5.26 |
| 44[1] | 0.36 | 0.39 | 0.25 | 0.24 | 5.37 |
| 45[1] | 0.26 | 0.31 | 0.43 | 0.21 | 5.49 |
| 46[2] | 0.16 | 0.23 | 0.61 | 0.16 | 5.61 |
| 47[2] | 0.00 | 0.10 | 0.90 | 0.10 | 5.80 |
| 48[1] | 0.45 | 0.47 | 0.08 | 0.29 | 5.26 |
| 49[1] | 0.36 | 0.40 | 0.24 | 0.26 | 5.37 |
| 50[1] | 0.26 | 0.33 | 0.40 | 0.23 | 5.48 |
| 51[2] | 0.16 | 0.26 | 0.58 | 0.20 | 5.61 |
| 52[2] | 0.00 | 0.15 | 0.85 | 0.15 | 5.80 |
| 53[2] | 0.50 | 0.50 | 0.00 | 0.25 | 5.20 |
| 54[1] | 0.45 | 0.47 | 0.07 | 0.25 | 5.26 |
| 55[1] | 0.36 | 0.42 | 0.22 | 0.24 | 5.37 |
| 56[1] | 0.26 | 0.36 | 0.38 | 0.23 | 5.48 |
| 57[2] | 0.16 | 0.30 | 0.54 | 0.22 | 5.61 |
| 58[2] | 0.50 | 0.50 | 0.00 | 0.28 | 5.20 |
| 59[1] | 0.45 | 0.47 | 0.07 | 0.27 | 5.26 |
| 60[1] | 0.36 | 0.42 | 0.22 | 0.25 | 5.37 |
| 61[1] | 0.26 | 0.36 | 0.38 | 0.24 | 5.48 |
| 62[2] | 0.16 | 0.30 | 0.54 | 0.22 | 5.61 |

Note:
[1]Within the scope of the present invention.
[2]Comparative Example.

Because the calcined CaLaCo ferrite and the calcined SrLaCo ferrite have substantially the same density, and because the amounts of $SiO_2$ powder and $CaCO_3$ powder added to the calcined ferrite mixture are negligible, the volume ratios of the CaLaCo ferrite phases to the SrLaCo ferrite phases in these sintered ferrite magnets are regarded as equal to their mass ratios. The volume ratio of "CaLaCo ferrite phase" to "SrLaCo ferrite phase" may be simply called "volume ratio."

Evaluation of Magnetic Properties

The magnetic properties of the sintered ferrite magnets are shown in Tables 4-1 and 4-2, and FIGS. 5-1 to 5-3, 6-1 to 6-3, and 7-1 to 7-3. FIGS. 5-1 to 5-3, 6-1 to 6-3, and 7-1 to 7-3 are graphs showing $H_{cJ}$ (FIGS. 5-1 to 5-3), $B_r$ (FIGS. 6-1 to 6-3), and $H_k/H_{cJ}$ (FIGS. 7-1 to 7-3) plotted against a mixing ratio (% by mass) of the calcined SrLaCo ferrite. After each sintered body was ground, its magnetic properties were measured at room temperature (about 23° C.) using a B-H curve tracer. $H_k$ in $H_k/H_{cJ}$ is the value of H when J is 0.95 $B_r$, in a curve of J (magnetization) to H (intensity of magnetic field) in the second quadrant.

TABLE 4-1

| Sample No. | Curie Temperature | | Magnetic Properties | | | |
|---|---|---|---|---|---|---|
| | Tc1 (° C.) | Tc2 (° C.) | $B_r$ (T) | $H_{cJ}$ (kA/m) | $H_K/H_{cJ}$ (%) | $(BH)_{max}$ (kJ/m³) |
| 1[2] | 416.1 | — | 0.458 | 388 | 92.3 | 41.0 |
| 2[1] | 418.5 | 442.8 | 0.453 | 403 | 91.6 | 40.0 |
| 3[1] | 422.9 | 443.0 | 0.452 | 410 | 92.9 | 39.9 |
| 4[1] | 427.3 | 442.9 | 0.448 | 399 | 90.7 | 38.9 |
| 5[2] | 433.0 | 443.5 | 0.445 | 368 | 91.0 | 38.5 |
| 6[2] | — | 443.6 | 0.437 | 326 | 94.9 | 37.0 |
| 7[1] | 418.6 | 442.9 | 0.452 | 395 | 93.7 | 40.2 |
| 8[1] | 423.4 | 443.5 | 0.450 | 416 | 90.9 | 39.7 |
| 9[1] | 428.1 | 443.5 | 0.447 | 411 | 86.2 | 39.1 |
| 10[2] | 432.9 | 443.3 | 0.444 | 374 | 86.1 | 38.5 |
| 11[2] | — | 443.2 | 0.439 | 346 | 87.5 | 37.3 |
| 12[1] | 433.2 | 443.2 | 0.454 | 405 | 90.8 | 40.3 |
| 13[1] | 418.6 | 443.5 | 0.453 | 419 | 83.5 | 40.0 |
| 14[1] | 422.9 | 443.3 | 0.449 | 402 | 73.2 | 39.2 |
| 15[2] | 428.0 | 443.5 | 0.446 | 363 | 73.3 | 38.5 |
| 16[2] | — | 441.8 | 0.439 | 334 | 75.8 | 37.2 |
| 17[2] | 418.8 | 442.6 | 0.455 | 386 | 95.4 | 40.4 |
| 18[2] | 423.5 | 442.8 | 0.450 | 374 | 96.7 | 39.6 |
| 19[2] | 428.5 | 443.0 | 0.445 | 349 | 93.5 | 38.5 |
| 20[2] | 433.7 | 443.5 | 0.438 | 289 | 87.5 | 37.2 |
| 21[2] | — | 444.8 | 0.436 | 230 | 89.7 | 36.5 |
| 22[2] | 420.1 | 456.5 | 0.453 | 397 | 88.2 | 40.0 |
| 23[2] | 428.2 | 456.3 | 0.450 | 368 | 78.6 | 39.4 |
| 24[2] | 436.4 | 455.1 | 0.444 | 310 | 73.3 | 37.8 |
| 25[2] | 444.3 | 454.1 | 0.441 | 237 | 79.2 | 36.4 |
| 26[2] | 452.5 | 465.6 | 0.432 | 141 | 47.3 | 26.6 |
| 27[1] | 425.6 | 454.5 | 0.451 | 384 | 92.4 | 39.7 |
| 28[2] | — | 452.9 | 0.435 | 298 | 90.1 | 36.6 |
| 29[1] | 421.5 | 436.5 | 0.452 | 431 | 77.8 | 39.8 |
| 30[2] | — | 435.9 | 0.441 | 321 | 70.0 | 37.2 |
| 31[1] | 422.3 | 439.3 | 0.453 | 425 | 80.3 | 40.1 |
| 32[2] | — | 438.4 | 0.440 | 339 | 71.1 | 37.3 |

Note:
[1]Within the scope of the present invention.
[2]Comparative Example.

TABLE 4-2

| Sample No. | Curie Temperature | | Magnetic Properties | | | |
|---|---|---|---|---|---|---|
| | Tc1 (° C.) | Tc2 (° C.) | $B_r$ (T) | $H_{cJ}$ (kA/m) | $H_K/H_{cJ}$ (%) | $(BH)_{max}$ (kJ/m³) |
| 33[2] | 417.4 | — | 0.452 | 435 | 74.4 | 40.0 |
| 34[1] | 419.2 | 443.5 | 0.452 | 442 | 73.0 | 39.8 |
| 35[1] | 423.5 | 443.3 | 0.451 | 430 | 68.5 | 39.6 |
| 36[1] | 428.4 | 443.3 | 0.445 | 402 | 67.9 | 38.4 |
| 37[2] | 433.4 | 442.7 | 0.443 | 359 | 70.7 | 38.1 |
| 38[2] | 415.3 | — | 0.449 | 414 | 73.8 | 39.4 |
| 39[1] | 416.8 | 443.2 | 0.448 | 410 | 73.5 | 39.0 |
| 40[1] | 421.0 | 443.3 | 0.449 | 392 | 70.6 | 39.0 |
| 41[1] | 424.9 | 443.2 | 0.444 | 399 | 70.3 | 38.4 |
| 42[2] | 430.8 | 442.7 | 0.442 | 389 | 70.6 | 38.0 |
| 43[1] | 418.8 | 450.1 | 0.451 | 401 | 91.6 | 39.8 |
| 44[1] | 424.7 | 450.5 | 0.451 | 394 | 89.1 | 39.8 |
| 45[1] | 431.1 | 450.4 | 0.447 | 364 | 78.8 | 38.8 |

TABLE 4-2-continued

| Sample No. | Curie Temperature | | Magnetic Properties | | | |
|---|---|---|---|---|---|---|
| | Tc1 (°C.) | Tc2 (°C.) | $B_r$ (T) | $H_{cJ}$ (kA/m) | $H_k/H_{cJ}$ (%) | $(BH)_{max}$ (kJ/m³) |
| 46[2] | 437.8 | 449.5 | 0.444 | 327 | 82.9 | 38.2 |
| 47[2] | — | 448.4 | 0.437 | 304 | 88.8 | 37.0 |
| 48[1] | 418.3 | 446.5 | 0.452 | 402 | 91.4 | 40.0 |
| 49[1] | 423.7 | 446.5 | 0.453 | 407 | 85.0 | 40.1 |
| 50[1] | 429.7 | 447.1 | 0.447 | 376 | 74.9 | 38.8 |
| 51[2] | 436.0 | 446.5 | 0.446 | 337 | 76.2 | 38.4 |
| 52[2] | — | 444.5 | 0.438 | 314 | 81.3 | 37.2 |
| 53[2] | 417.1 | — | 0.450 | 281 | 94.7 | 39.8 |
| 54[1] | 418.6 | 442.5 | 0.452 | 339 | 94.8 | 39.9 |
| 55[1] | 422.9 | 442.9 | 0.450 | 405 | 93.4 | 39.6 |
| 56[1] | 427.3 | 443.1 | 0.448 | 407 | 83.2 | 39.3 |
| 57[2] | 433.5 | 443.2 | 0.443 | 364 | 76.3 | 38.2 |
| 58[2] | 416.8 | — | 0.453 | 338 | 96.7 | 40.2 |
| 59[1] | 418.6 | 442.5 | 0.453 | 375 | 96.8 | 40.3 |
| 60[1] | 422.8 | 442.9 | 0.451 | 418 | 88.2 | 39.7 |
| 61[1] | 427.7 | 443.0 | 0.448 | 402 | 77.9 | 39.2 |
| 62[2] | 433.4 | 443.0 | 0.443 | 361 | 74.3 | 38.2 |

Note:
[1]Within the scope of the present invention.
[2]Comparative Example.

FIGS. 5-1, 6-1 and 7-1 show the measurement results of Samples 1 to 16, sintered magnets obtained by mixing the calcined CaLaCo ferrite having the Co content y' of 0.30 (Calcined Body C-1) with each of the calcined SrLaCo ferrites having the Co content y" of 0.10 to 0.20 (Calcined Bodies S-1 to S-3).

FIGS. 5-2, 6-2 and 7-2 show the measurement results of Samples 1, 12 to 16, 33 to 42 and 53 to 62, sintered magnets obtained by mixing each of the calcined CaLaCo ferrites having the Co content y' of 0.25 to 0.40 (Calcined Bodies C-1 to C-5) with the calcined CaLaCo SrLaCo ferrite (Calcined Body S-3) having the Co content y" of 0.20.

FIGS. 5-3, 6-3 and 7-3 show the measurement results of Samples 1, 12 to 16, 27 to 32 and 43 to 52, sintered magnets obtained by mixing the calcined CaLaCo ferrite having the Co content y' of 0.30 (Calcined Body C-1), with the calcined SrLaCo ferrites (Calcined Bodies S-3, and S-6 to S-10) having the Co content y" of 0.05-0.30 and the La content x" of 0.05-0.30.

(i) Coercivity $H_{cJ}$

Figures 1, 5:
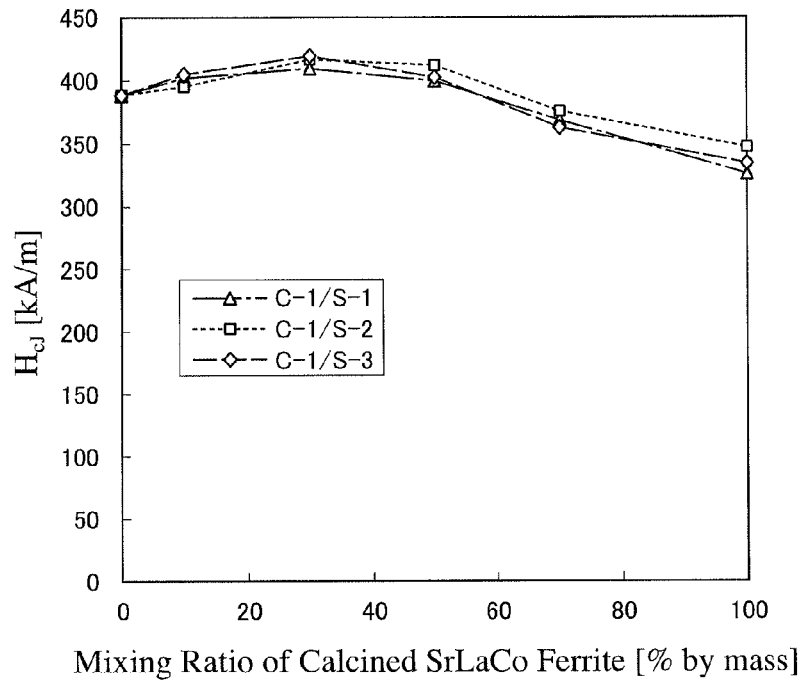
Figures 2, 5:
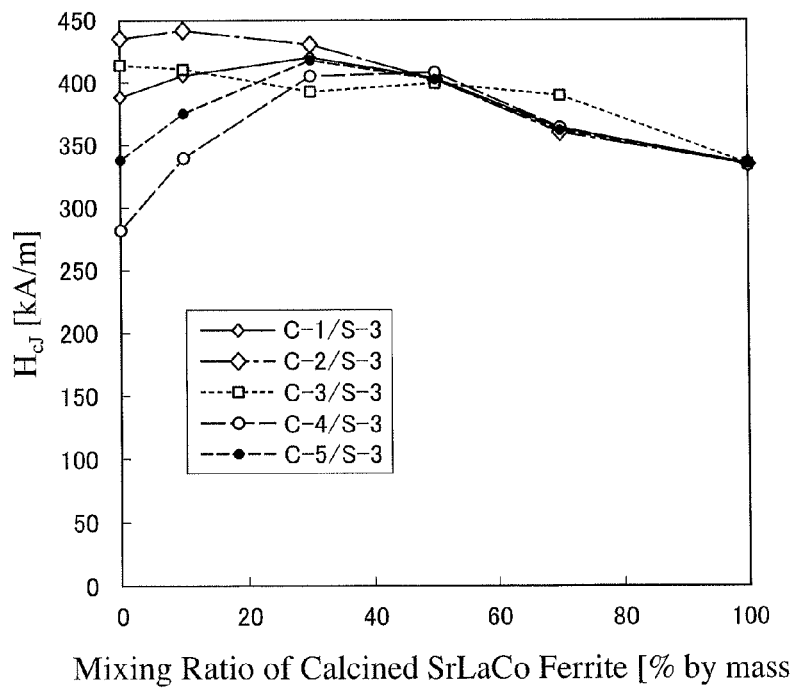
Figures 3, 5:
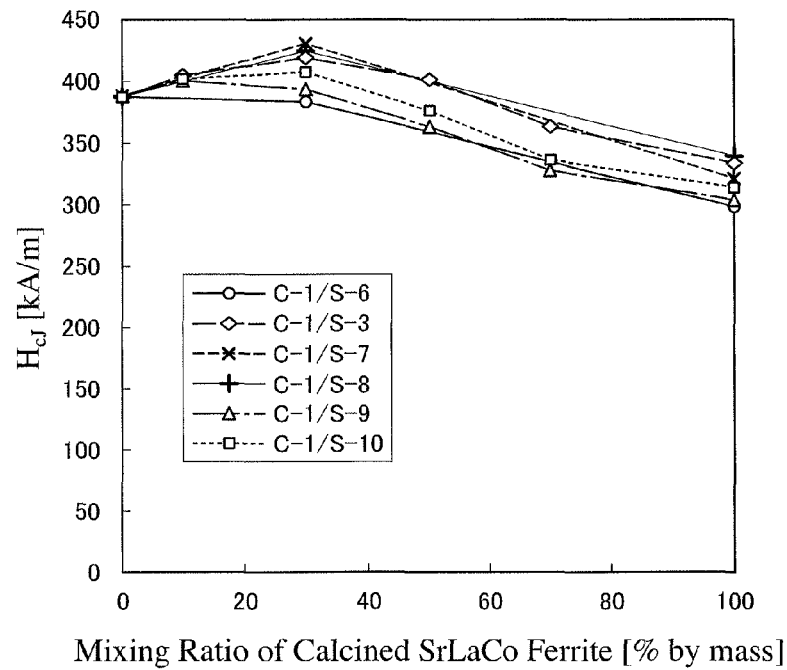

As is clear from FIGS. 5-1 to 5-3, when the calcined CaLaCo ferrites having the Co content y' in a range of 0.25-0.40 (Calcined Bodies C-1 to C-5) were used, $H_{cJ}$ was dramatically improved in the mixing ratio range of 10-50% by mass (90/10 to 50/50 by volume), particularly high in a range of 20-40% by mass, and highest at about 30% by mass, relative to a straight line connecting $H_{cJ}$ at which the mixing ratio of the calcined SrLaCo ferrite was 0% by mass (namely, the sintered CaLaCo ferrite magnet) to $H_{cJ}$ at which the mixing ratio was 100% by mass (namely, the sintered SrLaCo ferrite magnet). Further, most sintered ferrite magnets in the mixing ratio range of 10-50% by mass had higher $H_{cJ}$ than that of the sintered ferrite magnet having the mixing ratio of 0% by mass (sintered CaLaCo ferrite magnet). To obtain high $H_{cJ}$, it is preferable to use the calcined CaLaCo ferrite having the Co content in a range of $0.25 \leq y' \leq 0.35$.

(ii) Residual Magnetic Flux Density $B_r$

Figures 1, 6:
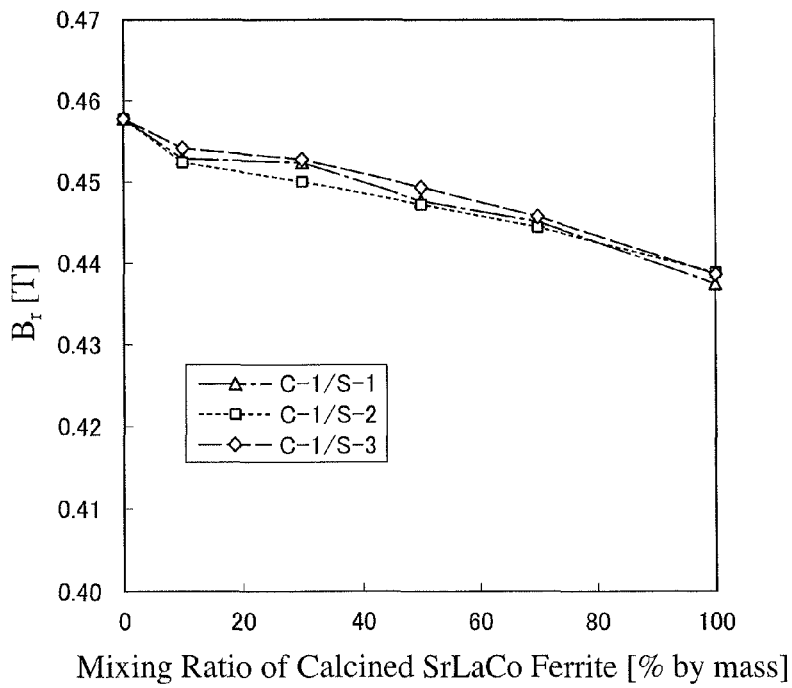
Figures 2, 6:
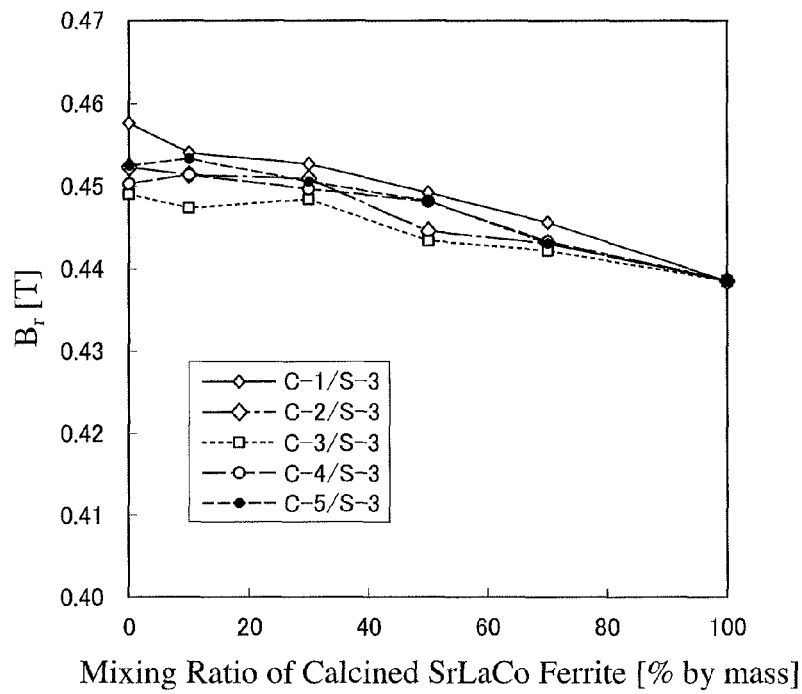
Figures 3, 6:
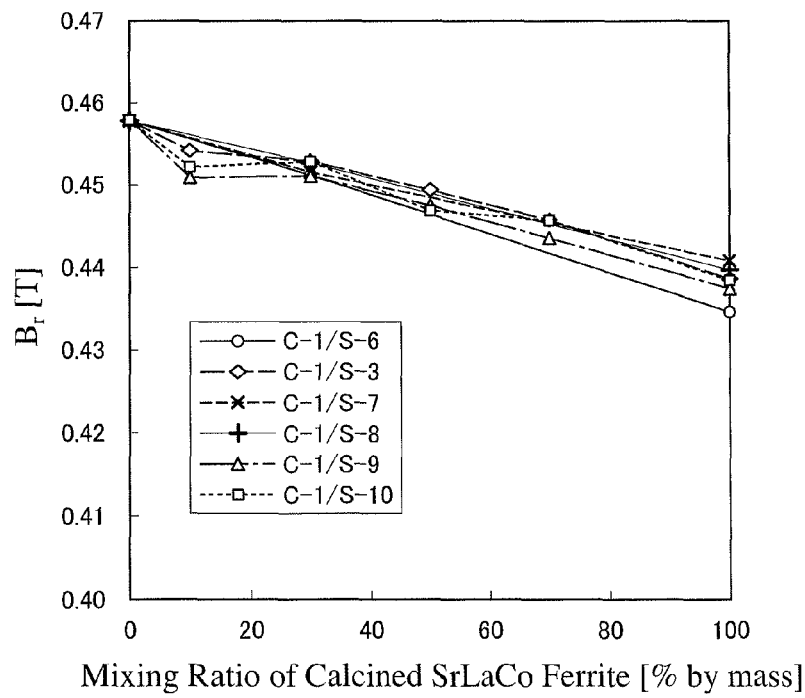

As is clear from FIGS. 6-1 to 6-3, when the calcined CaLaCo ferrites having the Co content y' in a range of 0.25-0.40 (Calcined Bodies C-1 to C-5) were used, $B_r$ did not substantially decrease, rather some samples having slightly improved $B_r$, despite dramatic improvement of $H_{cJ}$, in the calcined SrLaCo ferrite mixing ratio range of 10-50% by mass (90/10 to 50/50 by volume), relative to a straight line connecting $B_r$ at a mixing ratio of 0% by mass to $B_r$ at a mixing ratio of 100% by mass.

(iii) Rectangularity $H_k/H_{cJ}$

Figures 1, 7:
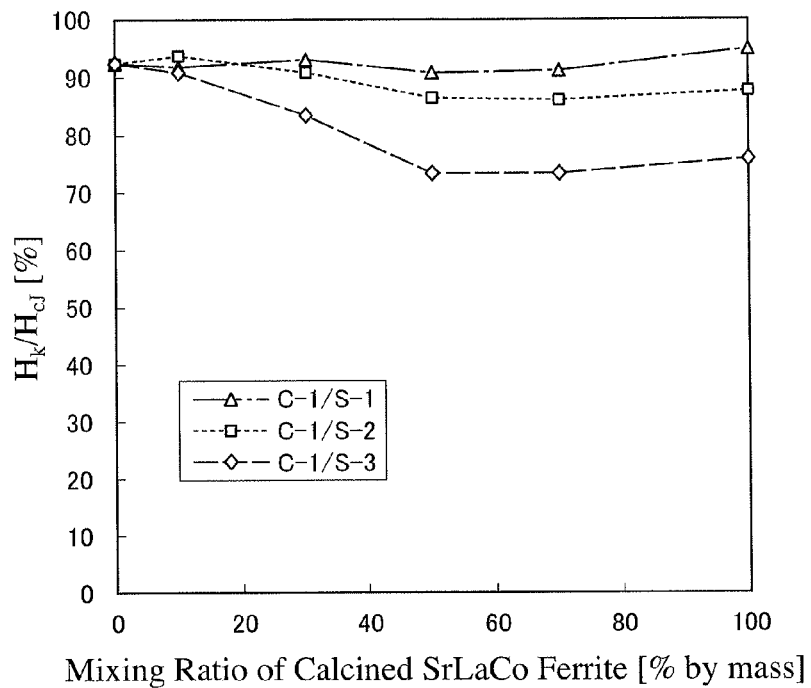
Figures 2, 7:
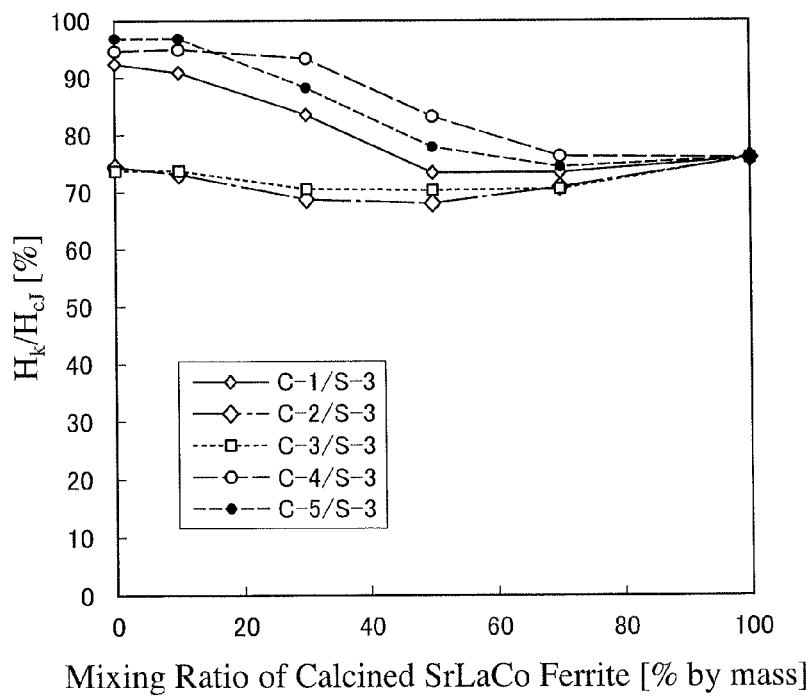
Figures 3, 7:
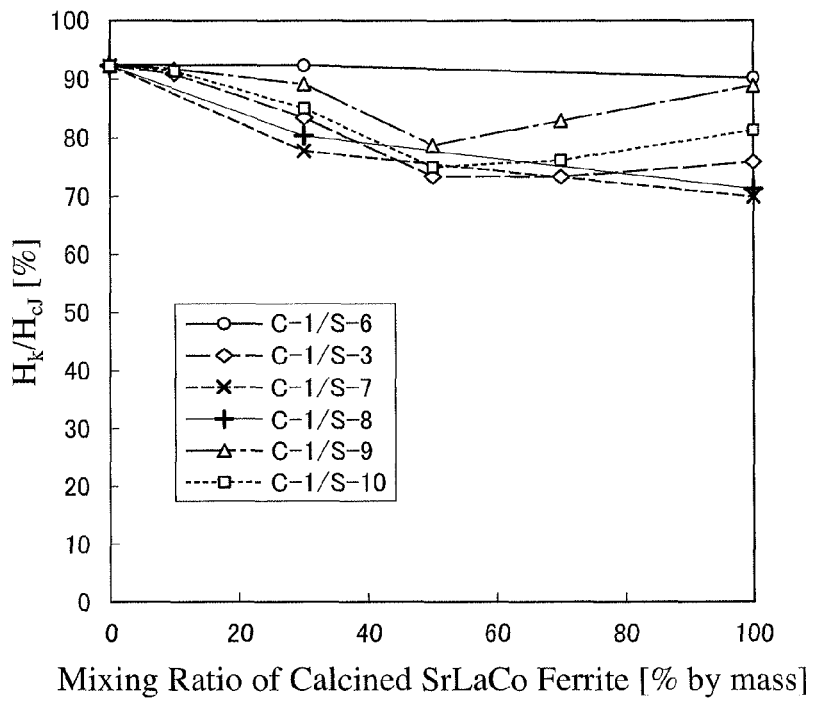

As is clear from FIGS. 7-1 to 7-3, $H_k/H_{cJ}$ did not substantially decrease or slightly decreased as a whole, most compositions keeping $H_k/H_{cJ}$ of 80% or more, in the calcined SrLaCo ferrite mixing ratio range of 10-50% by mass (90/10 to 50/50 by volume), relative to a straight line connecting $H_k/H_{cJ}$ at a mixing ratio of 0% by mass to $H_k/H_{cJ}$ at a mixing ratio of 100% by mass.

It was thus found that the sintered ferrite magnets of the present invention obtained by mixing the calcined CaLaCo ferrite with the calcined SrLaCo ferrite had higher $H_{cJ}$ than those of the sintered CaLaCo ferrite magnets, while keeping high $B_r$ and $H_k/H_{cJ}$.

Curie Temperature

Figures 1, 8:
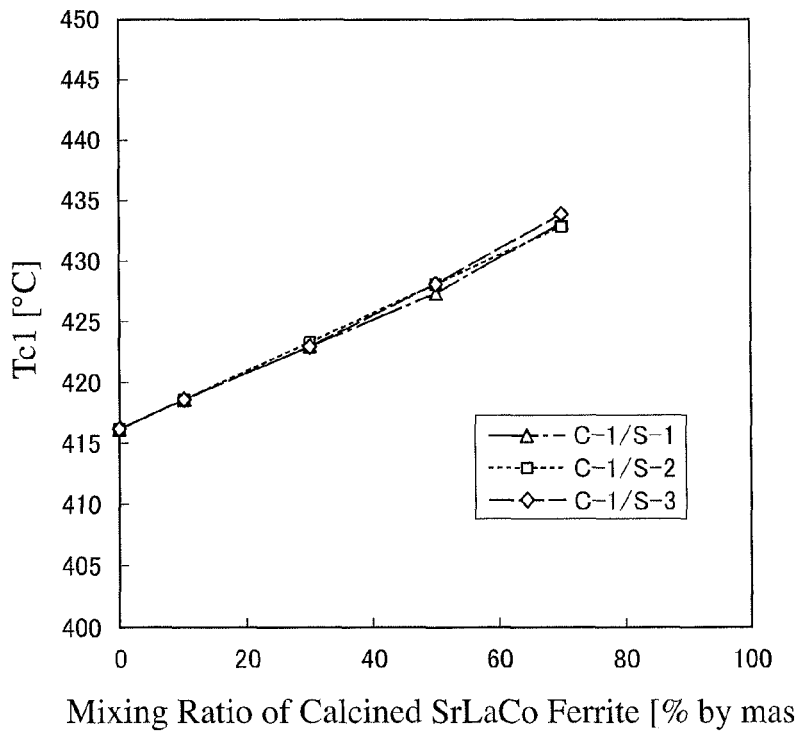
Figures 2, 8:
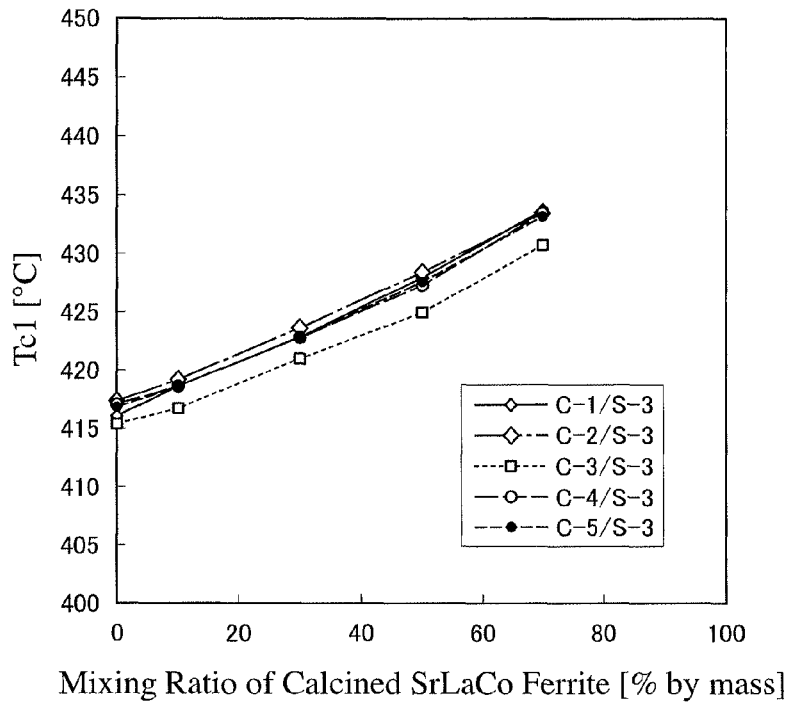
Figures 3, 8:
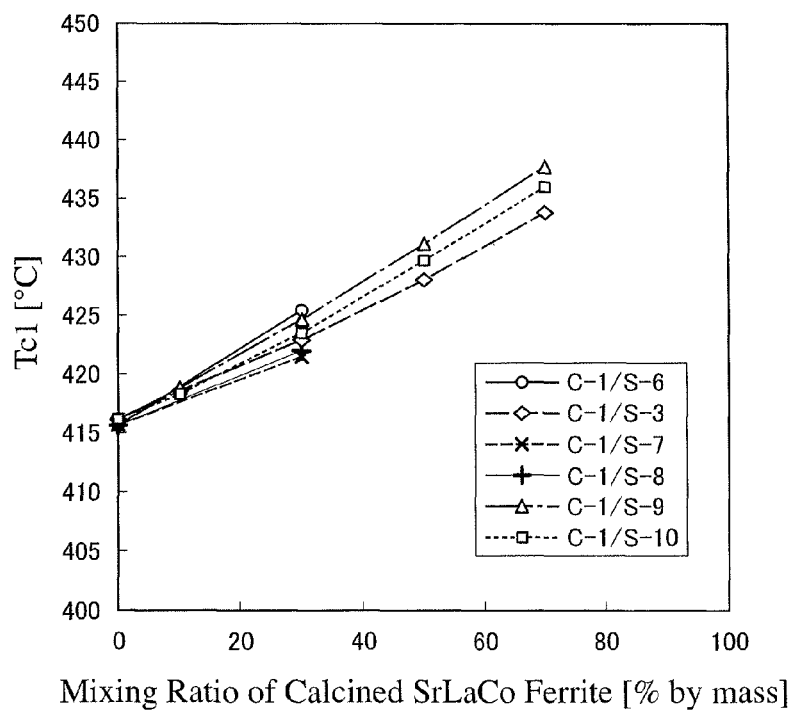
Figures 1, 9:
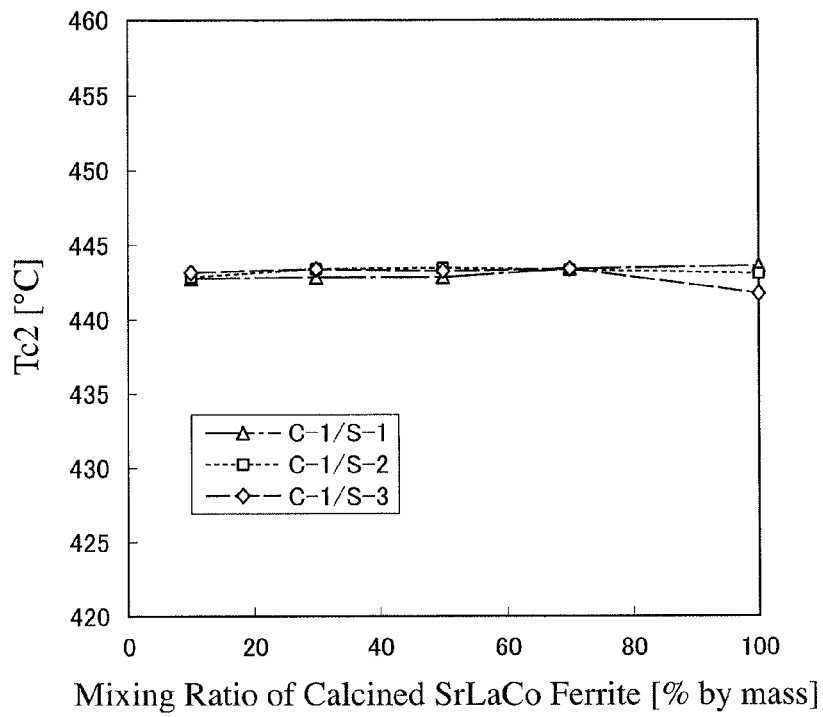
Figures 2, 9:
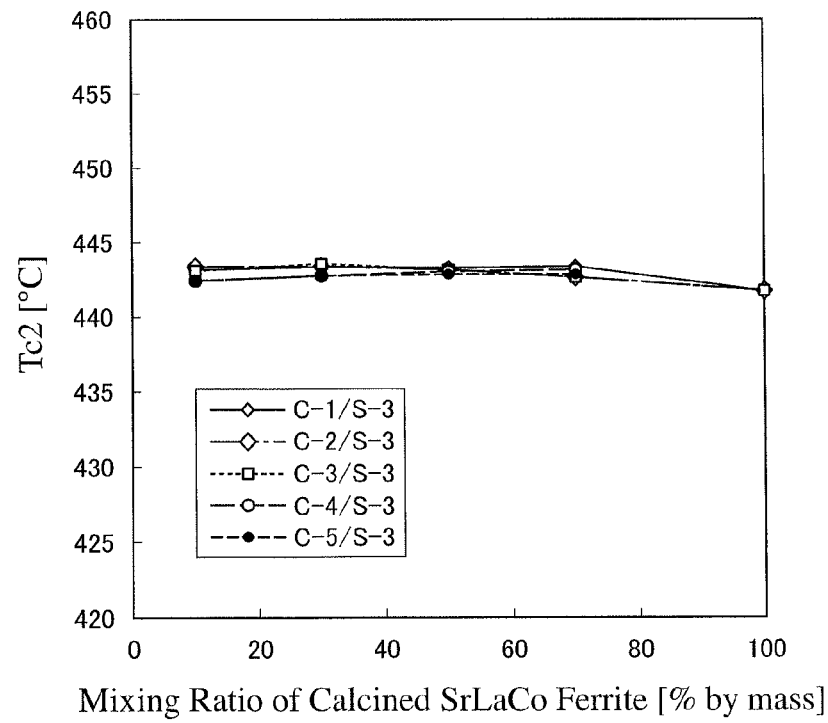
Figures 3, 9:
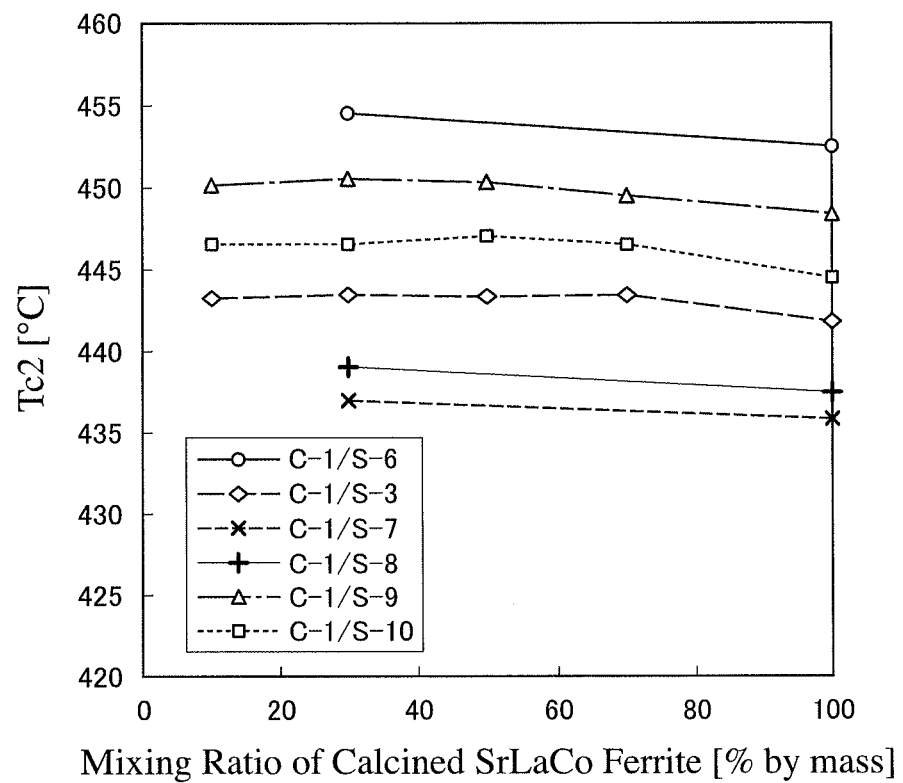
Figure 10A:
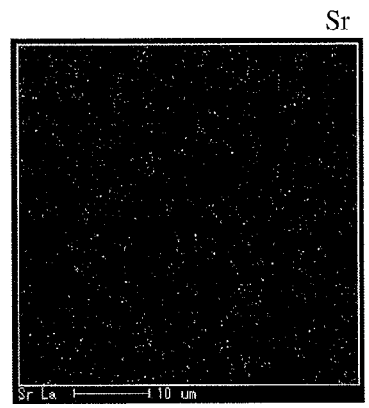
FIG. 10(a) is a photograph showing the area analysis result of Sr by EPMA in the sintered ferrite magnet (Sample 1) of Example 2.
Figure 10B:
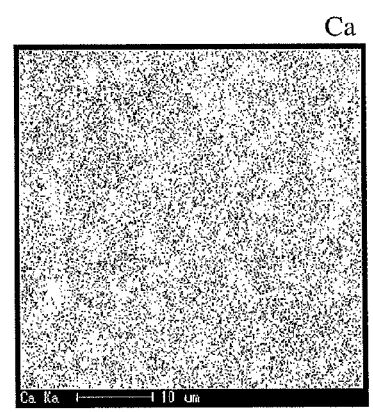
FIG. 10(b) is a photograph showing the area analysis result of Ca by EPMA in the sintered ferrite magnet (Sample 1) of Example 2.
Figure 10C:
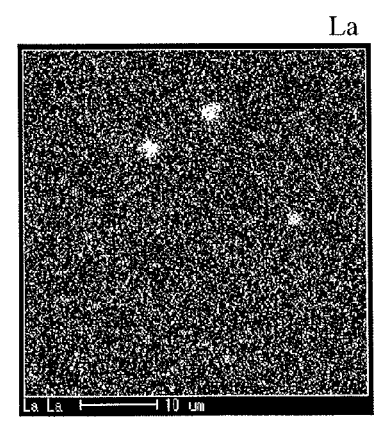
FIG. 10(c) is a photograph showing the area analysis result of La by EPMA in the sintered ferrite magnet (Sample 1) of Example 2.
Figure 10D:
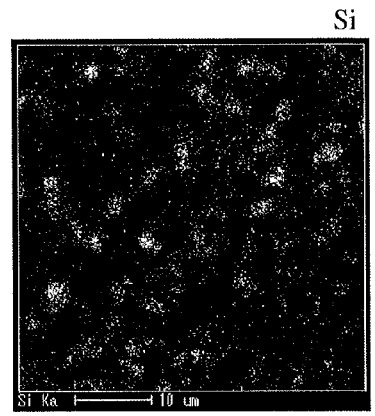
FIG. 10(d) is a photograph showing the area analysis result of Si by EPMA in the sintered ferrite magnet (Sample 1) of Example 2.
Figure 10E:
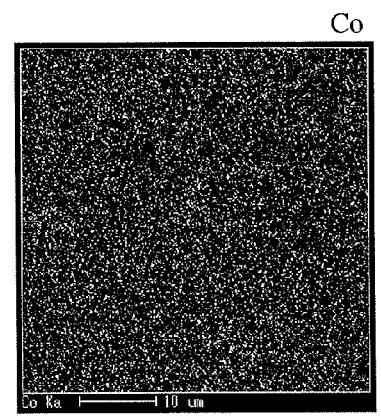
FIG. 10(e) is a photograph showing the area analysis result of Co by EPMA in the sintered ferrite magnet (Sample 1) of Example 2.
Figure 10F:
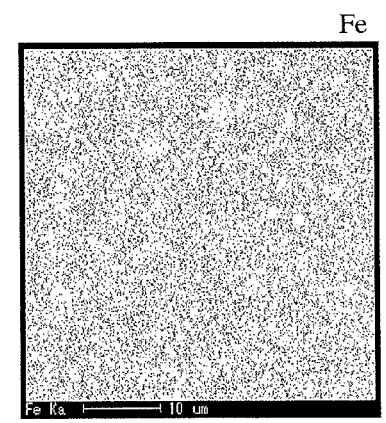
FIG. 10(f) is a photograph showing the area analysis result of Fe by EPMA in the sintered ferrite magnet (Sample 1) of Example 2.
Figure 10G:
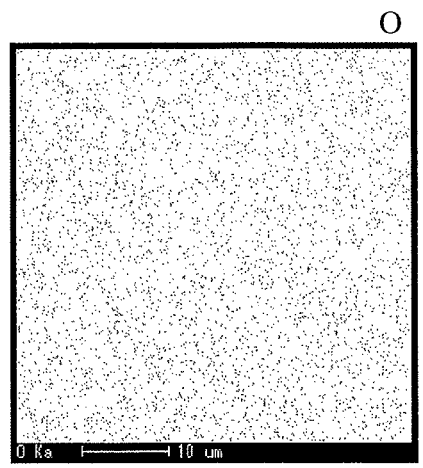
FIG. 10(g) is a photograph showing the area analysis result of O by EPMA in the sintered ferrite magnet (Sample 1) of Example 2.
Figure 10H:
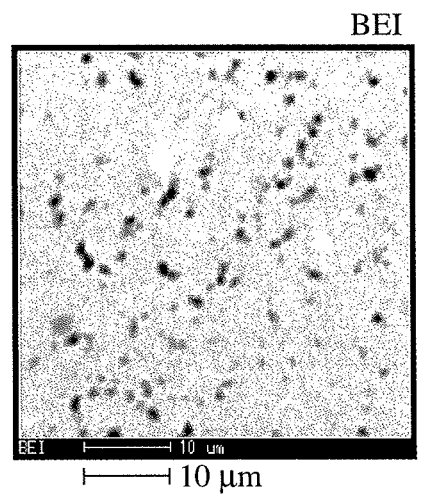
FIG. 10(h) is a photograph showing the backscattered electron image by EPMA of the sintered ferrite magnet (Sample 1) of Example 2.
Figure 11A:
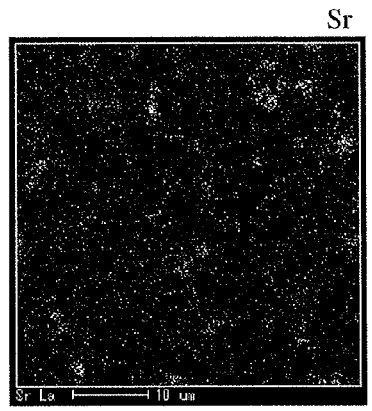
FIG. 11(a) is a photograph showing the area analysis result of Sr by EPMA in the sintered ferrite magnet (Sample 12) of Example 2.
Figure 11B:
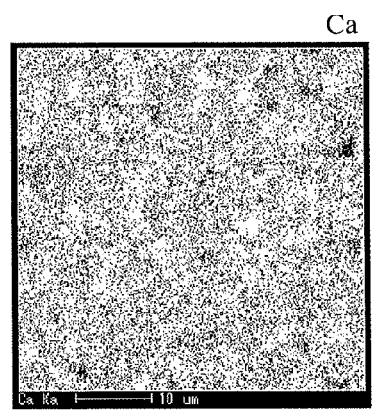
FIG. 11(b) is a photograph showing the area analysis result of Ca by EPMA in the sintered ferrite magnet (Sample 12) of Example 2.
Figure 11C:
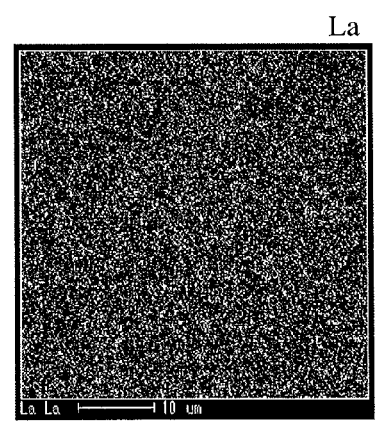
FIG. 11(c) is a photograph showing the area analysis result of La by EPMA in the sintered ferrite magnet (Sample 12) of Example 2.
Figure 11D:
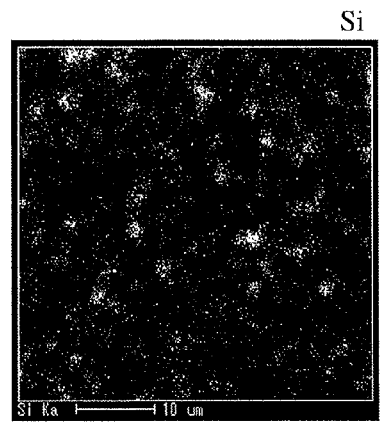
FIG. 11(d) is a photograph showing the area analysis result of Si by EPMA in the sintered ferrite magnet (Sample 12) of Example 2.
Figure 11E:
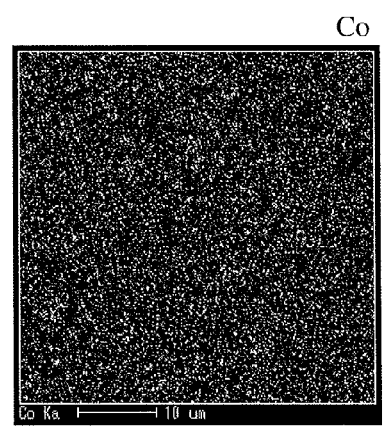
FIG. 11(e) is a photograph showing the area analysis result of Co by EPMA in the sintered ferrite magnet (Sample 12) of Example 2.
Figure 11F:
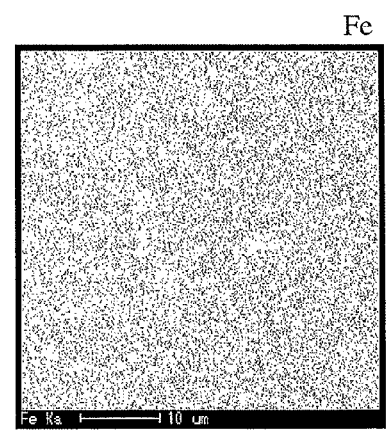
FIG. 11(f) is a photograph showing the area analysis result of Fe by EPMA in the sintered ferrite magnet (Sample 12) of Example 2.
Figure 11G:
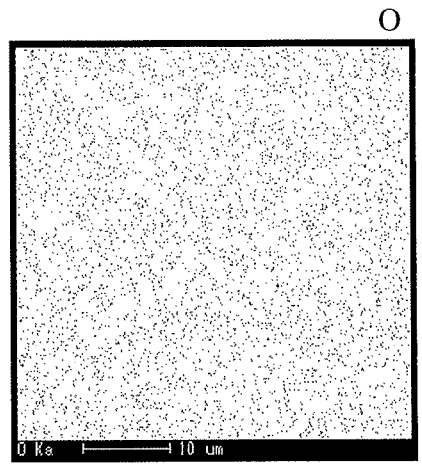
FIG. 11(g) is a photograph showing the area analysis result of O by EPMA in the sintered ferrite magnet (Sample 12) of Example 2.
Figure 11H:
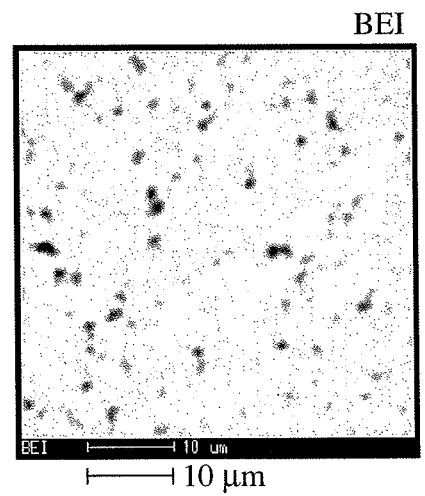
FIG. 11(h) is a photograph showing the backscattered electron image by EPMA of the sintered ferrite magnet (Sample 12) of Example 2.
Figure 12A:
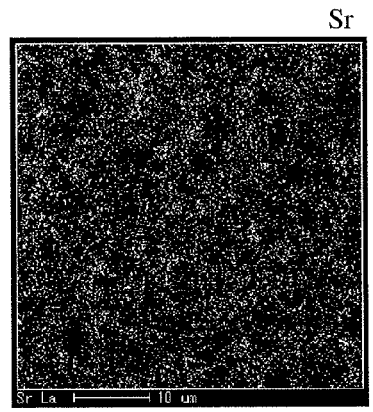
FIG. 12(a) is a photograph showing the area analysis result of Sr by EPMA in the sintered ferrite magnet (Sample 14) of Example 2.
Figure 12B:
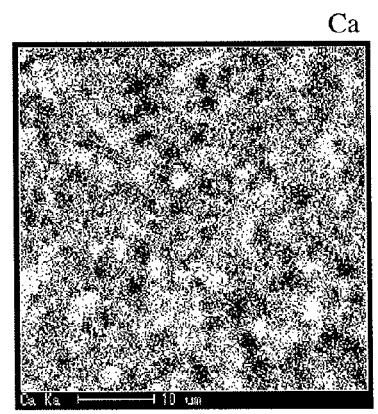
FIG. 12(b) is a photograph showing the area analysis result of Ca by EPMA in the sintered ferrite magnet (Sample 14) of Example 2.
Figure 12C:
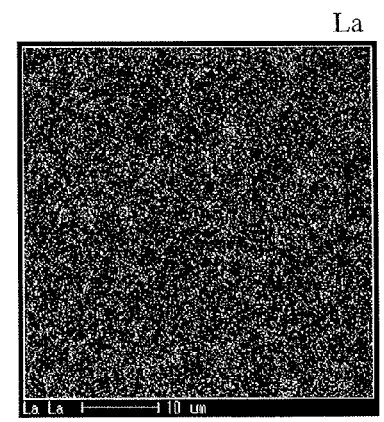
FIG. 12(c) is a photograph showing the area analysis result of La by EPMA in the sintered ferrite magnet (Sample 14) of Example 2.
Figure 12D:
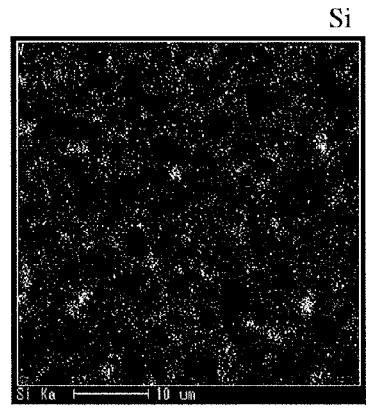
FIG. 12(d) is a photograph showing the area analysis result of Si by EPMA in the sintered ferrite magnet (Sample 14) of Example 2.
Figure 12E:
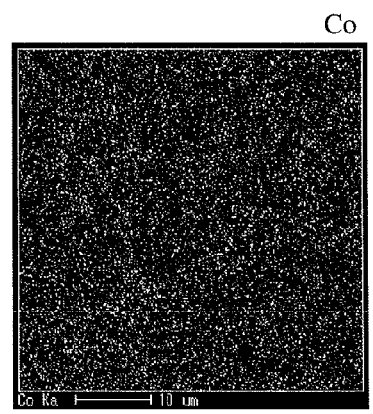
FIG. 12(e) is a photograph showing the area analysis result of Co by EPMA in the sintered ferrite magnet (Sample 14) of Example 2.
Figure 12F:
FIG. 12(f) is a photograph showing the area analysis result of Fe by EPMA in the sintered ferrite magnet (Sample 14) of Example 2.
Figure 12G:
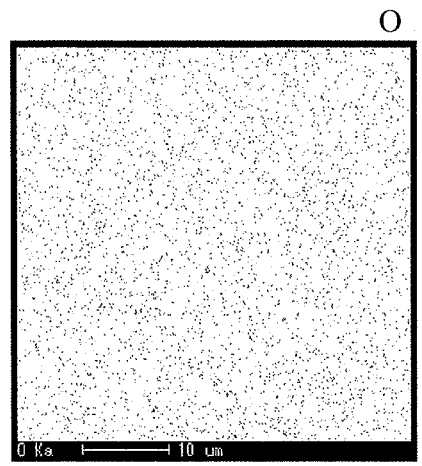
FIG. 12(g) is a photograph showing the area analysis result of O by EPMA in the sintered ferrite magnet (Sample 14) of Example 2.
Figure 12H:
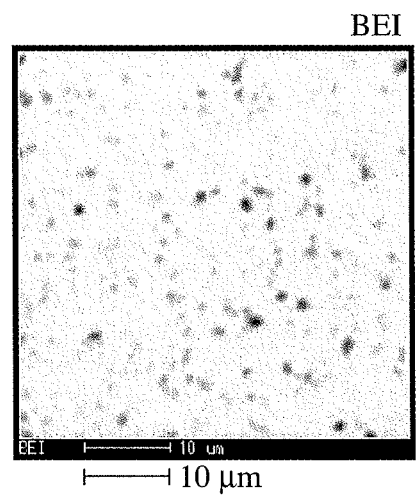
FIG. 12(h) is a photograph showing the backscattered electron image by EPMA of the sintered ferrite magnet (Sample 14) of Example 2.
Figure 13A:
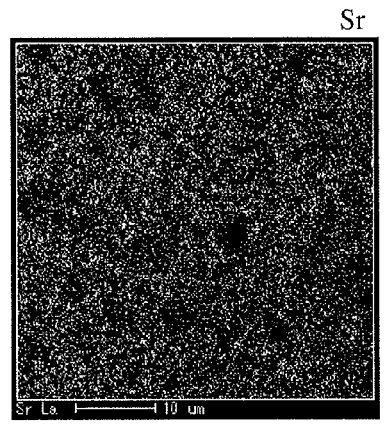
FIG. 13(a) is a photograph showing the area analysis result of Sr by EPMA in the sintered ferrite magnet (Sample 15) of Example 2.
Figure 13B:
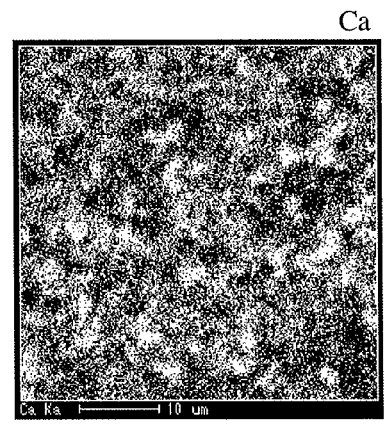
FIG. 13(b) is a photograph showing the area analysis result of Ca by EPMA in the sintered ferrite magnet (Sample 15) of Example 2.
Figure 13C:
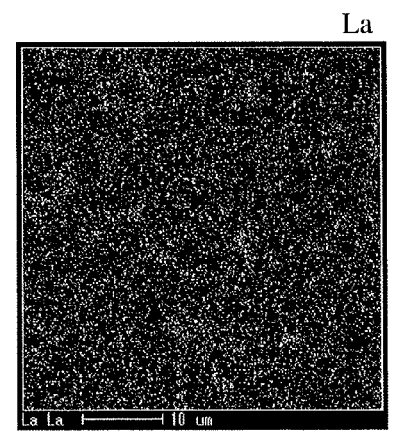
FIG. 13(c) is a photograph showing the area analysis result of La by EPMA in the sintered ferrite magnet (Sample 15) of Example 2.
Figure 13D:
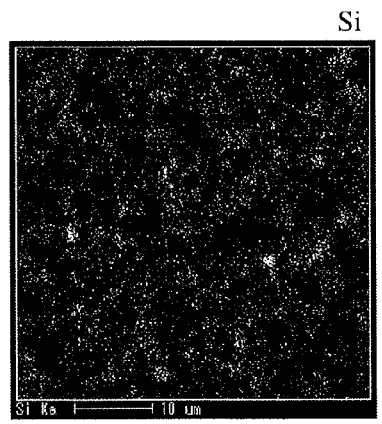
FIG. 13(d) is a photograph showing the area analysis result of Si by EPMA in the sintered ferrite magnet (Sample 15) of Example 2.
Figure 13E:
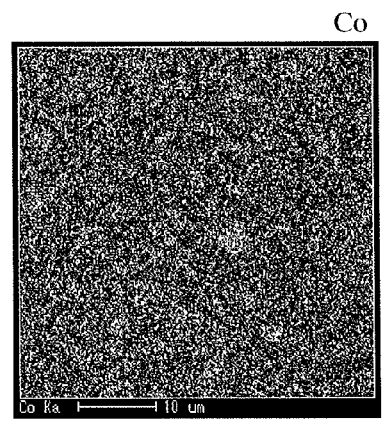
FIG. 13(e) is a photograph showing the area analysis result of Co by EPMA in the sintered ferrite magnet (Sample 15) of Example 2.
Figure 13F:
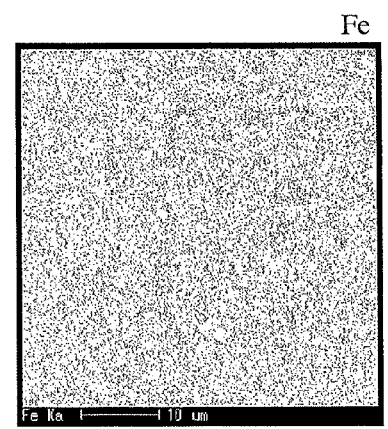
FIG. 13(f) is a photograph showing the area analysis result of Fe by EPMA in the sintered ferrite magnet (Sample 15) of Example 2.
Figure 13G:
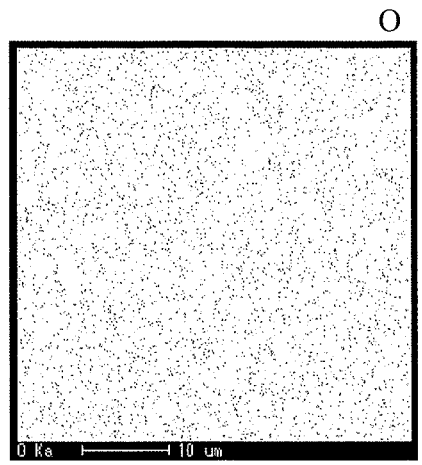
FIG. 13(g) is a photograph showing the area analysis result of O by EPMA in the sintered ferrite magnet (Sample 15) of Example 2.
Figure 13H:
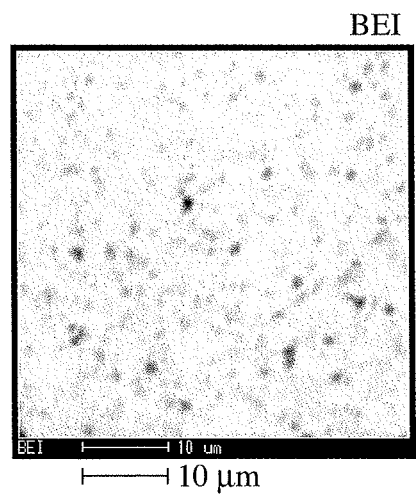
FIG. 13(h) is a photograph showing the backscattered electron image by EPMA of the sintered ferrite magnet (Sample 15) of Example 2.

The Curie temperatures of the resultant sintered ferrite magnets are shown in Tables 4-1 and 4-2, and FIGS. 8-1 to 8-3 and 9-1 to 9-3. The Curie temperatures were measured by the same method as in Example 1. FIGS. 8-1 to 8-3 are graphs showing the first Curie temperatures (Tc1) plotted against the mixing ratio (% by mass) of the calcined SrLaCo ferrite, and FIGS. 9-1 to 9-3 are graphs showing the second Curie temperatures (Tc2) plotted against the mixing ratio (% by mass) of the calcined SrLaCo ferrite.

As is clear from Tables 4-1 and 4-2 and FIGS. 8-1 to 8-3, the first Curie temperature (Tc1) of the sintered ferrite magnet of the present invention tended to increase as the mixing ratio of the calcined SrLaCo ferrite increased, in all combinations. In the calcined SrLaCo ferrite mixing ratio range of 10-50% by mass (90/10 to 50/50 by volume), the first Curie temperature (Tc1) changed in a range from about 415° C. to about 430° C., indicating that the sintered ferrite magnet of the present invention comprised a first granular ferrite compound phase containing Ca, La, Fe and Co and having a Curie temperature of 415° C. to 430° C.

As is clear from Tables 4-1 and 4-2 and FIGS. 9-1 to 9-3, the second Curie temperature (Tc2) of the sintered ferrite magnet of the present invention changed from about 437° C. to about 455° C. depending on the composition (particularly, the La content) of the calcined SrLaCo ferrite used, but it was substantially constant when the mixing ratio of the calcined SrLaCo ferrite changed. It was thus found that the sintered ferrite magnet of the present invention comprised a second granular ferrite compound phase containing Sr, La, Fe and Co and having a Curie temperature of 437° C. to 455° C.

Component Analysis

The component analysis results of the resultant sintered ferrite magnets are shown in Tables 5-1 and 5-2, and their compositions converted to atomic ratios and molar ratios are shown in Tables 6-1 and 6-2. The component analysis was conducted by an ICP optical emission spectrometer (ICPV-1017 available from Shimadzu Corporation).

TABLE 5-1

| Sample No. | Component Analysis of Sintered Body (% by mass) | | | | |
|---|---|---|---|---|---|
| | CaO | $La_2O_3$ | SrO | CoO | $SiO_2$ |
| 1[2] | 3.48 | 8.41 | 0.00 | 2.32 | 0.62 |
| 2[1] | 3.21 | 7.89 | 0.69 | 2.16 | 0.67 |
| 3[1] | 2.67 | 6.81 | 2.23 | 1.84 | 0.63 |
| 4[1] | 2.10 | 5.74 | 3.73 | 1.51 | 0.62 |
| 5[2] | 1.53 | 4.66 | 5.28 | 1.19 | 0.61 |
| 6[2] | 0.66 | 3.03 | 7.60 | 0.70 | 0.70 |

TABLE 5-1-continued

| Sample No. | Component Analysis of Sintered Body (% by mass) | | | | |
|---|---|---|---|---|---|
| | CaO | La$_2$O$_3$ | SrO | CoO | SiO$_2$ |
| 7[1] | 3.23 | 7.91 | 0.67 | 2.19 | 0.56 |
| 8[1] | 2.67 | 6.82 | 2.19 | 1.94 | 0.57 |
| 9[1] | 2.10 | 5.74 | 3.72 | 1.68 | 0.56 |
| 10[2] | 1.54 | 4.66 | 5.24 | 1.42 | 0.54 |
| 11[2] | 0.67 | 3.04 | 7.56 | 1.04 | 0.68 |
| 12[1] | 3.22 | 7.89 | 0.70 | 2.23 | 0.64 |
| 13[1] | 2.68 | 6.81 | 2.19 | 2.04 | 0.67 |
| 14[1] | 2.11 | 5.74 | 3.72 | 1.85 | 0.65 |
| 15[2] | 1.53 | 4.66 | 5.27 | 1.67 | 0.60 |
| 16[2] | 0.68 | 3.03 | 7.55 | 1.37 | 0.70 |
| 17[2] | 3.23 | 7.89 | 0.74 | 2.10 | 0.64 |
| 18[2] | 2.69 | 6.84 | 2.22 | 1.63 | 0.64 |
| 19[2] | 2.12 | 5.75 | 3.74 | 1.17 | 0.63 |
| 20[2] | 1.54 | 4.67 | 5.27 | 0.70 | 0.60 |
| 21[2] | 0.67 | 3.05 | 7.57 | 0.01 | 0.60 |
| 22[2] | 3.23 | 7.59 | 0.93 | 2.20 | 0.65 |
| 23[2] | 2.70 | 5.92 | 2.81 | 1.94 | 0.67 |
| 24[2] | 2.13 | 4.23 | 4.74 | 1.69 | 0.66 |
| 25[2] | 1.56 | 2.54 | 6.64 | 1.44 | 0.66 |
| 26[2] | 0.69 | 0.00 | 9.54 | 1.05 | 0.68 |
| 27[1] | 2.68 | 6.14 | 2.66 | 1.73 | 0.71 |
| 28[2] | 0.68 | 0.76 | 9.09 | 0.34 | 0.62 |
| 29[1] | 2.66 | 7.24 | 1.91 | 2.24 | 0.59 |
| 30[2] | 0.66 | 4.51 | 6.57 | 2.06 | 0.60 |
| 31[1] | 2.66 | 7.03 | 2.04 | 2.14 | 0.71 |
| 32[2] | 0.66 | 3.78 | 7.06 | 1.73 | 0.69 |

Note:
[1] Within the scope of the present invention.
[2] Comparative Example.

TABLE 5-2

| Sample No. | Component Analysis of Sintered Body (% by mass) | | | | |
|---|---|---|---|---|---|
| | CaO | La$_2$O$_3$ | SrO | CoO | SiO$_2$ |
| 33[2] | 3.41 | 8.46 | 0.00 | 2.66 | 0.66 |
| 34[1] | 3.14 | 7.92 | 0.68 | 2.53 | 0.62 |
| 35[1] | 2.60 | 6.81 | 2.21 | 2.27 | 0.78 |
| 36[1] | 2.06 | 5.74 | 3.72 | 2.02 | 0.61 |
| 37[2] | 1.51 | 4.66 | 5.25 | 1.76 | 0.60 |
| 38[2] | 2.88 | 9.80 | 0.00 | 3.01 | 0.64 |
| 39[1] | 2.68 | 9.15 | 0.68 | 2.86 | 0.59 |
| 40[1] | 2.24 | 7.79 | 2.20 | 2.53 | 0.65 |
| 41[1] | 1.80 | 6.43 | 3.71 | 2.20 | 0.59 |
| 42[2] | 1.35 | 5.07 | 5.24 | 1.87 | 0.58 |
| 43[1] | 3.34 | 7.77 | 0.86 | 2.15 | 0.63 |
| 44[1] | 2.77 | 6.39 | 2.55 | 1.84 | 0.64 |
| 45[1] | 2.16 | 4.99 | 4.22 | 1.50 | 0.63 |
| 46[2] | 1.57 | 3.62 | 5.88 | 1.17 | 0.59 |
| 47[2] | 0.67 | 1.55 | 8.59 | 0.71 | 0.61 |
| 48[1] | 3.30 | 7.75 | 0.84 | 2.15 | 0.63 |
| 49[1] | 2.75 | 6.58 | 2.37 | 1.91 | 0.60 |
| 50[1] | 2.15 | 5.35 | 3.91 | 1.65 | 0.59 |
| 51[2] | 1.57 | 4.13 | 5.56 | 1.41 | 0.58 |
| 52[2] | 0.66 | 2.33 | 8.03 | 1.06 | 0.60 |
| 53[2] | 3.62 | 8.47 | 0.06 | 1.95 | 0.59 |
| 54[1] | 3.34 | 7.91 | 0.77 | 1.88 | 0.59 |
| 55[1] | 2.75 | 6.85 | 2.24 | 1.77 | 0.57 |
| 56[1] | 2.15 | 5.75 | 3.72 | 1.65 | 0.57 |
| 57[2] | 1.55 | 4.69 | 5.30 | 1.57 | 0.61 |
| 58[2] | 3.61 | 8.46 | 0.07 | 2.15 | 0.60 |
| 59[1] | 3.35 | 7.96 | 0.77 | 2.05 | 0.59 |
| 60[1] | 2.75 | 6.86 | 2.23 | 1.89 | 0.59 |
| 61[1] | 2.15 | 5.74 | 3.74 | 1.75 | 0.58 |
| 62[2] | 1.57 | 4.70 | 5.16 | 1.60 | 0.59 |

Note:
[1] Within the scope of the present invention.
[2] Comparative Example.

TABLE 6-1

| Sample No. | Composition of Sintered Body | | | | | | | |
|---|---|---|---|---|---|---|---|---|
| | Converted Atomic Ratio and Molar Ratio | | | | | % by mass | | |
| | 1-x-a | x | a | y | n | SiO$_2$ | CaO | x/y |
| 1[2] | 0.490 | 0.510 | 0.000 | 0.305 | 5.42 | 0.62 | 0.70 | 1.67 |
| 2[1] | 0.448 | 0.484 | 0.067 | 0.289 | 5.50 | 0.67 | 0.70 | 1.67 |
| 3[1] | 0.356 | 0.424 | 0.218 | 0.248 | 5.57 | 0.63 | 0.70 | 1.71 |
| 4[1] | 0.259 | 0.364 | 0.373 | 0.208 | 5.69 | 0.62 | 0.70 | 1.75 |
| 5[2] | 0.157 | 0.302 | 0.537 | 0.168 | 5.80 | 0.61 | 0.70 | 1.80 |
| 6[2] | 0.000 | 0.202 | 0.797 | 0.102 | 5.99 | 0.70 | 0.66 | 1.98 |
| 7[1] | 0.450 | 0.486 | 0.065 | 0.293 | 5.49 | 0.56 | 0.70 | 1.66 |
| 8[1] | 0.357 | 0.426 | 0.215 | 0.263 | 5.60 | 0.57 | 0.70 | 1.62 |
| 9[1] | 0.259 | 0.366 | 0.372 | 0.233 | 5.70 | 0.56 | 0.70 | 1.57 |
| 10[2] | 0.158 | 0.302 | 0.535 | 0.201 | 5.83 | 0.54 | 0.70 | 1.50 |
| 11[2] | 0.000 | 0.204 | 0.795 | 0.152 | 6.00 | 0.68 | 0.67 | 1.34 |
| 12[1] | 0.449 | 0.484 | 0.068 | 0.297 | 5.48 | 0.64 | 0.70 | 1.63 |
| 13[1] | 0.358 | 0.424 | 0.215 | 0.276 | 5.59 | 0.67 | 0.70 | 1.54 |
| 14[1] | 0.260 | 0.364 | 0.372 | 0.256 | 5.69 | 0.65 | 0.70 | 1.42 |
| 15[2] | 0.157 | 0.302 | 0.536 | 0.235 | 5.80 | 0.60 | 0.70 | 1.29 |
| 16[2] | 0.000 | 0.202 | 0.794 | 0.200 | 6.01 | 0.70 | 0.68 | 1.01 |
| 17[2] | 0.448 | 0.480 | 0.071 | 0.278 | 5.45 | 0.64 | 0.70 | 1.73 |
| 18[2] | 0.358 | 0.424 | 0.217 | 0.220 | 5.54 | 0.64 | 0.70 | 1.93 |
| 19[2] | 0.260 | 0.364 | 0.372 | 0.161 | 5.67 | 0.63 | 0.70 | 2.26 |
| 20[2] | 0.157 | 0.302 | 0.536 | 0.099 | 5.80 | 0.60 | 0.70 | 3.05 |
| 21[2] | 0.000 | 0.204 | 0.795 | 0.002 | 6.00 | 0.60 | 0.67 | 102 |
| 22[2] | 0.447 | 0.464 | 0.089 | 0.292 | 5.45 | 0.65 | 0.70 | 1.59 |
| 23[2] | 0.359 | 0.366 | 0.273 | 0.261 | 5.54 | 0.67 | 0.70 | 1.40 |
| 24[2] | 0.261 | 0.266 | 0.468 | 0.231 | 5.66 | 0.66 | 0.70 | 1.15 |
| 25[2] | 0.161 | 0.162 | 0.670 | 0.200 | 5.80 | 0.66 | 0.70 | 0.81 |
| 26[2] | 0.000 | 0.000 | 0.992 | 0.150 | 6.01 | 0.68 | 0.69 | 0.00 |
| 27[1] | 0.357 | 0.382 | 0.259 | 0.234 | 5.56 | 0.71 | 0.70 | 1.63 |
| 28[2] | 0.000 | 0.050 | 0.945 | 0.049 | 5.99 | 0.62 | 0.68 | 1.02 |
| 29[1] | 0.357 | 0.454 | 0.188 | 0.305 | 5.60 | 0.59 | 0.70 | 1.49 |
| 30[2] | 0.000 | 0.304 | 0.697 | 0.303 | 6.04 | 0.60 | 0.66 | 1.00 |
| 31[1] | 0.357 | 0.440 | 0.201 | 0.291 | 5.60 | 0.71 | 0.70 | 1.51 |
| 32[2] | 0.000 | 0.254 | 0.747 | 0.253 | 6.03 | 0.69 | 0.66 | 1.00 |

Note:
[1] Within the scope of the present invention.
[2] Comparative Example.

TABLE 6-2

| Sample No. | Composition of Sintered Body | | | | | | | |
|---|---|---|---|---|---|---|---|---|
| | Converted Atomic Ratio and Molar Ratio | | | | | % by mass | | |
| | 1-x-a | x | a | y | n | SiO$_2$ | CaO | x/y |
| 33[2] | 0.482 | 0.518 | 0.000 | 0.355 | 5.48 | 0.66 | 0.70 | 1.46 |
| 34[1] | 0.441 | 0.492 | 0.067 | 0.343 | 5.57 | 0.62 | 0.70 | 1.43 |
| 35[1] | 0.349 | 0.430 | 0.219 | 0.312 | 5.65 | 0.78 | 0.70 | 1.38 |
| 36[1] | 0.253 | 0.368 | 0.375 | 0.281 | 5.75 | 0.61 | 0.70 | 1.31 |
| 37[2] | 0.153 | 0.304 | 0.538 | 0.250 | 5.85 | 0.60 | 0.70 | 1.22 |
| 38[2] | 0.393 | 0.608 | 0.000 | 0.405 | 5.49 | 0.64 | 0.70 | 1.50 |
| 39[1] | 0.360 | 0.574 | 0.067 | 0.389 | 5.56 | 0.59 | 0.70 | 1.48 |
| 40[1] | 0.283 | 0.494 | 0.220 | 0.349 | 5.66 | 0.65 | 0.70 | 1.42 |
| 41[1] | 0.206 | 0.414 | 0.376 | 0.308 | 5.76 | 0.59 | 0.70 | 1.34 |
| 42[2] | 0.124 | 0.332 | 0.539 | 0.266 | 5.86 | 0.58 | 0.70 | 1.25 |
| 43[1] | 0.454 | 0.464 | 0.081 | 0.279 | 5.33 | 0.63 | 0.70 | 1.66 |
| 44[1] | 0.363 | 0.390 | 0.244 | 0.243 | 5.45 | 0.64 | 0.70 | 1.60 |
| 45[1] | 0.264 | 0.314 | 0.417 | 0.205 | 5.63 | 0.63 | 0.70 | 1.53 |
| 46[2] | 0.162 | 0.234 | 0.596 | 0.165 | 5.81 | 0.59 | 0.70 | 1.42 |
| 47[2] | 0.000 | 0.102 | 0.886 | 0.101 | 5.91 | 0.61 | 0.67 | 1.01 |
| 48[1] | 0.452 | 0.468 | 0.080 | 0.282 | 5.38 | 0.63 | 0.70 | 1.66 |
| 49[1] | 0.364 | 0.404 | 0.229 | 0.256 | 5.50 | 0.60 | 0.70 | 1.58 |
| 50[1] | 0.265 | 0.340 | 0.390 | 0.228 | 5.70 | 0.59 | 0.70 | 1.49 |
| 51[2] | 0.161 | 0.266 | 0.564 | 0.198 | 5.81 | 0.58 | 0.70 | 1.34 |
| 52[2] | 0.000 | 0.154 | 0.834 | 0.152 | 5.95 | 0.60 | 0.66 | 1.01 |
| 53[2] | 0.495 | 0.498 | 0.005 | 0.249 | 5.23 | 0.59 | 0.70 | 2.00 |
| 54[1] | 0.454 | 0.472 | 0.073 | 0.244 | 5.33 | 0.59 | 0.70 | 1.93 |
| 55[1] | 0.362 | 0.420 | 0.216 | 0.236 | 5.48 | 0.57 | 0.70 | 1.78 |
| 56[1] | 0.264 | 0.362 | 0.369 | 0.226 | 5.65 | 0.57 | 0.70 | 1.60 |
| 57[2] | 0.158 | 0.300 | 0.534 | 0.219 | 5.75 | 0.61 | 0.70 | 1.37 |
| 58[2] | 0.495 | 0.500 | 0.006 | 0.276 | 5.26 | 0.60 | 0.70 | 1.81 |
| 59[1] | 0.455 | 0.472 | 0.071 | 0.265 | 5.31 | 0.59 | 0.70 | 1.78 |

TABLE 6-2-continued

| Sample No. | Composition of Sintered Body | | | | | | |
|---|---|---|---|---|---|---|---|
| | Converted Atomic Ratio and Molar Ratio | | | | % by mass | | |
| | 1-x-a | x | a | y | n | $SiO_2$ | CaO | x/y |
| $60^{(1)}$ | 0.362 | 0.420 | 0.215 | 0.252 | 5.47 | 0.59 | 0.70 | 1.67 |
| $61^{(1)}$ | 0.263 | 0.362 | 0.370 | 0.239 | 5.64 | 0.58 | 0.70 | 1.51 |
| $62^{(2)}$ | 0.162 | 0.304 | 0.526 | 0.226 | 5.82 | 0.59 | 0.70 | 1.35 |

Note:
$^{(1)}$Within the scope of the present invention.
$^{(2)}$Comparative Example.

To enable comparison with the calcined ferrite mixtures, the component analysis results (% by mass) of Ca, La, Sr, Fe and Co were converted to atomic ratios and molar ratios, and the amounts of $SiO_2$ and $CaCO_3$ added to the calcined ferrite mixtures were expressed by mass ratios (% by mass) based on the total amount (100% by mass) of $CaCO_3$, $La(OH)_3$, $SrCO_3$, $Fe_2O_3$ and $Co_3O_4$.

It was assumed that all $SiO_2$ and $CaCO_3$ added to the calcined ferrite mixtures were accumulated between crystal grains (in grain boundaries or grain-boundary triple points) in the sintered magnets. However, because $CaCO_3$ added as a starting material powder and $CaCO_3$ added to the calcined ferrite mixtures are not discernible by component analysis, the amount of Ca added to the calcined ferrite mixtures was expressed by an amount as CaO, and it was subtracted from the component analysis results to calculate the atomic ratios and molar ratios of the compound phases. When $CaCO_3$ was not added as a starting material powder (when the mixing ratio of the SrLaCo ferrite was 100% by mass), all CaO determined by component analysis was derived from $CaCO_3$ added to the calcined ferrite mixtures. Thus, it was subtracted to calculate the atomic ratios and molar ratios of the compound phases. Unevenness in the amount of $SiO_2$ was due to the inclusion of $SiO_2$ as impurity in $Fe_2O_3$ powder used as a starting material powder, in addition to $SiO_2$ added to the calcined ferrite mixture.

The comparison of the compositions (by atomic ratio and molar ratio) of the calcined ferrite mixtures shown in Tables 3-1 and 3-2 and those of the sintered ferrite magnets shown in Tables 6-1 and 6-2 revealed that the calcined ferrite mixtures and the sintered ferrite magnets are substantially the same in composition.

As described above, because the first and second ferrite compound phases seem to be free from mutual diffusion, it is considered that the volume ratio of the first granular ferrite compound phase to the second granular ferrite compound phase in the sintered ferrite magnet is the same as the mass ratio of the calcined CaLaCo ferrite to the calcined SrLaCo ferrite.

Thus, with the relation between the mixing ratio of the calcined CaLaCo ferrite to the calcined SrLaCo ferrite and the composition (calculated) of the calcined ferrite mixture determined in advance, the volume ratio can be determined from the component analysis results of the sintered ferrite magnet.

Area Analysis of Each Element in Sintered Ferrite Magnets

The area analysis of each element by EPMA in the sintered ferrite magnets of Samples 1, 12, 14 and 15 was conducted by the same apparatus under the same conditions as in Example 1. The above samples were sintered ferrite magnets obtained by mixing calcined CaLaCo ferrite (Calcined Body C-1) having a composition represented by $Ca_{1-x'-c'}La_{x'}A_{c'}Fe_{2n'-y'}Co_{y'}$, wherein x'=0.5, c'=0, y'=0.3, and n'=5.2, with calcined SrLaCo ferrite (Calcined Body S-3) having a composition represented by $Sr_{1-x''}La_{x''}Fe_{2n''-y''}Co_{y''}$, wherein x''=0.2, y''=0.2, and n''=5.8, at calcined SrLaCo ferrite mixing ratios by mass of 0%, 10%, 50% and 70%, respectively. The results of Samples 1, 12, 14 and 15 are shown in FIGS. 10(a) to 10(h), 11(a) to 11(h), 12(a) to 12(h), and 13(a) to 13(h), respectively. Incidentally, Sample 13 at a mixing ratio of 30% by mass was the same as the sintered ferrite magnet produced in Example 1, whose area analysis results of each element by EPMA were obtained from Example 1 [FIGS. 3(a) to 3(h)].

It is clear from FIGS. 3(a), 10(a), 11(a), 12(a) and 13(a) each showing the concentration distribution of Sr that as the mixing ratio of the calcined SrLaCo ferrite increases, the concentration of Sr becomes higher, resulting in a larger proportion of white portions. It is also clear from FIGS. 3(b), 10(b), 11(b), 12(b) and 13(b) each showing the concentration distribution of Ca that as the mixing ratio of the calcined SrLaCo ferrite increases, the concentration of Ca becomes lower, resulting in a larger proportion of black portions. It is further clear from FIGS. 3(d), 10(d), 11(d), 12(d) and 13(d) each showing the concentration distribution of Ca and the concentration distribution of Si that $CaCO_3$ and $SiO_2$ added to the calcined ferrite mixture are accumulated mostly between particles, in grain boundaries, particularly in grain-boundary triple points.

These results indicate that the sintered ferrite magnet of the present invention comprises a first granular ferrite compound phase containing Ca, La, Fe and Co, and a second granular ferrite compound phase containing Sr, La, Fe and Co, as verified by Example 1.

Temperature coefficients of residual magnetic flux density $B_r$ and coercivity

Figure 14:
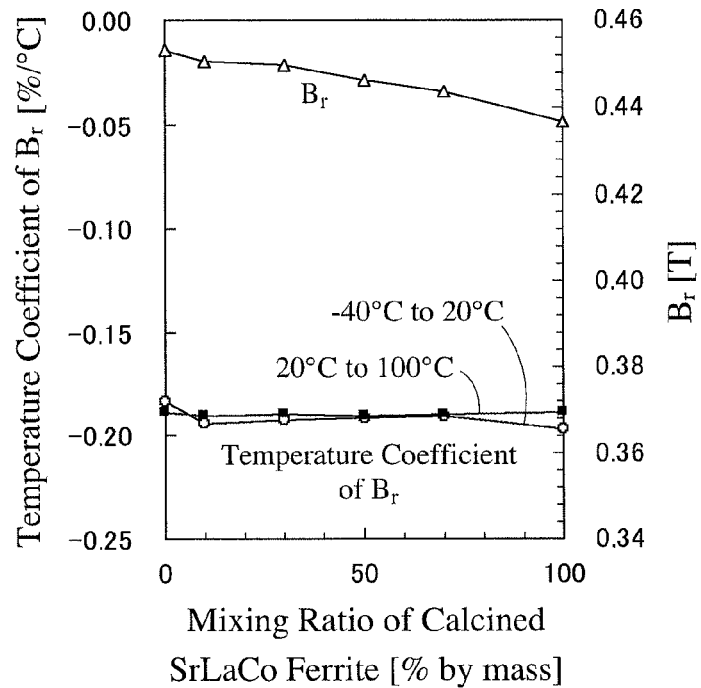
FIG. 14 is a graph showing the relation between a mixing ratio of calcined SrLaCo ferrite, and $B_r$ and its temperature coefficient in the sintered ferrite magnet of Example 2.
Figure 15:
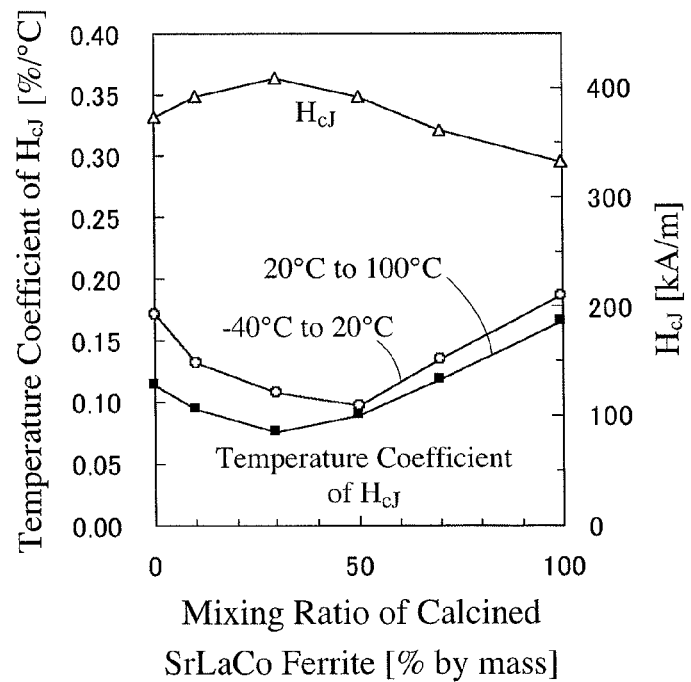
FIG. 15 is a graph showing the relation between a mixing ratio of calcined SrLaCo ferrite, and $H_{cJ}$ and its temperature coefficient in the sintered ferrite magnet of Example 2.

The temperature coefficients (between −40° C. and 20° C., and between 20° C. and 100° C.) of $B_r$ and $H_{cJ}$ of the sintered SrLaCo ferrite magnets of Samples 1, 12-15 and 16, on which the area analysis of each element was conducted by EPMA, are shown in FIGS. 14 and 15. FIG. 14 is a graph showing the temperature coefficient of $B_r$ (the left axis of ordinates) and $B_r$ (the right axis of ordinates) plotted against the mixing ratio of the calcined SrLaCo ferrite, and FIG. 15 is a graph showing the temperature coefficient of $H_{cJ}$ (the left axis of ordinates) and $H_{cJ}$ (the right axis of ordinates) plotted against the mixing ratio of the calcined SrLaCo ferrite.

As is clear from FIGS. 14 and 15, the temperature coefficient of $B_r$ is substantially constant regardless of the mixing ratio of the calcined SrLaCo ferrite, while the temperature coefficient of $H_{cJ}$ is small in a mixing ratio range of 10-50% by mass, and smallest at a mixing ratio of about 50% by mass between −40° C. and 20° C., and at a mixing ratio of about 30% by mass between 20° C. and 100° C.

It was thus found that the sintered ferrite magnet of the present invention was resistant to demagnetization by a demagnetizing field even at low temperatures. Accordingly, the sintered ferrite magnets of the present invention can provide small, light-weight, high-performance electric automobile parts and electric appliance parts.

EXAMPLE 3

Preparation of Calcined CaLaCo Ferrite $CaCO_3$ powder, $La(OH)_3$ powder, $BaCO_3$ powder, $Fe_2O_3$ powder and $Co_3O_4$ powder were mixed to have a calcined body composition represented by $Ca_{1-x'-c'}La_{x'}A_{c'}Fe_{2n'-y'}Co_{y'}$, wherein A was Ba, and 1-x'-c', x', c', y' and n' were shown in No. C-6 in Table 1-1, and 100% by mass of the resultant mixed powder was mixed with 0.1% by mass of $H_3BO_3$ to obtain a mixed starting material powder. With water added, this mixed starting material powder was wet-ball-milled for 4 hours, dried, granulated, and then calcined at 1300° C. for 3 hours in the air. The resultant calcined body was coarsely pulverized by a hummer mill to prepare coarse powder of calcined CaLaCo ferrite (Calcined Body C-6).

Preparation of Calcined SrLaCo Ferrite $SrCO_3$ powder, $La(OH)_3$ powder, $Fe_2O_3$ powder and $Co_3O_4$ powder were mixed to have a calcined body composition represented by $Sr_{1-x''}La_{x''}Fe_{2n''-y''}Co_{y''}$, wherein 1-x", x", y" and n" were shown in No. S-11 in Table 1-2, and 100% by mass of the resultant mixed powder was mixed with 0.1% by mass of $H_3BO_3$ to obtain a mixed starting material powder. With water added, this mixed starting material powder was wet-ball-milled for 4 hours, dried, granulated, and then calcined at 1250° C. for 3 hours in the air. The resultant calcined body was coarsely pulverized by a hummer mill to prepare coarse powder of calcined SrLaCo ferrite (Calcined Body S-11).

Production of Sintered Ferrite Magnets

The calcined CaLaCo ferrite and the calcined SrLaCo ferrite thus prepared were mixed at calcined SrLaCo ferrite mixing ratios (by mass) of 0%, 10%, 30%, 40%, 50%, 70%, 90% and 100%, such that the volume ratio of the first ferrite compound phase to the second ferrite compound phase was 100/0, 90/10, 70/30, 60/40, 50/50, 30/70, 10/90, and 0/100, respectively, as shown in Table 7, to produce calcined ferrite mixtures having the compositions shown in Table 8. 100% by mass of each calcined ferrite mixture was mixed with 0.6% by mass of $SiO_2$ powder and 0.7% by mass (as CaO) of $CaCO_3$ powder, and finely pulverized with water by a wet ball mill to an average particle size (measured by an air permeability method) of 0.6 μm, thereby obtaining a slurry. Each fine powder slurry was molded under pressure of about 50 MPa in a magnetic field of about 1 T in parallel to a compression direction, while removing water. The resultant green bodies were sintered at 1200° C. for 1 hour in the air to obtain sintered ferrite magnets.

TABLE 7

| Sample No. | Calcined CaLaCo Ferrite | Calcined SrLaCo Ferrite | Mixing Ratio of SrLaCo Ferrite[1] (% by mass) |
|---|---|---|---|
| 63[3] | C-6 | — | 0 |
| 64[2] | C-6 | S-11 | 10 |
| 65[2] | C-6 | S-11 | 30 |
| 66[2] | C-6 | S-11 | 40 |
| 67[2] | C-6 | S-11 | 50 |
| 68[3] | C-6 | S-11 | 70 |
| 69[3] | C-6 | S-11 | 90 |
| 70[3] | — | S-11 | 100 |

Note:
[1]A mixing ratio of calcined SrLaCo ferrite in the calcined ferrite mixture.
[2]Within the scope of the present invention.
[3]Comparative Example.

TABLE 8

| Sample No. | Composition of Calcined Ferrite Mixture $Ca_{1-x-a}La_xSr_aBa_bFe_{2n-y}Co_y$ | | | | | |
|---|---|---|---|---|---|---|
| | 1-x-a-b | x | a | b | y | n |
| 63[2] | 0.45 | 0.50 | 0.00 | 0.050 | 0.30 | 5.30 |
| 64[1] | 0.41 | 0.47 | 0.08 | 0.045 | 0.29 | 5.33 |
| 65[1] | 0.32 | 0.42 | 0.23 | 0.035 | 0.25 | 5.36 |
| 66[1] | 0.27 | 0.39 | 0.31 | 0.030 | 0.24 | 5.39 |
| 67[1] | 0.23 | 0.36 | 0.39 | 0.025 | 0.22 | 5.40 |
| 68[2] | 0.14 | 0.30 | 0.55 | 0.015 | 0.19 | 5.44 |

TABLE 8-continued

| Sample No. | Composition of Calcined Ferrite Mixture $Ca_{1-x-a}La_xSr_aBa_bFe_{2n-y}Co_y$ | | | | | |
|---|---|---|---|---|---|---|
| | 1-x-a-b | x | a | b | y | n |
| 69[2] | 0.05 | 0.24 | 0.71 | 0.005 | 0.16 | 5.49 |
| 70[2] | 0.00 | 0.20 | 0.80 | 0.000 | 0.14 | 5.51 |

Note:
[1]Within the scope of the present invention.
[2]Comparative Example.

Evaluation of Magnetic Properties

Figure 16:
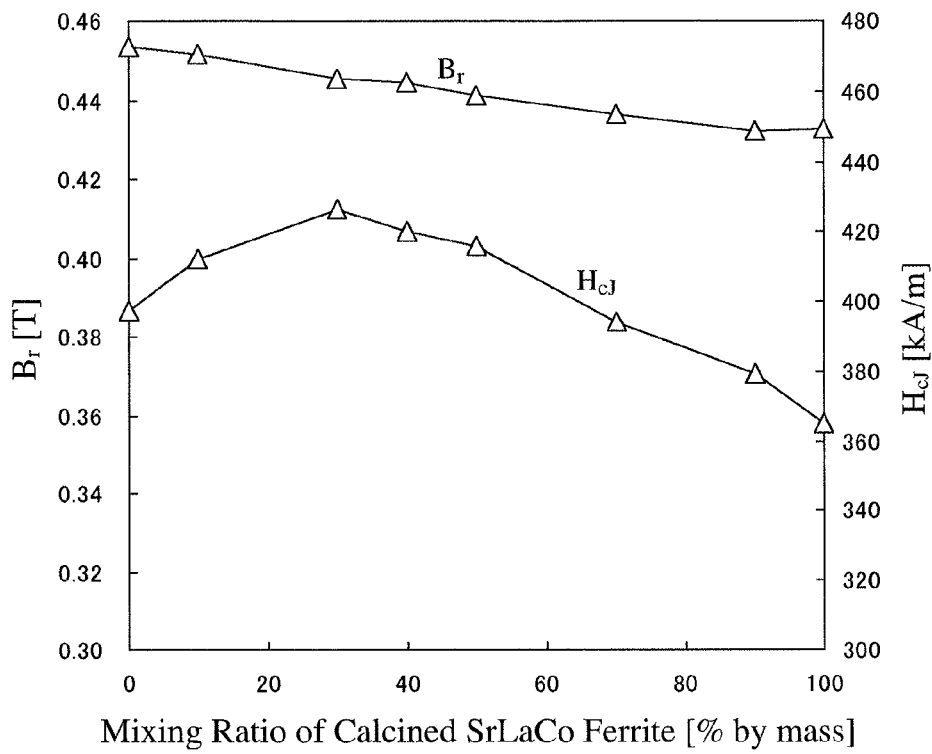
FIG. 16 is a graph showing the relation between a mixing ratio of calcined SrLaCo ferrite, and $B_r$ and $H_{cJ}$ in the sintered ferrite magnet of Example 3.
Figure 17:
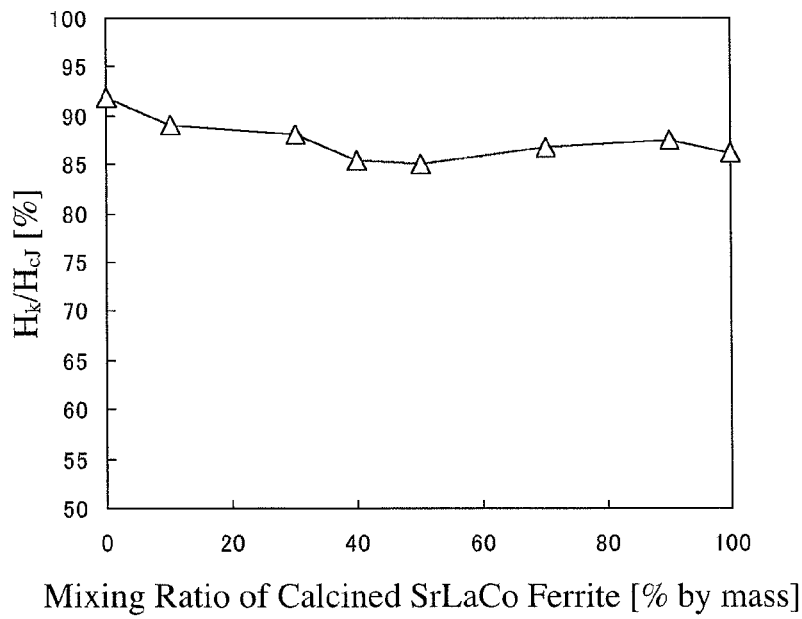
FIG. 17 is a graph showing the relation between a mixing ratio of calcined SrLaCo ferrite and $H_{cJ}$ in the sintered ferrite magnet of Example 3.

The magnetic properties of the resultant sintered ferrite magnets are shown in Table 9, and FIGS. 16 and 17. FIGS. 16 and 17 are graphs showing $B_r$ (the left axis of ordinates in FIG. 16), $H_{cJ}$ (the right axis of ordinates in FIG. 16) and $H_k/H_{cJ}$ (FIG. 17) plotted against the mixing ratio (% by mass) of the calcined SrLaCo ferrite. $H_k$ in $H_k/H_{cJ}$ is the value of H at J=0.95 $B_r$ in a curve of J (magnetization) to H (intensity of magnetic field) in the second quadrant.

TABLE 9

| Sample No. | Curie Temperature | | Magnetic Properties | | | |
|---|---|---|---|---|---|---|
| | Tc1 (° C.) | Tc2 (° C.) | $B_r$ (T) | $H_{cJ}$ (kA/m) | $H_k/H_{cJ}$ (%) | $(BH)_{max}$ (kJ/m³) |
| 63[2] | 417.5 | — | 0.454 | 397 | 91.8 | 40.3 |
| 64[1] | 419.1 | 440.2 | 0.451 | 412 | 89.0 | 39.9 |
| 65[1] | 423.0 | 440.3 | 0.446 | 426 | 88.1 | 38.7 |
| 66[1] | 425.0 | 440.2 | 0.445 | 420 | 85.5 | 38.5 |
| 67[1] | 427.6 | 440.4 | 0.441 | 416 | 85.1 | 37.9 |
| 68[2] | 431.8 | 440.4 | 0.437 | 394 | 86.8 | 37.1 |
| 69[2] | —[3] | 439.3 | 0.432 | 379 | 87.5 | 36.2 |
| 70[2] | — | 440.9 | 0.433 | 365 | 86.2 | 36.2 |

Note:
[1]Within the scope of the present invention.
[2]Comparative Example.
[3]Difficult to analyze.

As is clear from FIG. 16, $H_{cJ}$ was dramatically improved in a mixing ratio range of 10-50% by mass (90/10 to 50/50 by volume), particularly high in a range of 20-40% by mass, and highest at 30% by mass, relative to a straight line connecting $H_{cJ}$ at a calcined SrLaCo ferrite mixing ratio of 0% by mass (namely, the sintered CaLaCo ferrite magnet) to $H_{cJ}$ at a calcined SrLaCo ferrite mixing ratio of 100% by mass (namely, the sintered SrLaCo ferrite magnet). Further, the sintered ferrite magnets in a mixing ratio range of 10-50% by mass had higher $H_{cJ}$ than that of the sintered ferrite magnet having a mixing ratio of 0% by mass (the sintered CaLaCo ferrite magnet). On the other hand, $B_r$ did not substantially decrease or slightly decreased in a mixing ratio range of 10-50% by mass, relative to $B_r$ of the sintered ferrite magnet having a mixing ratio of 0% by mass (the sintered CaLaCo ferrite magnet). As is clear from FIG. 17, excellent $H_k/H_{cJ}$ of 85% or more was obtained in a mixing ratio range of 10-50% by mass.

By comparing Sample 65 (mixing ratio: 30%) in this Example with Sample 8 in Example 2 having substantially the same composition except for adding no Ba as an element A to the calcined CaLaCo ferrite, it was revealed that the sintered magnet of this Example in which Ba was added as an element A to the calcined CaLaCo ferrite had higher $H_{cJ}$.

Curie Temperature

Figure 22:
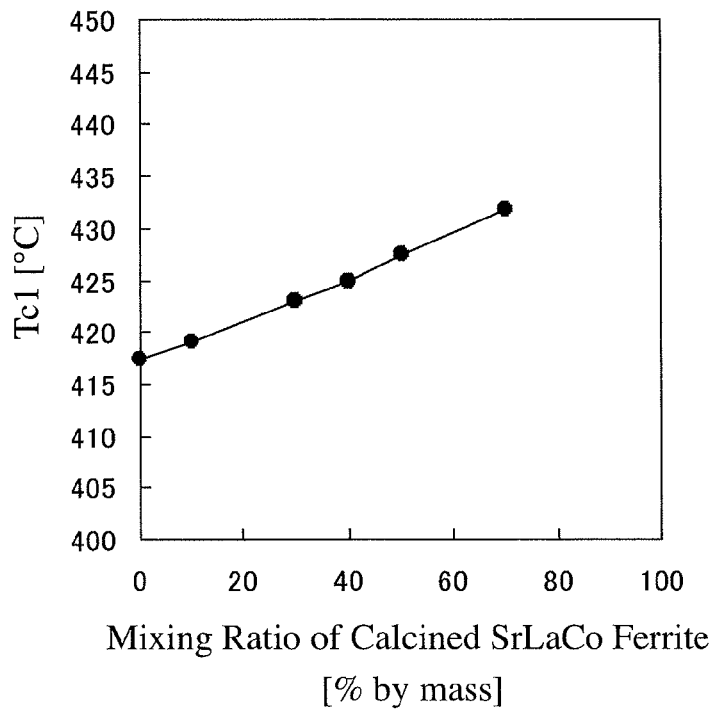
FIG. 22 is a graph showing the relation between a mixing ratio of calcined SrLaCo ferrite and a first Curie temperature (Tc1) in the sintered ferrite magnet of Example 3.
Figure 23:
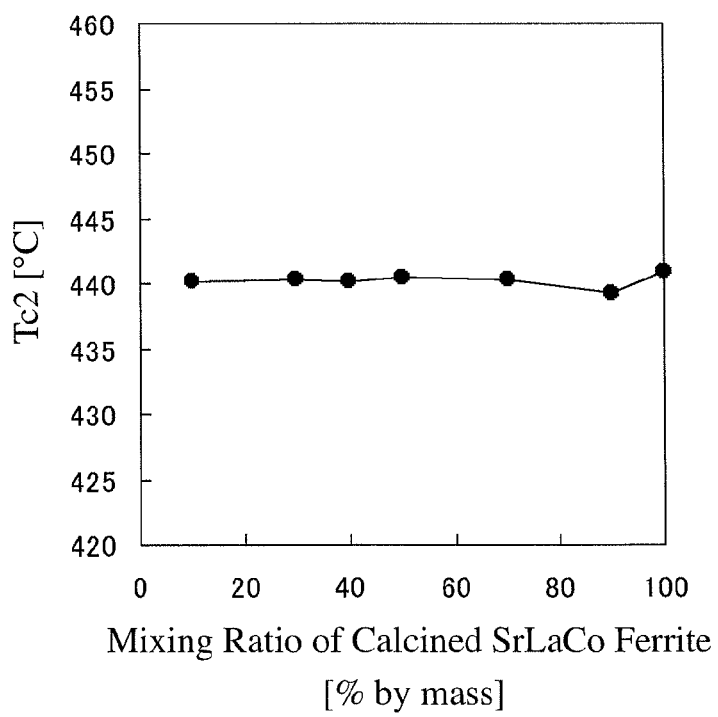
FIG. 23 is a graph showing the relation between a mixing ratio of calcined SrLaCo ferrite and a second Curie temperature (Tc2) in the sintered ferrite magnet of Example 3.

The Curie temperatures of the resultant sintered ferrite magnets are shown in Table 9 and FIGS. 22 and 23. The Curie temperatures were measured by the same method as in Example 1. FIG. 22 is a graph showing the first Curie temperature (Tc1) plotted against the mixing ratio (% by mass) of the calcined SrLaCo ferrite, and FIG. 23 is a graph showing the second Curie temperature (Tc2) plotted against the mixing ratio (% by mass) of the calcined SrLaCo ferrite. As in Example 2, the first Curie temperature (Tc1) tended to elevate as the mixing ratio of the calcined SrLaCo ferrite increased, changing from about 419° C. to about 428° C. in a mixing ratio range of the calcined SrLaCo ferrite of 10-50% by mass (90/10 to 50/50 by volume), in which the preferred magnetic properties were obtained. On the other hand, the second Curie temperature (Tc2) was substantially constant regardless of the mixing ratio of the calcined SrLaCo ferrite.

Component Analysis

The component analysis results of the sintered ferrite magnets are shown in Table 10, and the atomic ratios and molar ratios converted from the compositions are shown in Table 11. The component analysis, and the conversion of the analyzed compositions to atomic ratios and molar ratios were conducted by the same method as in Example 2. By comparing the compositions (atomic ratios and molar ratios) of the calcined ferrite mixtures shown in Table 8 with those of the sintered ferrite magnets shown in Table 11, the calcined ferrite mixtures had substantially the same compositions as those of the sintered ferrite magnets.

TABLE 10

| Sample No. | Component Analysis of Sintered Body (% by mass) | | | | | |
|---|---|---|---|---|---|---|
| | CaO | La$_2$O$_3$ | SrO | BaO | CoO | SiO$_2$ |
| 63 | 3.31 | 8.26 | 0.00 | 0.79 | 2.24 | 0.59 |
| 64 | 2.90 | 7.72 | 0.78 | 0.70 | 2.14 | 0.70 |
| 65 | 2.42 | 6.78 | 2.31 | 0.58 | 1.89 | 0.74 |
| 66 | 2.19 | 6.27 | 3.05 | 0.52 | 1.77 | 0.70 |
| 67 | 1.93 | 5.78 | 3.81 | 0.46 | 1.64 | 0.74 |
| 68 | 1.44 | 4.80 | 5.31 | 0.34 | 1.39 | 0.79 |
| 69 | 0.93 | 3.84 | 6.84 | 0.22 | 1.15 | 0.79 |
| 70 | 0.68 | 3.32 | 7.69 | 0.16 | 1.03 | 0.81 |

TABLE 11

| Sample No. | Composition of Sintered Body | | | | | | | | |
|---|---|---|---|---|---|---|---|---|---|
| | Converted Atomic Ratio and Molar Ratio | | | | | | % by mass | | |
| | 1-x-a-b | x | a | b | y | n | SiO$_2$ | CaO | x/y |
| 63 | 0.453 | 0.496 | 0.000 | 0.050 | 0.293 | 5.35 | 0.59 | 0.70 | 1.69 |
| 64 | 0.398 | 0.480 | 0.077 | 0.046 | 0.289 | 5.53 | 0.70 | 0.70 | 1.66 |
| 65 | 0.312 | 0.422 | 0.226 | 0.039 | 0.257 | 5.57 | 0.74 | 0.70 | 1.64 |
| 66 | 0.271 | 0.394 | 0.301 | 0.035 | 0.241 | 5.59 | 0.70 | 0.70 | 1.63 |
| 67 | 0.225 | 0.366 | 0.379 | 0.031 | 0.226 | 5.63 | 0.74 | 0.70 | 1.62 |
| 68 | 0.137 | 0.306 | 0.533 | 0.023 | 0.193 | 5.70 | 0.79 | 0.70 | 1.59 |
| 69 | 0.043 | 0.248 | 0.694 | 0.015 | 0.162 | 5.76 | 0.79 | 0.70 | 1.53 |
| 70 | 0.000 | 0.214 | 0.779 | 0.011 | 0.144 | 5.74 | 0.81 | 0.68 | 1.49 |

Even when Ba was added as an element A to the calcined CaLaCo ferrite, the same results and effects as in Example 2 in which the element A was not added were obtained.

Analysis by TEM/EDX

Figure 18A:
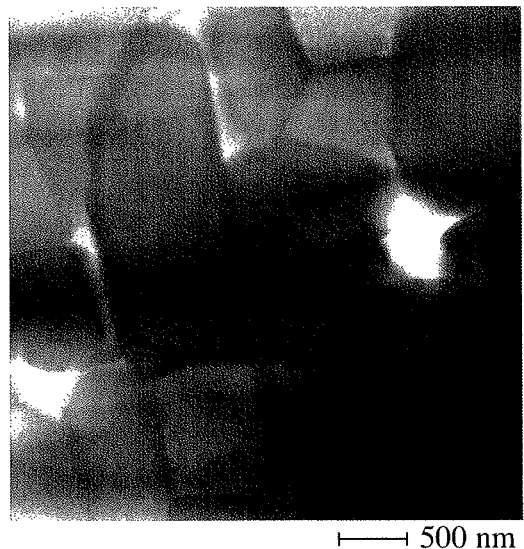
FIG. 18 (a) is a photograph showing the bright-field STEM image by TEM/EDX of the sintered ferrite magnet of Example 3.
Figure 18B:
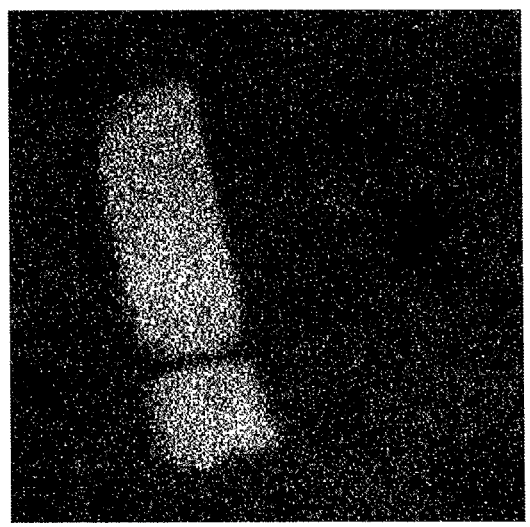

The analysis results of the sintered ferrite magnet of Sample 65 by TEM/EDX are shown in FIG. 18. The analysis by TEM/EDX was conducted by TEM (HF-2100 available from Hitachi Ltd.) and EDX (VOYAGER III available from NORAN) at acceleration voltage of 200 kV. FIG. 18 (a) shows a bright-field STEM image, and FIG. 18 (b) shows the concentration distribution of Sr. Like the area analysis results by EPMA of each element in Example 1, the brighter, the higher the concentration of Sr, and vice versa.

FIG. 18 (b) indicates that the sample comprises high-Sr-concentration particles and low-Sr-concentration particles. The High-Sr-concentration particles corresponded to the second granular ferrite compound phase derived from the calcined SrLaCo ferrite. Because TEM/EDX has higher resolution than EPMA used in Example 1, TEM/EDX shows more clearly that the second ferrite compound phase exists in the form of particles.

Among the high-Sr-concentration particles, a rectangular particle (upper particle in the figure) has a short axis of about 500 nm (0.5 μm) and a long axis of about 1500 nm (1.5 μm). Because this bright-field STEM image shows an "a-plane" of the sintered body, the short axis is aligned with an axis of easy magnetization (c-axis of a M-type magnetoplumbite crystal). The sintered ferrite magnet of the present invention has a hexagonal, M-type magnetoplumbite structure with hexagonal-plate-like crystal particles. The bright-field STEM image of FIG. 18 (a) taken in the thickness direction of the hexagonal plate indicates that the crystal particle has a diameter of about 1.5 μm.

The same results as in Example 1 were thus obtained even when Ba was added as an element A to the calcined CaLaCo ferrite. Namely, regardless of the addition of the element A, the sintered ferrite magnet of the present invention comprised a first granular ferrite compound phase containing Ca, La, Fe and Co, and a second granular ferrite compound phase containing Sr, La, Fe and Co.

EXAMPLE 4

SrCO$_3$ powder and Fe$_2$O$_3$ powder were mixed to have a composition represented by SrFe$_{12}$ (SrFe$_{12}$O$_{19}$ when oxygen was included), to obtain a mixed starting material powder. With water added, this mixed starting material powder was wet-ball-milled for 4 hours, dried, granulated, and then calcined at 1250° C. for 3 hours in the air. The resultant calcined body was coarsely pulverized by a hummer mill to prepare coarse powder of calcined Sr ferrite.

The calcined Sr ferrite was added to the calcined CaLaCo ferrite (Calcined Body C-6) prepared in Example 3, such that the mixing ratio (by mass) of the calcined Sr ferrite was 0%, 10%, 20%, 30%, 40%, 50%, 60% and 100%, respectively, to obtain eight types of calcined ferrite mixtures. Further, the calcined Sr ferrite was similarly added to the calcined SrLaCo ferrite (Calcined Body S-11) prepared in Example 3 to obtain eight types of calcined ferrite mixtures. 100% by mass of each of these calcined ferrite mixtures was mixed with 0.6% by mass of $SiO_2$ powder and 0.7% by mass (as CaO) of $CaCO_3$ powder, and finely pulverized with water by a wet ball mill to an average particle size (measured by an air permeability method) of 0.6 μm, thereby obtaining a slurry. Each fine powder slurry was molded under pressure of about 50 MPa in a magnetic field of about 1 T in parallel to a compression direction, while removing water. The resultant green bodies were sintered at 1200° C. for 1 hour to obtain sintered ferrite magnets.

Figure 19:
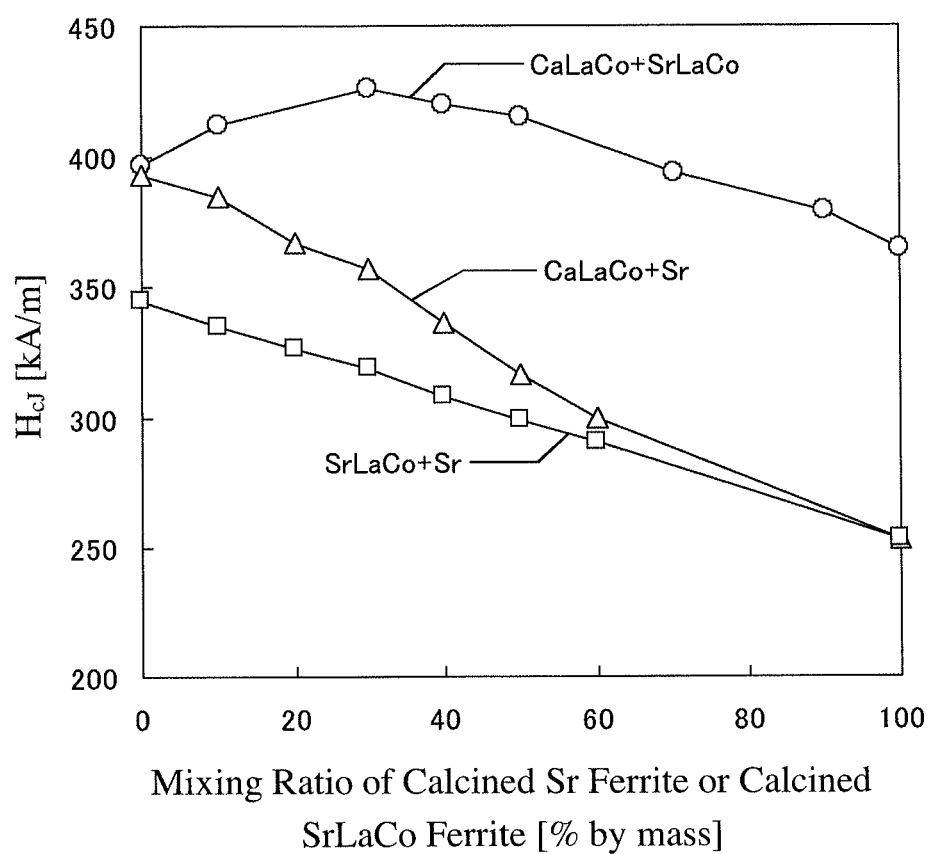
FIG. 19 is a graph showing the relation between a mixing ratio of calcined Sr ferrite or calcined SrLaCo ferrite and $H_{cJ}$ in the sintered ferrite magnet of Example 4 within the scope of the present invention.

The $H_{cJ}$ of each sintered ferrite magnet was shown in FIG. 19 together with the $H_{cJ}$ of each sintered ferrite magnet obtained by mixing the calcined CaLaCo ferrite and the calcined SrLaCo ferrite in Example 3. $H_{cJ}$ was plotted against the mixing ratio of the calcined Sr ferrite in the sintered ferrite magnets obtained in this Example, and against the mixing ratio of the calcined SrLaCo ferrite in the sintered ferrite magnets of Example 3.

As is clear from FIG. 19, the sintered ferrite magnets obtained by mixing the calcined CaLaCo ferrite or the calcined SrLaCo ferrite with the calcined Sr ferrite had $H_{cJ}$ decreasing as the mixing ratio of the calcined Sr ferrite increased.

On the other hand, the sintered ferrite magnets obtained by mixing the calcined CaLaCo ferrite and the calcined SrLaCo ferrite in Example 3 had high $H_{cJ}$ in the calcined SrLaCo ferrite mixing ratio range of 10-50% by mass (90/10 to 50/50 by volume), as described above.

It is generally expected that materials having high magnetic properties would have lower magnetic properties when mixed with materials having low magnetic properties. CaLaCo ferrite has the highest magnetic properties, and SrLaCo ferrite and Sr ferrite have lower magnetic properties successively. Accordingly, the magnetic properties of CaLaCo ferrite are expected to become lower when mixed with SrLaCo ferrite or Sr ferrite, and the magnetic properties of SrLaCo ferrite are expected to become lower when mixed with Sr ferrite.

In fact, $H_{cJ}$ decreased when CaLaCo ferrite was mixed with Sr ferrite, and when SrLaCo ferrite was mixed with Sr ferrite, in proportion to the mixing ratio of the calcined Sr ferrite in Examples above.

However, there was no such tendency when the CaLaCo ferrite was mixed with the SrLaCo ferrite. Oppositely obtained were the unexpected results that $H_{cJ}$ was improved in the SrLaCo ferrite mixing ratio range of 10-50% by mass.

EXAMPLE 5

Figure 20:
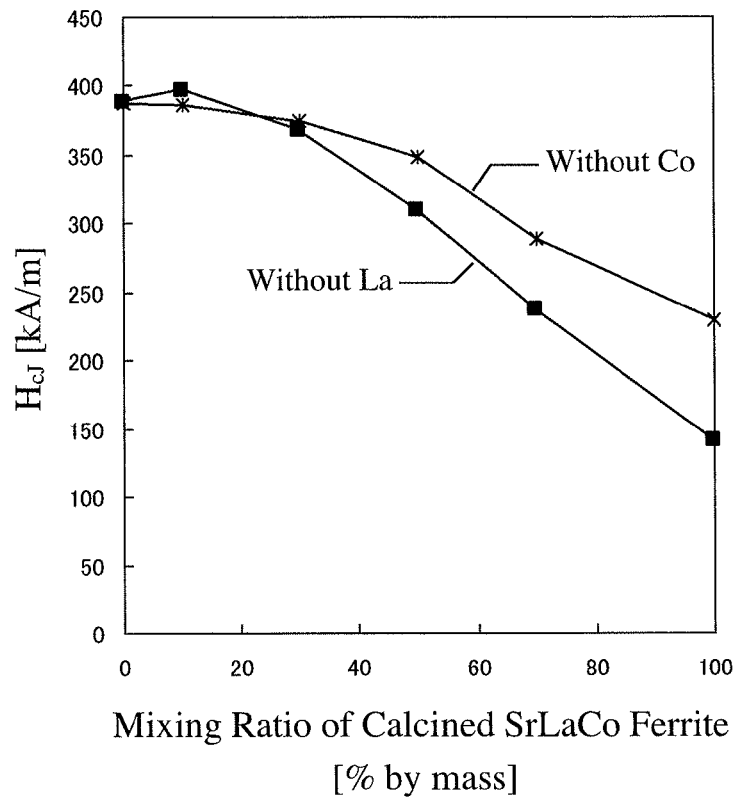
FIG. 20 is a graph showing the relation between a mixing ratio of calcined SrLaCo ferrite and $H_{cJ}$ in the sintered ferrite magnet of Example 2.

FIG. 20 shows the $H_{cJ}$ of the sintered ferrite magnets of Samples 17 to 21 and 22 to 26 produced in Example 2. Samples 17-21 used calcined SrLaCo ferrite containing no Co, and Samples 22-26 used calcined SrLaCo ferrite containing no La.

As is clear from FIG. 20, when the calcined SrLaCo ferrite containing no La was used, $H_{cJ}$ was slightly improved at the mixing ratio of the calcined SrLaCo ferrite of about 10% by mass, but decreased as the mixing ratio exceeded 10% by mass. When the calcined SrLaCo ferrite containing no Co was used, $H_{cJ}$ decreased as its mixing ratio increased. Both cases failed to provide the effect that $H_{cJ}$ was improved in a mixing ratio range of 10-50% by mass, unlike the present invention.

It may be concluded from these results that the effect that $H_{cJ}$ is improved when the CaLaCo ferrite and the SrLaCo ferrite are mixed in a SrLaCo ferrite mixing ratio range of 10-50% by mass is a special phenomenon appearing only when calcined bodies containing both La and Co are mixed.

EXAMPLE 6

Preparation of Calcined CaLaCo Ferrite $CaCO_3$ powder, $La(OH)_3$ powder, $SrCO_3$ powder, $Fe_2O_3$ powder and $Co_3O_4$ powder were mixed to have a composition represented by $Ca_{1-x'-c'}La_{x'}A_{c'}Fe_{2n'-y'}Co_{y'}$, wherein A was Sr, and 1-x'-c', x', c', y' and n' were numbers providing the calcined body composition of No. C-7 shown in Table 1-1, and 100% by mass of the resultant mixed powder was mixed with 0.1% by mass of $H_3BO_3$ to obtain a mixed starting material powder. With water added, this mixed starting material powder was wet-ball-milled for 4 hours, dried, granulated, and then calcined at 1300° C. for 3 hours in the air. The resultant calcined body was coarsely pulverized by a hummer mill to prepare coarse powder of calcined CaLaCo ferrite (Calcined Body C-7).

Preparation of Calcined SrLaCo Ferrite $SrCO_3$ powder, $La(OH)_3$ powder, $Fe_2O_3$ powder and $Co_3O_4$ powder were mixed to have a composition represented by $Sr_{1-x''}La_{x''}Fe_{2n''-y''}Co_{y''}$, wherein 1-x'', x'', y'' and n'' were numbers providing the calcined body composition of No. S-11 shown in Table 1-2, and 100% by mass of the resultant mixed powder was mixed with 0.1% by mass of $H_3BO_3$ to obtain a mixed starting material powder. With water added, this mixed starting material powder was wet-ball-milled for 4 hours, dried, granulated, and then calcined at 1250° C. for 3 hours in the air. The resultant calcined body was coarsely pulverized by a hummer mill to prepare coarse powder of calcined SrLaCo ferrite (Calcined Body S-11).

Production of Sintered Ferrite Magnets

The calcined CaLaCo ferrite and the calcined SrLaCo ferrite thus prepared were mixed at calcined SrLaCo ferrite mixing ratios (by mass) of 0%, 10%, 20%, 30%, 40%, 50%, 70%, 90% and 100% (the volume ratio of the first ferrite compound phase to the second ferrite compound phase being 100/0, 90/10, 80/20, 70/30, 60/40, 50/50, 30/70, 10/90, and 0/100, respectively) as shown in Table 12, to produce calcined ferrite mixtures having the compositions shown in Table 13. 100% by mass of each calcined ferrite mixture was mixed with 0.6% by mass of $SiO_2$ powder and 0.7% by mass (as CaO) of $CaCO_3$ powder, and finely pulverized with water by a wet ball mill to an average particle size (measured by an air permeability method) of 0.6 μm, thereby obtaining a slurry. Each fine powder slurry was molded under pressure of about 50 MPa in a magnetic field of about 1 T in parallel to a compression direction, while removing water. The resultant green bodies were sintered at 1200° C. for 1 hour in the air to obtain sintered ferrite magnets.

TABLE 12

| Sample No. | Calcined CaLaCo Ferrite | Calcined SrLaCo Ferrite | Mixing Ratio of SrLaCo Ferrite[3] (% by mass) |
|---|---|---|---|
| 71[2] | C-7 | — | 0 |
| 72[1] | C-7 | S-11 | 10 |
| 73[1] | C-7 | S-11 | 20 |
| 74[1] | C-7 | S-11 | 30 |
| 75[1] | C-7 | S-11 | 40 |
| 76[1] | C-7 | S-11 | 50 |
| 77[2] | C-7 | S-11 | 70 |

TABLE 12-continued

| Sample No. | Calcined CaLaCo Ferrite | Calcined SrLaCo Ferrite | Mixing Ratio of SrLaCo Ferrite[3] (% by mass) |
|---|---|---|---|
| 78[2] | C-7 | S-11 | 90 |
| 70[2] | — | S-11 | 100 |

Note:
[1]Within the scope of the present invention.
[2]Comparative Example.
[3]A mixing ratio of the calcined SrLaCo ferrite in the calcined ferrite mixture.

TABLE 13

| Sample No. | Composition of Calcined Ferrite Mixture $Ca_{1-x-a}La_xSr_aBa_bFe_{2n-y}Co_y$ | | | | | |
|---|---|---|---|---|---|---|
| | 1-x-a-b | x | a | b | y | n |
| 71[2] | 0.45 | 0.50 | 0.05 | 0.000 | 0.30 | 5.30 |
| 72[1] | 0.41 | 0.47 | 0.12 | 0.000 | 0.29 | 5.33 |
| 73[1] | 0.36 | 0.44 | 0.19 | 0.000 | 0.27 | 5.34 |
| 74[1] | 0.32 | 0.42 | 0.27 | 0.000 | 0.25 | 5.36 |
| 75[1] | 0.27 | 0.39 | 0.34 | 0.000 | 0.24 | 5.39 |
| 76[1] | 0.23 | 0.36 | 0.41 | 0.000 | 0.22 | 5.40 |
| 77[2] | 0.14 | 0.30 | 0.56 | 0.000 | 0.19 | 5.44 |
| 78[2] | 0.05 | 0.24 | 0.71 | 0.000 | 0.16 | 5.49 |
| 70[2] | 0.00 | 0.20 | 0.80 | 0.000 | 0.14 | 5.51 |

Note:
[1]Within the scope of the present invention.
[2]Comparative Example.

Evaluation of Magnetic Properties

Figure 24:
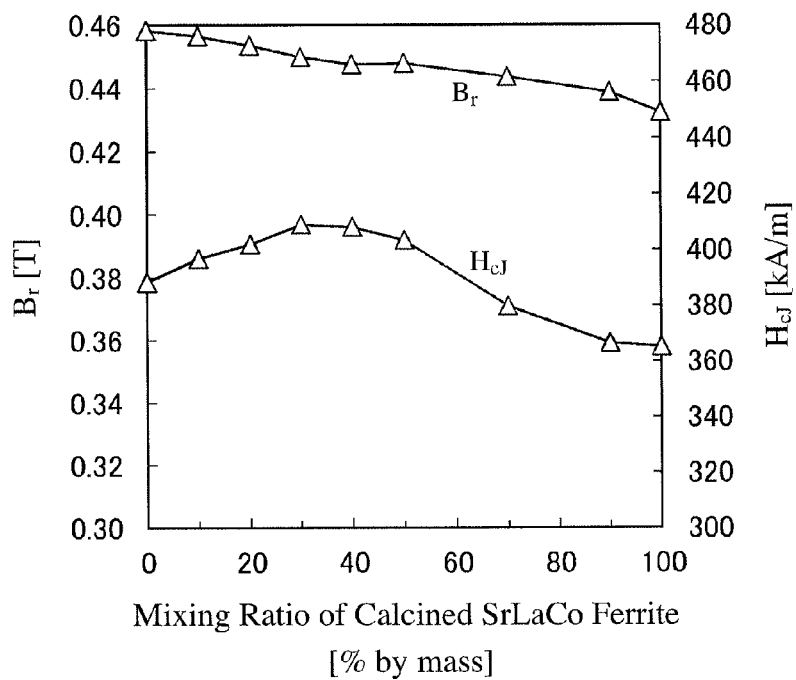
FIG. 24 is a graph showing the relation between a mixing ratio of calcined SrLaCo ferrite, and $B_r$ and $H_{cJ}$ in the sintered ferrite magnet of Example 6.
Figure 25:
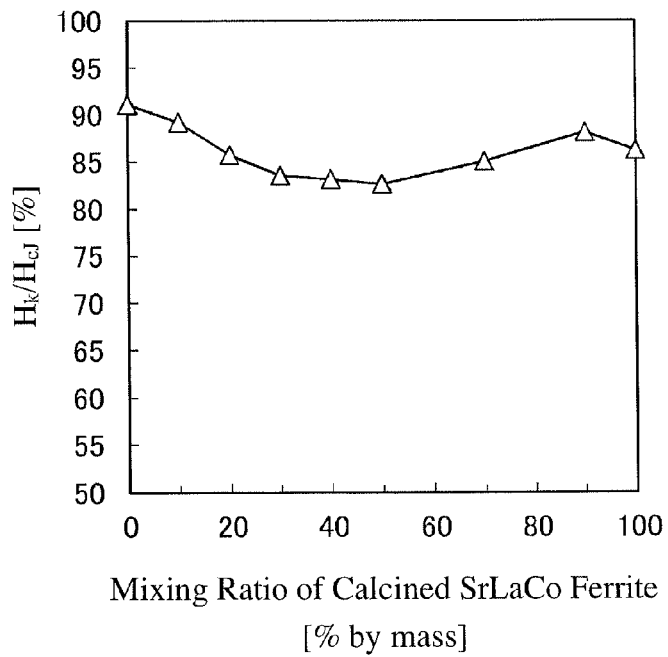
FIG. 25 is a graph showing the relation between a mixing ratio of calcined SrLaCo ferrite and $H_k/H_{cJ}$ in the sintered ferrite magnet of Example 6.

The magnetic properties of the resultant sintered ferrite magnets are shown in Table 14, and FIGS. 24 and 25. FIGS. 24 and 25 are graphs showing $B_r$ (the left axis of ordinates in FIG. 24), $H_{cJ}$ (the right axis of ordinates in FIG. 24) and $H_k/H_{cJ}$ (in FIG. 25) plotted against the mixing ratio (% by mass) of the calcined SrLaCo ferrite. $H_k$ in $H_k/H_{cJ}$ is the value of H when J is 0.95 $B_r$ in a curve of J (magnetization) to H (intensity of magnetic field) in the second quadrant.

TABLE 14

| Sample No. | Curie Temperature | | Magnetic Properties | | | |
|---|---|---|---|---|---|---|
| | Tc1 (° C.) | Tc2 (° C.) | $B_r$ (T) | $H_{cJ}$ (kA/m) | $H_k/H_{cJ}$ (%) | $(BH)_{max}$ (kJ/m³) |
| 71[2] | 417.9 | — | 0.458 | 388 | 91.1 | 41.0 |
| 72[1] | 418.9 | 439.7 | 0.456 | 397 | 89.2 | 40.6 |
| 73[1] | 421.1 | 440.2 | 0.454 | 402 | 85.7 | 40.1 |
| 74[1] | 423.0 | 440.0 | 0.450 | 409 | 83.5 | 39.3 |
| 75[1] | 425.0 | 440.1 | 0.448 | 408 | 83.1 | 38.9 |
| 76[1] | 427.3 | 440.3 | 0.448 | 403 | 82.6 | 38.9 |
| 77[2] | 432.0 | 440.2 | 0.444 | 380 | 85.0 | 38.1 |
| 78[2] | 438.5 | 440.2 | 0.439 | 367 | 88.1 | 37.2 |
| 70[2] | — | 440.9 | 0.433 | 365 | 86.2 | 36.2 |

Note:
[1]Within the scope of the present invention.
[2]Comparative Example.

As is clear from FIG. 24, $H_{cJ}$ was dramatically improved in a mixing ratio range of 10-50% by mass (90/10 to 50/50 by volume), particularly high at 20-50% by mass, and highest at about 30% by mass, relative to a straight line connecting $H_{cJ}$ at a mixing ratio of the calcined SrLaCo ferrite of 0% by mass (namely, sintered CaLaCo ferrite magnet) to $H_{cJ}$ at a mixing ratio of 100% by mass (namely, sintered SrLaCo ferrite magnet). Further, the sintered ferrite magnets in a mixing ratio range of 10-50% by mass have higher $H_{cJ}$ than that of the sintered ferrite magnet (sintered CaLaCo ferrite magnet) in a mixing ratio of 0% by mass. On the other hand, the sintered ferrite magnets in a mixing ratio range of 10-50% by mass had $B_r$ slightly lower than that of the sintered ferrite magnet at a mixing ratio of 0% by mass (sintered CaLaCo ferrite magnet). Further, as is clear from FIG. 25, the sintered ferrite magnets in a mixing ratio range of 10-50% by mass had excellent $H_k/H_{cJ}$ of 80% or more.

Curie Temperature

Figure 26:
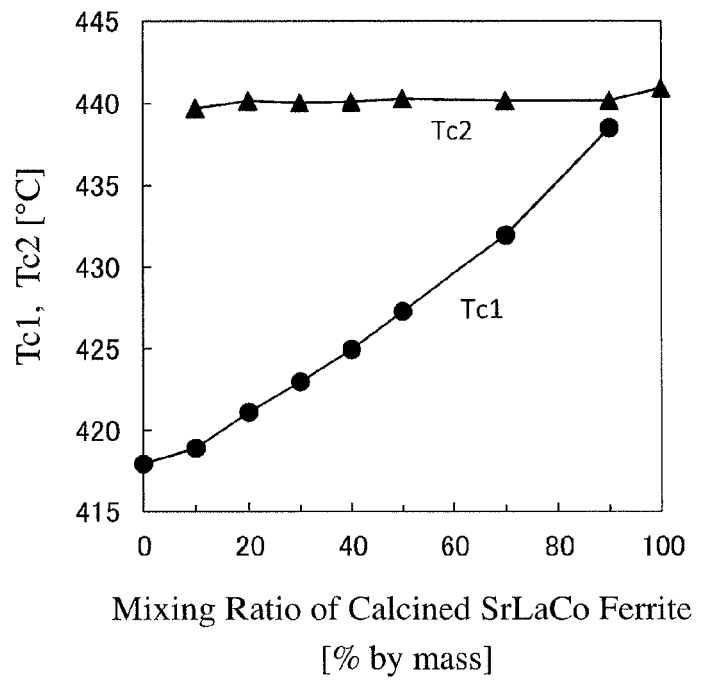
FIG. 26 is a graph showing the relation between a mixing ratio of calcined SrLaCo ferrite, and a first Curie temperature (Tc1) and a second Curie temperature (Tc2) in the sintered ferrite magnet of Example 6.

The Curie temperatures of the sintered ferrite magnets are shown in Table 14 and FIG. 26. The Curie temperatures were measured by the same method as in Example 1. FIG. 26 is a graph showing the first Curie temperature (Tc1) and the second Curie temperature (Tc2) plotted against the mixing ratio (% by mass) of the calcined SrLaCo ferrite. As in Example 2, the first Curie temperature (Tc1) tended to elevate as the mixing ratio of the calcined SrLaCo ferrite increased, from about 419° C. to about 427° C. in the calcined SrLaCo ferrite mixing ratio range of 10-50% by mass (90/10 to 50/50 by volume), in which the preferred magnetic properties were obtained. On the other hand, the second Curie temperature (Tc2) was substantially constant regardless of the mixing ratio of the calcined SrLaCo ferrite.

Component Analysis

The component analysis results of the sintered ferrite magnets are shown in Table 15, and atomic ratios and molar ratios converted from the compositions are shown in Table 16. The component analysis, and the conversion to atomic ratios and molar ratios were conducted by the same methods as in Example 2. The comparison of the compositions (atomic ratios and molar ratios) of the calcined ferrite mixtures shown in Table 13 with those of the sintered ferrite magnets shown in Table 16 reveals that the calcined ferrite mixtures and the sintered ferrite magnets have substantially the same compositions.

TABLE 15

| Sample No. | Component Analysis of Sintered Body (% by mass) | | | | | |
|---|---|---|---|---|---|---|
| | CaO | $La_2O_3$ | SrO | BaO | CoO | $SiO_2$ |
| 71 | 3.30 | 8.28 | 0.54 | 0.01 | 2.28 | 0.69 |
| 72 | 3.05 | 7.80 | 1.24 | 0.02 | 2.17 | 0.71 |
| 73 | 2.79 | 7.30 | 1.96 | 0.03 | 2.04 | 0.71 |
| 74 | 2.53 | 6.80 | 2.70 | 0.04 | 1.92 | 0.70 |
| 75 | 2.25 | 6.25 | 3.50 | 0.05 | 1.77 | 0.70 |
| 76 | 1.99 | 5.78 | 4.17 | 0.06 | 1.65 | 0.74 |
| 77 | 1.47 | 4.79 | 5.64 | 0.08 | 1.41 | 0.72 |
| 78 | 0.95 | 3.80 | 7.06 | 0.10 | 1.15 | 0.76 |
| 70 | 0.68 | 3.32 | 7.69 | 0.16 | 1.03 | 0.81 |

TABLE 16

| Sample No. | Composition of Sintered Body | | | | | | | | |
|---|---|---|---|---|---|---|---|---|---|
| | Converted Atomic Ratio and Molar Ratio | | | | | | | % by mass | |
| | 1-x-a-b | x | a | b | y | n | $SiO_2$ | CaO | x/y |
| 71 | 0.451 | 0.498 | 0.051 | 0.001 | 0.298 | 5.35 | 0.69 | 0.70 | 1.67 |
| 72 | 0.409 | 0.472 | 0.118 | 0.001 | 0.285 | 5.38 | 0.71 | 0.70 | 1.66 |
| 73 | 0.367 | 0.444 | 0.187 | 0.002 | 0.270 | 5.42 | 0.71 | 0.70 | 1.64 |
| 74 | 0.322 | 0.416 | 0.259 | 0.003 | 0.255 | 5.45 | 0.70 | 0.70 | 1.63 |
| 75 | 0.275 | 0.384 | 0.338 | 0.003 | 0.236 | 5.48 | 0.70 | 0.70 | 1.63 |
| 76 | 0.231 | 0.358 | 0.407 | 0.004 | 0.223 | 5.53 | 0.74 | 0.70 | 1.61 |
| 77 | 0.139 | 0.300 | 0.556 | 0.005 | 0.192 | 5.59 | 0.72 | 0.70 | 1.56 |
| 78 | 0.044 | 0.242 | 0.707 | 0.007 | 0.159 | 5.68 | 0.76 | 0.70 | 1.52 |
| 70 | 0.000 | 0.214 | 0.779 | 0.011 | 0.144 | 5.74 | 0.81 | 0.68 | 1.49 |

Thus, the addition of Sr as an element A to the calcined CaLaCo ferrites provided the same results and effects as the addition of no element A in Example 2 and the addition of Ba as an element A in Example 3.

EXAMPLE 7

Preparation of Calcined CaLaCo Ferrite $CaCO_3$ powder, $La(OH)_3$ powder, $Fe_2O_3$ powder and $Co_3O_4$ powder were mixed to have a composition represented by $Ca_{1-x'-c'}La_{x'}A_{c'}Fe_{2n'-y'}Co_{y'}$, wherein 1-x'-c', x', c', y' and n' were numbers providing the calcined body composition of No. C-1 shown in Table 1-1, and 100% by mass of the resultant mixed powder was mixed with 0.1% by mass of $H_3BO_3$ to obtain a mixed starting material powder. With water added, this mixed starting material powder was wet-ball-milled for 4 hours, dried, granulated, and then calcined at 1300° C. for 3 hours in the air. The resultant calcined body was coarsely pulverized by a hummer mill to prepare coarse powder of calcined CaLaCo ferrite (Calcined Body C-1).

Preparation of Calcined SrLaCo Ferrite $SrCO_3$ powder, $La(OH)_3$ powder, $Fe_2O_3$ powder and $Co_3O_4$ powder were mixed to have a composition represented by $Sr_{1-x''}La_{x''}Fe_{2n''-y''}Co_{y''}$, wherein 1-x'', x'', y'' and n'' were numbers providing the calcined body composition of No. S-3 shown in Table 1-2, and 100% by mass of the resultant mixed powder was mixed with 0.1% by mass of $H_3BO_3$ to obtain a mixed starting material powder. With water added, this mixed starting material powder was wet-ball-milled for 4 hours, dried, granulated, and then calcined at 1250° C. for 3 hours in the air. The resultant calcined body was coarsely pulverized by a hummer mill to prepare coarse powder of calcined SrLaCo ferrite (Calcined Body S-3).

Production of Sintered Ferrite Magnets

The calcined CaLaCo ferrite and the calcined SrLaCo ferrite thus prepared were mixed such that the mixing ratio (by mass) of the calcined SrLaCo ferrite was 0%, 10%, 30%, 50%, 70% and 100%, respectively (the volume ratio of the first ferrite compound phase to the second ferrite compound phase being 100/0, 90/10, 70/30, 50/50, 30/70 and 0/100, respectively), producing calcined ferrite mixtures. 100% by mass of each calcined ferrite mixture was mixed with 0.6% by mass of $SiO_2$ powder and 0.7% by mass (as CaO) of $CaCO_3$ powder, finely pulverized with water by a wet ball mill to an average particle size (measured by an air permeability method) of 0.6 μm, thereby obtaining a slurry. Each fine powder slurry was molded under pressure of about 50 MPa in a magnetic field of about 1 T in parallel to a compression direction, while removing water. The resultant green bodies were sintered at 1200° C. for 1 hour in the air to obtain sintered ferrite magnets.

Volume Ratios of First and Second Ferrite Compound Phases

Figure 27:
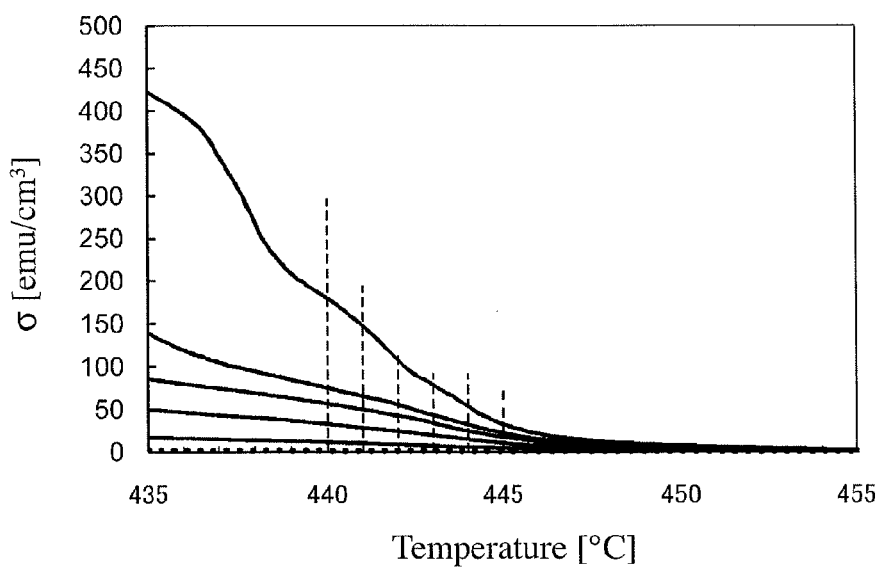
FIG. 27 is a graph showing the σ-T curves of the sintered ferrite magnet of Example 7.

Each of the resultant sintered ferrite magnets was ground to a size of 2.8 mm×2.8 mm×2.8 mm, magnetized in a magnetic field of 1.6 MA/m using a vibrating sample magnetometer (VSM), and heated at 10° C./min from room temperature to 400° C., and at 1° C./min from 400° C. to 460° C. without a magnetic field, to obtain a σ-T curve, wherein σ was magnetization, and T was temperature. The results are shown in FIG. 27. In FIG. 27, the highest σ-T curve was obtained at a calcined SrLaCo ferrite mixing ratio of 100% by mass, and lower σ-T curves were obtained successively at 70% by mass, 50% by mass, 30% by mass, 10% by mass and 0% by mass. Only the σ-T curve at 0% by mass is drawn by a dotted line, and other σ-T curves are drawn by solid lines.

Figure 28:
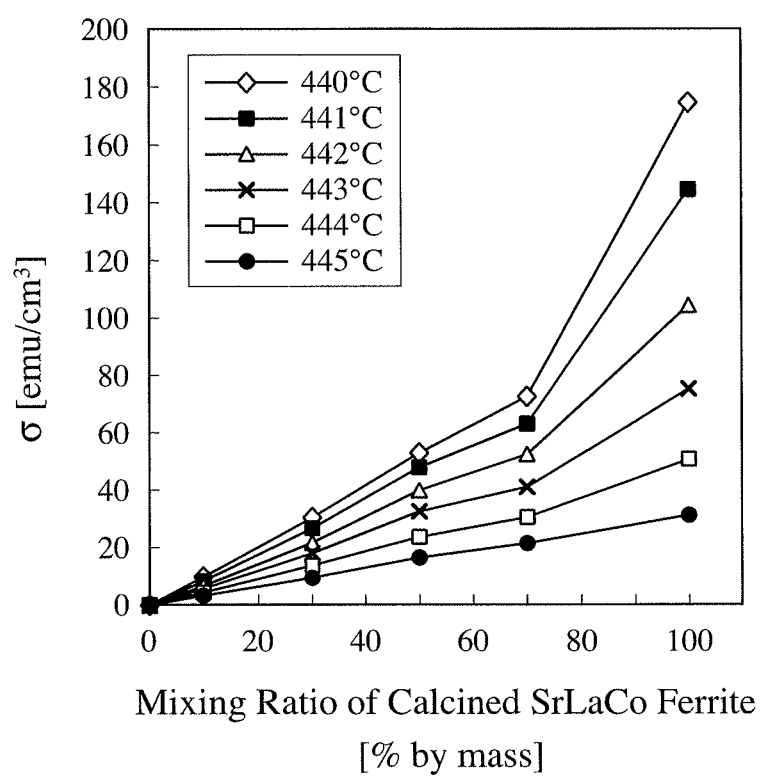
FIG. 28 is a graph showing the relation between a mixing ratio of calcined SrLaCo ferrite in the sintered ferrite magnet of Example 7 and the value of σ of the sintered ferrite magnet at each temperature.

The results of FIG. 27 indicate that the relations between a at each temperature (every 1° C. between 440° C. and 445° C.) and the mixing ratio (% by mass) of the calcined SrLaCo ferrite are substantially linear at 445° C., as shown in FIG. 28. Accordingly, using this relation at 445° C. as a calibration curve, a mixing ratio (% by mass) of calcined SrLaCo ferrite in an arbitrary sintered ferrite magnet can be determined from a σ-T curve measured by a vibrating sample magnetometer (VSM).

Specifically, (1) the compositions of first and second ferrite compound phases in an arbitrary sintered ferrite magnet (sintered magnet A) are measured, for example, by component analysis, EPMA or magnetic thermobalance, (2) calcined bodies 1 and 2 having first and second compositions are mixed at arbitrary volume ratios (for example, 0/100, 25/75, 50/50, 75/25 and 100/0) to produce pluralities of sintered ferrite magnets, (3) a calibration curve is produced from the σ-T curves of these sintered ferrite magnets measured by a vibrating sample magnetometer (VSM), at a temperature $T_0$ providing a good linear relation, and (4) the volume ratios of first and second ferrite compound phases in the sintered magnet A are determined from the value of a of the sintered magnet A at $T_0$. When the temperature $T_0$ providing a good linear relation is known in advance, two sintered ferrite magnets derived from only calcined bodies 1 and 2, respectively, may be used.

EFFECTS OF THE INVENTION

The present invention can improve $H_{cJ}$ while keeping high $B_r$ and $H_k/H_{cJ}$, providing high-performance sintered ferrite magnets resistant to demagnetization due to a demagnetizing field even if they are made thinner. The use of the sintered ferrite magnets of the present invention provides small, lightweight, high-performance, electric parts for automobiles and electric appliances.

What is claimed is:

1. A sintered ferrite magnet comprising a first granular ferrite compound phase containing Ca, La, Fe and Co and having a Curie temperature between 415° C. and 430° C., and a second granular ferrite compound phase containing Sr, La, Fe and Co and having a Curie temperature between 437° C. and 455° C., the volume ratio of said first granular ferrite compound phase being 50-90%, and the volume ratio of said second granular ferrite compound phase being 10-50%, with their total volume ratio being 95% or more.

2. The sintered ferrite magnet according to claim 1, wherein the volume ratio of said first granular ferrite compound phase is 60-80%, and the volume ratio of said second granular ferrite compound phase is 20-40%, with their total volume ratio being 95% or more.

3. The sintered ferrite magnet according to claim 1, wherein said first granular ferrite compound phase further contains Ba and/or Sr.

4. The sintered ferrite magnet according to claim 3, wherein said metal elements of Ca, La, Sr, Ba, Fe and Co have a composition represented by the general formula:

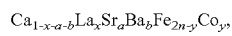

$Ca_{1-x-a-b}La_xSr_aBa_bFe_{2n-y}Co_y$, wherein x, a, b and y representing the atomic ratios of Ca, La, Sr, Ba, Fe and Co, and n representing a molar ratio are numbers meeting the conditions of $0.2 \leq x \leq 0.6$, $0.01 \leq a \leq 0.6$, $0 \leq b \leq 0.3$, $0.1 \leq 1-x-a-b$, $0.1 \leq y \leq 0.5$, and $3 \leq n \leq 6$.

5. The sintered ferrite magnet according to claim 4, wherein x, a, b and y representing the atomic ratios of Ca, La, Sr, Ba, Fe and Co and n representing a molar ratio are numbers meeting the conditions of $0.3 \leq x \leq 0.5$, $0.05 \leq a \leq 0.5$, $0 \leq b \leq 0.2$, $0.2 \leq 1-x-a-b$, $0.15 \leq y \leq 0.4$, and $3.7 \leq n \leq 5.5$.

6. The sintered ferrite magnet according to claim 4, wherein said x and y are numbers meeting the condition of $x/y \geq 1.3$.

7. The sintered ferrite magnet according to claim 3, wherein the metal elements of Ca, La, (Ba+Sr), Fe and Co in said first granular ferrite compound phase have a composition represented by the general formula:

$Ca_{1-x'-c'}La_{x'}A_{c'}Fe_{2n'-y'}Co_{y'}$, wherein A represents (Ba+Sr), and x', c' and y' representing the atomic ratios of Ca, La, A, Fe and Co and n' representing a molar ratio are numbers meeting the conditions of $0.4 \leq x' \leq 0.6$, $0 \leq c' \leq 0.2$, $0.2 < y' \leq 0.5$, and $4 \leq n' \leq 6$.

8. The sintered ferrite magnet according to claim 7, wherein y' representing the atomic ratio of Co is a number meeting the condition of $0.2 < y' \leq 0.4$.

9. The sintered ferrite magnet according to claim 7, wherein y' representing the atomic ratio of Co is a number meeting the condition of $0.25 \leq y' \leq 0.35$.

10. The sintered ferrite magnet according to claim 1, wherein the metal elements of Sr, La, Fe and Co in said second granular ferrite compound phase have a composition represented by the general formula:

$Sr_{1-x''}La_{x''}Fe_{2n''-y''}Co_{y''}$, wherein x'' and y'' representing the atomic ratios of Sr, La, Fe and Co, and n'' representing a molar ratio are numbers meeting the conditions of $0.05 \leq x'' \leq 0.3$, $0.05 \leq y'' \leq 0.3$, and $5 \leq n'' \leq 6$.

11. A method for producing a sintered ferrite magnet comprising the steps of
(1) mixing a first calcined ferrite in which the metal elements of Ca, La, (Ba+Sr), Fe and Co have a composition represented by the general formula: $Ca_{1-x'-c'}La_{x'}A_{c'}Fe_{2n'-y'}Co_{y'}$, wherein A represents (Ba+Sr), and x', c' and y' representing the atomic ratios of Ca, La, A, Fe and Co and n' representing a molar ratio are numbers meeting the conditions of $0.4 \leq x' \leq 0.6$, $0 \leq c' \leq 0.2$, $0.2 < y' \leq 0.5$, and $4 \leq n' \leq 6$, with a second calcined ferrite in which the metal elements of Sr, La, Fe and Co have a composition represented by the general formula: $Sr_{1-x''}La_{x''}Fe_{2n''-y''}Co_{y''}$, wherein x'' and y'' representing the atomic ratios of Sr, La, Fe and Co and n'' representing a molar ratio are numbers meeting the conditions of $0.05 \leq x'' \leq 0.3$, $0.05 \leq y'' \leq 0.3$, and $5 \leq n'' \leq 6$, at a mass ratio of 90/10 to 50/50, to obtain a calcined ferrite mixture;
(2) pulverizing said calcined ferrite mixture to obtain powder;
(3) molding said powder to obtain a green body; and
(4) sintering said green body to obtain a sintered body.

12. The method for producing a sintered ferrite magnet according to claim 11, wherein said first calcined ferrite and said second calcined ferrite are mixed at a mass ratio of 80/20 to 60/40.

13. The method for producing a sintered ferrite magnet according to claim 11, wherein y' representing the atomic ratio of Co is a number meeting the condition of $0.2 < y' \leq 0.4$.

14. The method for producing a sintered ferrite magnet according to claim 11, wherein y' representing the atomic ratio of Co is a number meeting the condition of $0.25 \leq y' \leq 0.35$.

15. The method for producing a sintered ferrite magnet according to claim 11, wherein the metal elements of Ca, La, Sr, Ba, Fe and Co in said sintered ferrite magnet have a composition represented by the general formula:

$Ca_{1-x-a-b}La_xSr_aBa_bFe_{2n-y}Co_y$ wherein x, a, b and y representing the atomic ratios of Ca, La, Sr, Ba, Fe and Co, and n representing a molar ratio are numbers meeting the conditions of $0.2 \leq x \leq 0.6$, $0.01 \leq a \leq 0.6$, $0 \leq b \leq 0.3$, $0.1 \leq 1-x-a-b$, $0.1 \leq y \leq 0.5$, and $3 \leq n \leq 6$.

16. The method for producing a sintered ferrite magnet according to claim 15, wherein said x and y are numbers meeting the condition of $x/y \geq 1.3$.

* * * * *